United States Patent
Brotherton-Ratcliffe et al.

(10) Patent No.: US 7,333,252 B2
(45) Date of Patent: Feb. 19, 2008

(54) METHOD OF WRITING A COMPOSITE 1-STEP HOLOGRAM

(75) Inventors: David Brotherton-Ratcliffe, Pease Pottage (GB); Alexey Rodin, Vilnius (LT); Lynne Hrynkiw, Anjou (CA)

(73) Assignee: XYZ Imaging, Inc., Montreal, Quebec (CA)

(*) Notice: Subject to any disclaimer, the term of this patent is extended or adjusted under 35 U.S.C. 154(b) by 289 days.

(21) Appl. No.: 10/503,113

(22) PCT Filed: Jan. 27, 2003

(86) PCT No.: PCT/GB03/00345

§ 371 (c)(1),
(2), (4) Date: Apr. 20, 2005

(87) PCT Pub. No.: WO03/065129

PCT Pub. Date: Aug. 7, 2003

(65) Prior Publication Data

US 2005/0200927 A1    Sep. 15, 2005

(30) Foreign Application Priority Data

Jan. 30, 2002  (GB)  ................. 0202139.2

(51) Int. Cl.
*G02B 5/32* (2006.01)
(52) U.S. Cl. ............... 359/21; 359/22; 359/12; 345/647
(58) Field of Classification Search ........... 359/21, 359/22, 12, 32
See application file for complete search history.

(56) References Cited

U.S. PATENT DOCUMENTS 3,832,027 A    8/1974   King (Continued)

FOREIGN PATENT DOCUMENTS

EP        0697631 A    2/1996

(Continued)

OTHER PUBLICATIONS

Masahiro Yamaguchi et al.; *Development of a prototype full-parallax holoprinter*, XP-000979992, SPIE vol. 2406, 1995, pp. 50-56.

*Primary Examiner*—Fayez G. Assaf
(74) *Attorney, Agent, or Firm*—Madan, Mossman & Sriram, P.C.

(57) ABSTRACT

A method of writing a single or double parallax composite 1-step hologram is disclosed. Digital data is acquired from a real or virtual object and is described by a luminous intensity tensor. A single mathematical transformation is performed to convert the luminous intensity tensor into a mask tensor. The single mathematical transformation transforms the digital data whilst integrally correcting the digital data for the finite distortion of an optical objective. Corrected data, described by the mask tensor, is written on to a spatial light modulator. A laser beam is directed on to the spatial light modulator so that at least a portion of the laser beam is spatially modulated to form a spatially modulated laser beam. The spatially modulated laser beam is then passed through an optical objective having a finite distortion and in combination with a reference recording beam forms a composite hologram.

80 Claims, 44 Drawing Sheets

U.S. PATENT DOCUMENTS

| | | |
|---|---|---|
| 3,843,225 A | 10/1974 | Kock et al. |
| 4,037,919 A | 7/1977 | Takeda et al. |
| 4,206,965 A | 6/1980 | McGrew |
| 4,421,380 A | 12/1983 | McGrew |
| 4,498,740 A | 2/1985 | Caulfield |
| 4,701,006 A | 10/1987 | Perlmutter |
| 4,719,160 A | 1/1988 | Gerhart et al. |
| 4,778,262 A | 10/1988 | Haines |
| 4,832,445 A | 5/1989 | Haines et al. |
| 4,834,476 A | 5/1989 | Benton |
| 4,964,684 A | 10/1990 | Iovine |
| 4,969,700 A | 11/1990 | Haines |
| 5,046,792 A | 9/1991 | Zabka |
| 5,138,471 A | 8/1992 | McGrew |
| 5,194,971 A | 3/1993 | Haines |
| 5,237,433 A | 8/1993 | Haines et al. |
| 5,475,511 A | 12/1995 | Haines et al. |
| 5,519,517 A | 5/1996 | Redfield et al. |
| 5,734,485 A | 3/1998 | Buchkremer et al. |
| 5,793,503 A | 8/1998 | Haines et al. |
| 5,796,500 A | 8/1998 | Hart |
| 5,949,559 A | 9/1999 | Kihara et al. |
| 5,973,806 A | 10/1999 | Campbell et al. |
| 5,973,807 A | 10/1999 | Buchkremer et al. |
| 6,081,381 A | 6/2000 | Shalapenok et al. |
| 6,088,140 A | 7/2000 | Klug et al. |
| 6,266,167 B1 | 7/2001 | Klug et al. |
| 6,330,088 B1 | 12/2001 | Klug et al. |
| 6,930,811 B2 | 8/2005 | Brotherton-Ratcliffe et al. |
| 2003/0156308 A1 | 8/2003 | Brotherton-Ratcliffe et al. |
| 2004/0047375 A1 | 3/2004 | Rodin et al. |
| 2004/0050280 A1 | 3/2004 | Rodin et al. |
| 2005/0052717 A1 | 3/2005 | Brotherton-Ratcliffe et al. |
| 2005/0200924 A1 | 9/2005 | Brotherton-Ratcliffe et al. |
| 2005/0200925 A1 | 9/2005 | Brotherton-Ratcliffe et al. |

FOREIGN PATENT DOCUMENTS

| | | |
|---|---|---|
| EP | 0929018 A | 7/1999 |
| WO | WO00/29909 | 5/2000 |
| WO | WO 01/42861 | * 6/2001 |

* cited by examiner

METHOD OF WRITING A COMPOSITE 1-STEP HOLOGRAM

BACKGROUND OF THE INVENTION

1. Field of the Invention

The present invention relates to methods of writing composite 1-step holograms.

2. Description of Related Art

PCT applications WO01/45943 and WO01/42861 (Brotherton-Ratcliffe et al.) described a holographic printing system based on a rapid pulsed laser. This system was able to operate in two modes ("a dual-mode printer"). In the first mode, a holographic master hologram, also known as an H1, is produced. This hologram is then copied conventionally to a second and final hologram, known as the H2, by machines similar to those described by Grichine et al. (1997). In the second mode of operation, the final hologram is written directly.

In its first mode of operation, the digital data required by the system disclosed in WO01/45943 and WO01/42861 consists of ordinary perspective views that are easily generated by standard 3D commercial software packages. These images are then trivially distorted in order to compensate for inherent optical distortion that is present in the invention.

In its second mode of operation, the digital data required by the system disclosed in WO01/45943 and WO00/42861 are derived by applying various general mathematical transformations on the ensemble of the undistorted data-set that would be used for the generation of a hologram under the first mode of operation.

U.S. Pat. No. 5,793,503 (Haines et al.) described various transformations for the preparation of digital data for writing the hologram of a 3D computerized model using an ideal hologram printer. This arrangement concentrated on the treatment of data from a specialized 3D model but also treated the case of the generation of the required digital data from the conventional perspective views produced by standard commercial software.

The methods described in U.S. Pat. No. 5,793,503 are inappropriate for application to the type of holographic printers described in PCT applications WO01/45943 and WO01/42861. One reason for this is that such printers intrinsically possess very large optical distortion caused by a finite $5^{th}$ order Seidel coefficient in the writing objective. This distortion, which generally varies from pixel to pixel in the case of non-static SLM printers should not be corrected for independently by sequential application of correction algorithms as this would lead to both image noise and computational disadvantage.

Another reason why the arrangement disclosed in U.S. Pat. No. 5,793,503 is inappropriate in the present context is that the 1-step holograms that are produced by the system disclosed in PCT applications WO01/45943 and WO01/42861 must, on display, generally be illuminated by a light from a point source which does not correspond geometrically to the recording illumination used within the printer and thus any proper method, for transforming perspective data into the required data, should be based on a general diffraction model. In its generality such a model must take into account such parameters as the emulsion and hologram substrate refractive indices as well as the recording and ray replay geometry.

Although the system disclosed in WO01/45943 and WO01/42861 represents a considerable advance over the prior-art it too suffers from various limitations. In particular, by not integrating the correction for optical distortion of the objective, into the data rearrangement transforms necessary for writing 1-step holograms, image quality is inevitably compromised. In addition, by only tracking the reference recording beam in one dimension, rather than two, the printer is fundamentally unable to produce large format holograms that are illuminated by close point-source lights. Finally, by seeking to correct for geometrical image distortions alone the prior-art printer suffers from increasing discoloration effects as a closer (and more realistic) point-source illumination is demanded.

SUMMARY OF THE INVENTION

According to an aspect of the present invention there is provided a method of writing a composite 1-step hologram, comprising:

generating a laser beam;

acquiring digital data from an object, the digital data being described by a luminous intensity tensor $^{kg}I_{ij}$ wherein i and j are the horizontal and vertical pixel coordinates of a given perspective view that is generated by a real or virtual camera whose location is described by k in the horizontal dimension and g in the vertical dimension;

performing a single mathematical transformation to convert the luminous intensity tensor $^{kg}I_{ij}$ into a tensor $^{\mu\nu}T_{\alpha\beta}$ wherein $\alpha$ and $\beta$ are the horizontal and vertical coordinates of a holographic pixel on the composite hologram and $\mu$ and $\nu$ are the horizontal and vertical coordinates of a given pixel on a spatial light modulator on to which the data for each holographic pixel is written, wherein the single mathematical transformation transforms the digital data whilst integrally correcting the digital data for the finite distortion of an optical objective;

writing corrected data to a spatial light modulator, wherein the corrected data is described by the tensor $^{\mu\nu}T_{\alpha\beta}$;

directing the laser beam on to the spatial light modulator so that at least a portion of the laser beam is spatially modulated by the spatial light modulator to form a spatially modulated laser beam;

passing the spatially modulated laser beam through an optical objective having a finite distortion, the optical objective focusing the spatially modulated laser beam on to a photosensitive is substrate;

directing a reference recording beam on to the photosensitive substrate; and forming a double-parallax composite hologram on the photosensitive substrate.

According to another aspect of the present invention, there is provided a method of writing a composite 1-step hologram, comprising:

generating a laser beam;

acquiring digital data from an object, the digital data being described by a luminous intensity tensor $^{k}I_{ij}$ wherein i and j are the horizontal and vertical pixel coordinates of a given perspective view that is generated by a real or virtual camera whose location is described by k in the horizontal dimension;

performing a single mathematical transformation to convert the luminous intensity tensor $^{k}I_{ij}$ into a tensor $^{\mu\nu}T^{\alpha\beta}$ wherein $\alpha$ and $\beta$ are the horizontal and vertical coordinates of a holographic pixel on the composite hologram and $\mu$ and $\nu$ are the horizontal and vertical coordinates of a given pixel on a spatial light modulator on to which the data for each holographic pixel is written, wherein the single mathematical transformation transforms the digital data whilst integrally correcting the digital data for the finite distortion of an optical objective;

writing corrected data to a spatial light modulator, wherein the corrected data is described by the tensor $^{\mu\nu}T_{\alpha\beta}$;

directing the laser beam on to the spatial light modulator so that at least a portion of the laser beam is spatially modulated by the spatial light modulator to form a spatially modulated laser beam;

passing the spatially modulated laser beam through an optical objective having a finite distortion, the optical objective focusing the spatially modulated laser beam on to a photosensitive substrate;

directing a reference recording beam on to the photosensitive substrate; and forming a single-parallax composite hologram on the photosensitive substrate.

The digital data may be acquired from a real object and comprises a plurality of perspective views of the required hologram image. Alternatively, the digital data may be acquired from a virtual object and comprises a plurality of perspective views of the required hologram image.

The composite 1-step hologram may comprise a transmission hologram or a reflection hologram.

According to one embodiment, the single mathematical transformation generates a rectangular viewing window located in front of the hologram. The spatial light modulator may either be static whilst writing the hologram or the spatial light modulator may be moving whilst writing the hologram. The viewing window is preferably either of substantially similar size to the composite hologram or of different size to the composite hologram. The viewing window may be symmetrically located in front of the composite hologram or generally offset from the centre of the composite hologram. Preferably, either the viewing window is located at the same perpendicular distance from a given point in the holographic image as the camera plane is located from the corresponding point on the object from which the digital data is acquired or the viewing window is located at a certain perpendicular distance from a given point in the holographic image and the camera plane is located at a substantially different perpendicular distance from the corresponding point on the object from which the digital data is acquired.

The digital data may be generated by a real or virtual camera which generates either a plurality of apodized images which are centred in a frame which corresponds with the object which is to be reproduced by the hologram or a plurality of non-apodized images having frames which correspond with the object which is to be reproduced by the hologram, the frames being generally off-centred.

According to an embodiment the single mathematical transformation generates a scrolling viewing window located in front of the hologram.

According to another embodiment the single mathematical transformation generates a viewing window having a fixed size in the horizontal dimension and which scrolls in the vertical dimension, the viewing window being located in front of the hologram.

According to another embodiment the single mathematical transformation generates a viewing window having a fixed size in the vertical dimension and which scrolls in the horizontal dimension, the viewing window being located in front of the hologram.

Preferably either the camera plane is located at a certain distance from a point on the object and the viewing plane is located at substantially the same distance from a corresponding point in the holographic image or the camera plane is located at a certain distance from a point on the object and the viewing plane is located at substantially a different distance from a corresponding point in the holographic image.

According to one embodiment the composite hologram is formed using a variable angle reference recording beam. According to another embodiment the composite hologram is formed using a fixed angle or collimated reference recording beam. The composite 1-step hologram may be replayed using a point-source light or alternatively using collimated light.

Preferably, the single mathematical transformation additionally integrally corrects the digital data for the image distortion caused by the altitudinal and azimuthal reference beam angle(s) used to replay each holographic pixel of the hologram being different from the altitudinal and azimuthal reference beam angle(s) used to write each holographic pixel of the hologram.

Preferably, the single mathematical transformation additionally integrally pre-distorts the digital data so that the data written on to the spatial light modulator is distorted. The reference recording beam is preferably overcorrected using either an astigmatic or a non-astigmatic geometry.

Preferably, individual altitudinal and azimuthal reference recording angles are determined for at least a majority, preferably all, of the holographic pixels forming the hologram.

According to an embodiment the overlap of viewing windows of a plurality of holographic pixels is arranged to be maximised. The overlap of viewing windows of two diagonally opposed holographic pixels may be maximised. Preferably, either the angular resolution within the overall viewing window of the hologram averaged over the overall viewing window is maximised or the angular resolution at the periphery of the overall viewing window is maximised. The pre-distortion of the digital data and the step of overcorrecting the reference recording beam are preferably arranged such that chromatic discoloration is minimized.

According to an embodiment the single mathematical transformation additionally integrally corrects the digital data for the distortion caused by emulsion swelling of the substrate.

According to an embodiment the single mathematical transformation additionally integrally corrects the digital data for the distortion caused by the wavelength of light used to replay the hologram being different from the wavelength of light used to write the hologram.

According to a particularly preferred embodiment, a plurality of colour channels are provided. According to an embodiment a red and/or green and/or blue colour channel are provided. A spatial light modulator may be provided for each colour channel. The composite 1-step hologram preferably comprises a multiple colour hologram. The multiple colour hologram is formed using reference recording beams having a first geometry and the hologram is replayed with light rays having a geometry different to the first geometry.

The actual replay wavelength may be calculated as a function of altitudinal and azimuthal angles for at least a majority, preferably all, of the holographic pixels forming the hologram.

Linear chromatic coupling tensors for each colour channel may be calculated. A separate tensor $^{\mu\nu}T^{\alpha\beta}$ is preferably calculated for each primary colour channel. Preferably, a corrected tensor $^{\mu\nu}T_{\alpha\beta}$ is then calculated for each primary colour channel as a linear combination of the uncorrected component colour tensors $^{\mu\nu}T_{\alpha\beta}$ each operated on by respective chromatic coupling tensors. For each holographic pixel each of the corrected tensors is preferably written to a separate spatial light modulator in such a way as to create a fully colour-corrected composite colour hologram.

For a double parallax case, the single mathematical transformation between the tensors $^{kg}I_{ij}$ and $^{\mu\nu}T_{\alpha\beta}$ preferably consists of a reordering of the elements according to a set of single index laws of the form $k=f_1(\alpha,\beta,\mu,\nu,P_l,Q_l,H_l,\lambda)$, $g=f_2(\alpha,\beta,\mu,\nu,P_l,Q_l,H_l,\lambda)$, $i=f_3(\alpha,\beta,\mu,\nu,P_l,Q_l,H_l,\lambda)$ and is $j=f_4(\alpha,\beta,\mu,\nu,P_l,Q_l,H_l,\lambda)$, wherein the functions $f_n$ are general functions of the indicated indices, $P_l$ are a set of parameters characterizing the physical characteristics of the hologram, $Q_l$ are a set of parameters characterizing the optical properties of the hologram writing mechanism, $H_l$ is a set of parameters characterizing the geometrical properties of the reference recording and reference replay beams and $\lambda$ is the wavelength at which the hologram is recorded.

For a single parallax case, the single mathematical transformation between the tensors $^kI_{ij}$, and $^{\mu\nu}T_{\alpha\beta}$ preferably consists of a reordering of the elements according to a set of single index laws of the form $k=f_1(\alpha,\beta,\mu,\nu,P_l,Q_l,H_l,\lambda)$, $i=f_2(\alpha,\beta,\mu,\nu,P_l,Q_l,H_l,\lambda)$ and $j=f_3(\alpha,\beta,\mu,\nu,P_l,Q_l,H_l,\lambda)$, wherein the functions $f_n$ are general functions of the indicated indices, $P_l$ are a set of parameters characterizing the physical characteristics of the hologram, $Q_l$ are a set of parameters characterizing the optical properties of the hologram writing mechanism, $H_l$ is a set of parameters characterizing the geometrical properties of the reference recording and reference replay beams and $\lambda$ is the wavelength at which the hologram is recorded.

According to another aspect of the present invention there is provided a 1-step holographic printer, comprising:

a laser source;

control means for acquiring digital data from an object, the digital data being described by a luminous intensity tensor $^{kg}I_{ij}$; wherein i and j are the horizontal and vertical pixel coordinates of a given perspective view that is generated by a real or virtual camera whose location is described by k in the horizontal dimension and g in the vertical dimension, the control means performing a single mathematical transformation to convert the luminous intensity tensor $^{kg}I_{ij}$ into a tensor $^{\mu\nu}T_{\alpha\beta}$ wherein $\alpha$ and $\beta$ are the horizontal and vertical coordinates of a holographic pixel on the composite hologram and $\mu$ and $\nu$ are the horizontal and vertical coordinates of a given pixel on a spatial light modulator is on to which the data for each holographic pixel is written, wherein the single mathematical transformation transforms the digital data whilst integrally correcting the digital data for the finite objective distortion of an optical objective;

a spatial light modulator onto which data described by the tensor $^{\mu\nu}T_{\alpha\beta}$ is written in use, wherein in use a laser beam is directed on to the spatial light modulator so that at least a portion of the beam profile of the laser beam is spatially modulated by the spatial light modulator to form a spatially modulated laser beam; and an optical objective through which the spatially modulated laser beam is passed in use, the optical objective focusing in use the spatially modulated laser beam on to a photosensitive substrate so that a double-parallax composite hologram is formed in use on to a photosensitive substrate.

According to another aspect of the present invention there is provided a 1-step holographic printer, comprising:

a laser source;

control means for acquiring digital data from an object, the digital data being described by a luminous intensity tensor $^kI_{ij}$ wherein i and j are the horizontal and vertical pixel coordinates of a given perspective view that is generated by a real or virtual camera whose location is described by k in the horizontal dimension, the control means performing a single mathematical transformation to convert the luminous intensity tensor $^kI_{ij}$ into a tensor $^{\mu\nu}T_{\alpha\beta}$ wherein $\alpha$ and $\beta$ are the horizontal and vertical coordinates of a holographic pixel on the composite hologram and $\mu$ and $\nu$ are the horizontal and vertical coordinates of a given pixel on a spatial light modulator on to which the data for each holographic pixel is written, wherein the single mathematical transformation transforms the digital data whilst integrally correcting the digital data for the finite objective distortion of an optical objective;

a spatial light modulator onto which data described by the tensor $^{\mu\nu}T_{\alpha\beta}$ is written in use, wherein in use a laser beam is directed on to the spatial light modulator so that at least a portion of the beam profile of the laser beam is spatially modulated by the spatial light modulator to form a spatially modulated laser beam; and an optical objective through which the spatially modulated laser beam is passed in use, the optical objective focusing in use the spatially modulated laser beam on to a photosensitive substrate so that a single-parallax composite hologram is formed in use on to a photosensitive substrate.

The preferred embodiment provides a class of methods that is capable of effectively and efficiently transforming 2D digital perspective views that have been derived from a standard 3D computer model into data which is then used by a holographic printer to produce a 1-step composite hologram. Unlike the arrangement disclosed in U.S. Pat. No. 5,793,503 which is primarily directed towards the generation of small holograms in 1-step printers, the preferred embodiment is directed primarily towards the generation of larger holograms using either 1-step or dual-mode printers.

According to the preferred embodiment, rainbow or reflection type holograms may be produced. Rainbow holograms of a single colour channel or many colour channels may be generated. Equally reflection holograms of one or more colours are provided for, in addition to achromatic holograms of both rainbow and transmission nature. Particular attention is paid to reflection holograms (both single and multiple-colour and both single and double parallax).

The SLM may be moved which is preferred for printers that print both 1-step and 2-step holograms (dual mode printers).

According to a preferred embodiment holograms may be written which have different replay and recording reference geometries.

According to another embodiment the image data is transformed and the recording reference beam within the printer is adjusted preferably two-dimensionally in order to optimize the final viewing window of the hologram and to produce a distortion-free image, given the intended display illumination.

According to another embodiment the image data is transformed in order to produce a distortion free image and the recording reference beam within the printer is adjusted preferably two-dimensionally in order to optimize the final viewing window of the hologram and to maximize angular image resolution, given the intended display illumination.

According to another embodiment the image data is transformed in order to produce a distortion free image and the recording reference beam within the printer is adjusted preferably two-dimensionally in order to optimize the final viewing window of the hologram, to maximize angular image resolution and/or to minimize chromatic discoloration, given the intended display illumination.

According to another embodiment only one single set of numerical index rules is formulated and applied to convert raw image data into data required by the printer SLM(s), the set integrating the basic data reordering required for 1-step holograms with correction for each of a variety of geometrically distorting effects.

According to another embodiment the intrinsic chromatic discoloration of a 1-step hologram, arising when the recording and replay geometries differ, is corrected for by numerical transformation of the image data.

BRIEF DESCRIPTION OF THE DRAWINGS

Various embodiments of the present invention together with other arrangements given for illustrative purposes only will now be described, by way of example only, and with reference to the accompanying drawings in which.

DESCRIPTION OF THE INVENTION

WO01/45943 and WO01/42861 disclose a dual-mode holographic printer based on pulsed laser technology and WO01/29487 and WO02/29500 disclose a multiple-colour pulsed laser which may be employed in the holographic printer. The known holographic printer is capable of producing either final 1-step holograms or H1 master holograms for H2 transfer. Holograms can be either of the reflection or transmission type. They may have full or limited parallax. They may be monochrome, rainbow or full-colour. The printing speed of the printer is several orders of magnitude greater than other known holographic printers. In addition it is compact and hologram quality is independent of external environmental noise.

Figure 1:
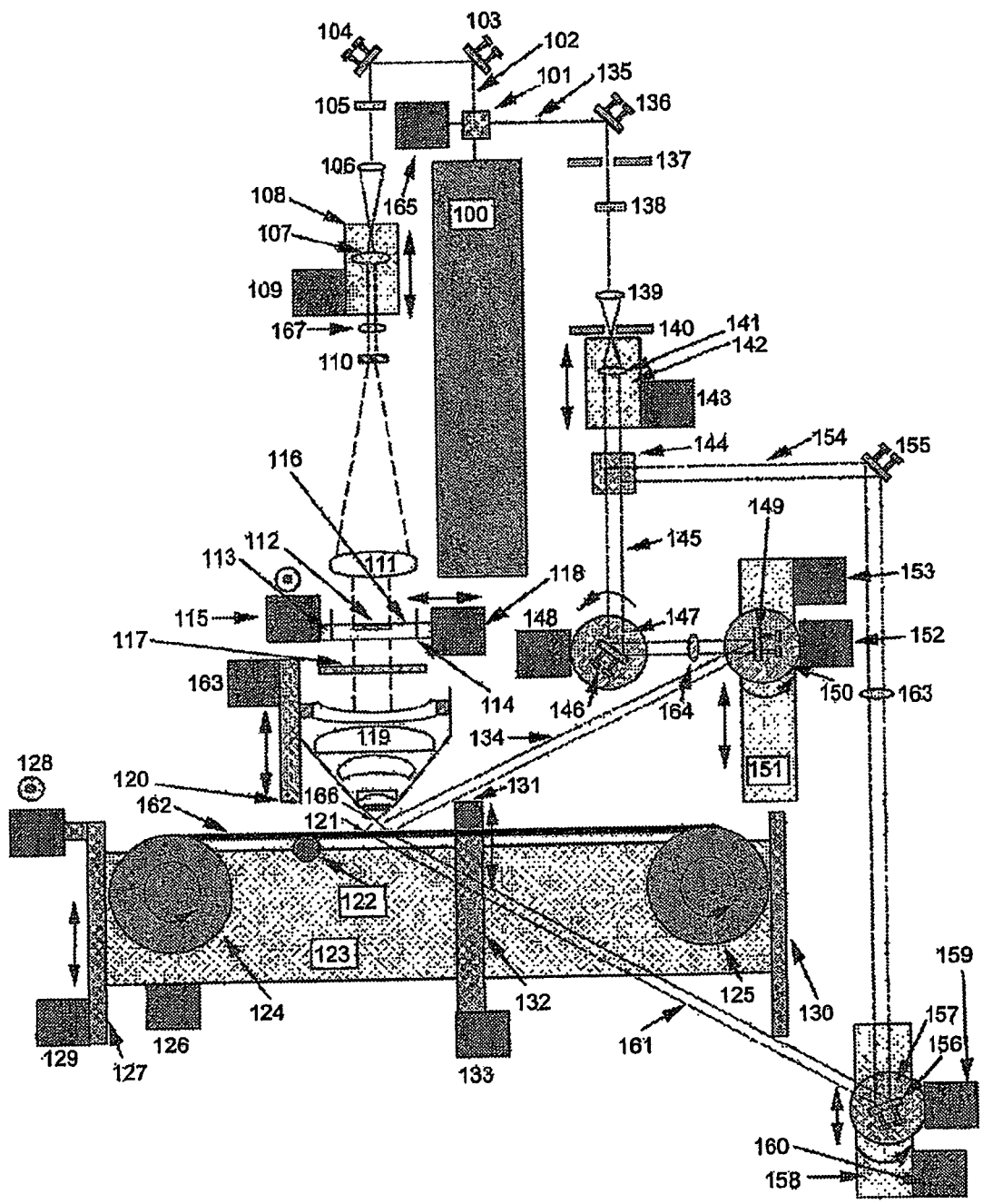
FIG. 1 illustrates a plan view of a known holographic printer.

In order to understand the application of the present invention the salient features of the known holographic printer will now be reviewed. For simplicity and clarity the case of a single monochromatic laser will be considered. FIG. 1 shows an overhead view of the known holographic printer. A single colour single-frequency pulsed laser 100 capable of rapid operation (typically 20 Hz) and having sufficient temporal coherence emits a beam of coherent light which is split by a variable beamsplitter 101. The beam 102 continues to the mirror 103 whereupon it is diverted to the mirror 104 whereupon it is diverted to the waveplate 105 which controls the polarization of the beam. The beam continues to a telescope comprising lenses 106, 107 and 167. Lens 107 is mounted on a motorized translation stage 108 with motor 109. The diameter of the beam exiting from optic 107 is thus controlled and approximately collimated. The beam passes to the micro-lens array 110 which expands it onto the collimating lens assembly 111. The distance between the elements 110 and 111 is chosen to be the effective focal length of the lens 111. In such a way a "collimated" beam exits the optic 111 with a controllable spatial coherence. The beam now illuminates a liquid crystal display (SLM—spatial light modulator) 112, having resolution 768×1024 pixels and lateral dimension of 26.4 mm, which is mounted on a 2-D motorized translation stage 116 having vertical control motor 115 and horizontal control motor 118. Positions of maximum SLM horizontal displacement are indicated by 113 and 114. The SLM position is adjusted when writing H1 type holograms and is used to attain a much higher resolution of final image than would otherwise be possible with the same static SLM for a given angle of view. The SLM position may also be adjusted when writing a 1-step hologram in order to maintain a particular hologram viewing window geometry.

After passing through the liquid crystal display, the beam traverses a linear polarizer that converts the SLM image from a polarization rotation image into amplitude modulation. Then the beam passes through the wide-angle objective 119 mounted on the motorized translation stage 120 with motor 163. This stage is used to control the position of the focused image of the SLM produced by the objective 119. The size of the minimum waist 166 of the object beam is controlled by the motorized stage 108 with motor 109. The object beam now comes to bear on the photosensitive material 162 here shown as film mounted on a roll/stage system. The motor 129 controls movement of the stage 123 towards and away from the position of minimum object beam waist. The rollers 124 and 125 control the horizontal movement of the film 162 in front of the object beam. The motor 128 controls the vertical movement of the film in front of the object beam. Motor 126 controls the motion of the rollers 124 and 125. Rollers 122 and 131 tension the film and control the horizontal angle that the film makes to the axial propagation vector of the object beam.

The reference beam is split from the main laser beam by the variable beamsplitter 101 controlled by motor 165. The beam 135 is directed to a mirror 136 whereupon it is reflected through an quasi-elliptical or rectangular aperture 137, an effective image of which is eventually created at the intersection of the reference beam with the holographic recording material, such quasi-elliptical or rectangular shape producing a defined circular or quasi-elliptical or rectangular reference footprint on the recording material as may be required by the type of hologram being written. The reference beam continues to the waveplate 138 which controls the polarization of the laser beam. The elements 139 and 141 with either 164 or 163 form a telescope that controls the size of the beam after 164/163 which is adjustable by the motorized stage 142 with motor 143. The beamsplitter switch 144 either directs the reference beam on the path 154 or onto the path 145. Path 145 is used to create transmission holograms whereas path 154 is used to create reflection holograms.

In the case of path 145 the reference beam passes through the lens 164 that produces an approximate image of the aperture 137 at the recording material surface. This lens also corrects for the slight divergence of the light produced by the lens 141. The divergence of the light after 164, which is ideally collimated, is thus controlled to within diffraction limits. Practically this means that for small reference beam size the beam will not be exactly collimated but that such departure from collimation will lead to an image blurring significantly less than that induced by the source size of the final hologram illumination source. Mirrors 146 and 149 now direct the reference beam onto its target to intersect the object beam at the surface of the holographic recording material. Motorized rotation stages 147 and 150 with motors 148 and 152 respectively and the linear translation stage 151 with motor 153 assure that different reference angles may be achieved for different placements and orientations of the recording material.

In the case of path 154 the reference beam passes through the lens 163 that produces an approximate image of the aperture 137 at the recording material surface. This lens also corrects for the slight divergence of the light produced by the lens 141. The divergence of the light after 163, which is ideally collimated, is thus controlled to within diffraction limits as above. Mirrors 155 and 156 now direct the reference beam onto its target to intersect the object beam at the surface of the holographic recording material, this time from the opposite side to the object beam. The motorized rotation stage with motor 159 and the linear translation stage 158 with motor 160 assure that different reference angles may be achieved for different placements and orientations of the recording material.

Figure 2:
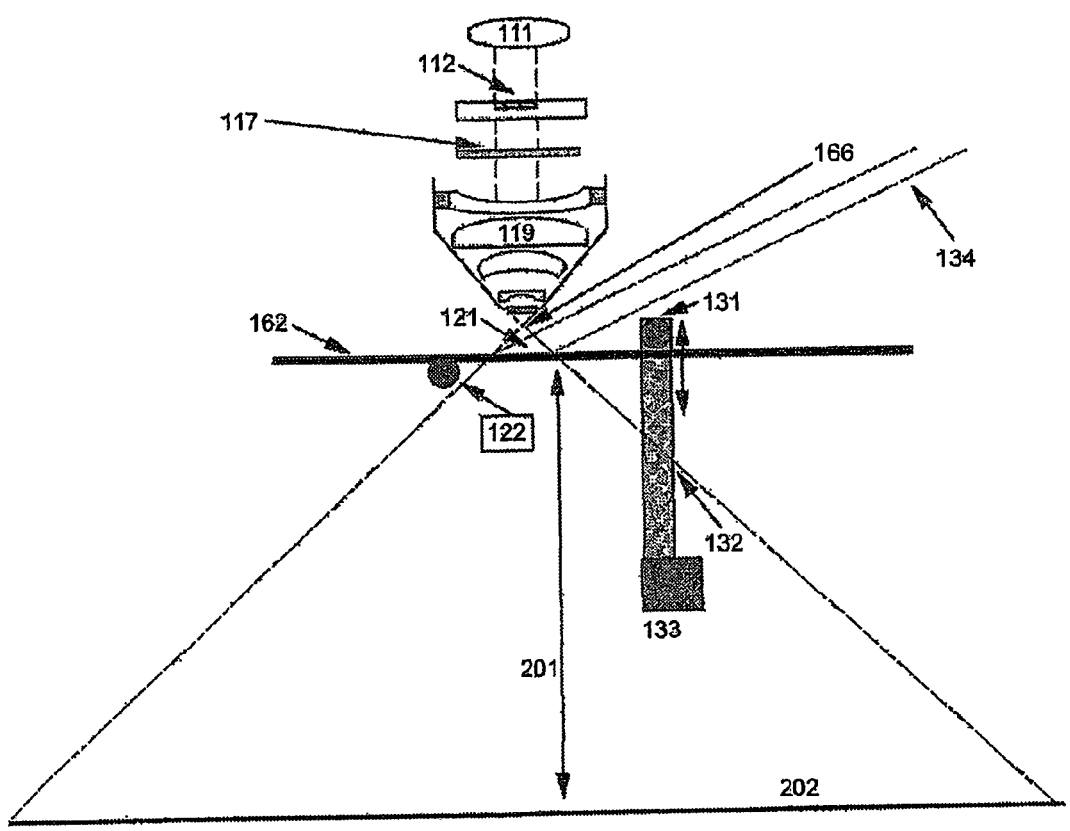
FIG. 2 illustrates the known holographic printer working in an H1 master writing mode for the case of a transmission H1 hologram.

The known holographic printer can function in a variety of different modes. FIG. 2 shows a diagram of the system in H1 transmission mode. Note that the reference beam comes in towards the recording material from the same side as the object beam to form a holographic pixel 121. Note also that this pixel is significantly displaced from the point of minimum waist 166. The image of the SLM 112 is located at a distance 201 from the recording material 162 and as such a screen placed at 202 would show a sharply focused image of each 2-D picture loaded into the SLM 112. The plane 202 usually corresponds to the H2 plane in a transfer geometry.

Figure 3:
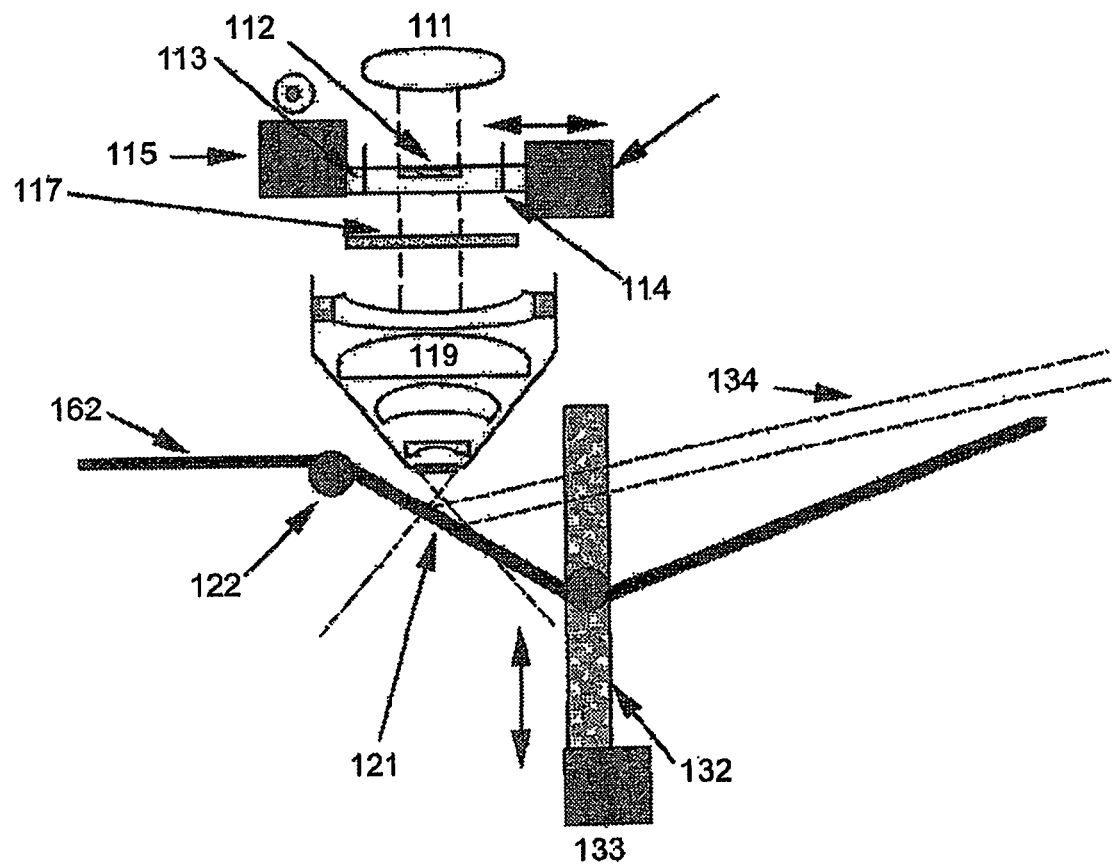
FIG. 3 illustrates the known holographic printer working in an H1 master writing mode for the case that the holographic recording material is orientated at the achromatic angle.
Figure 4:
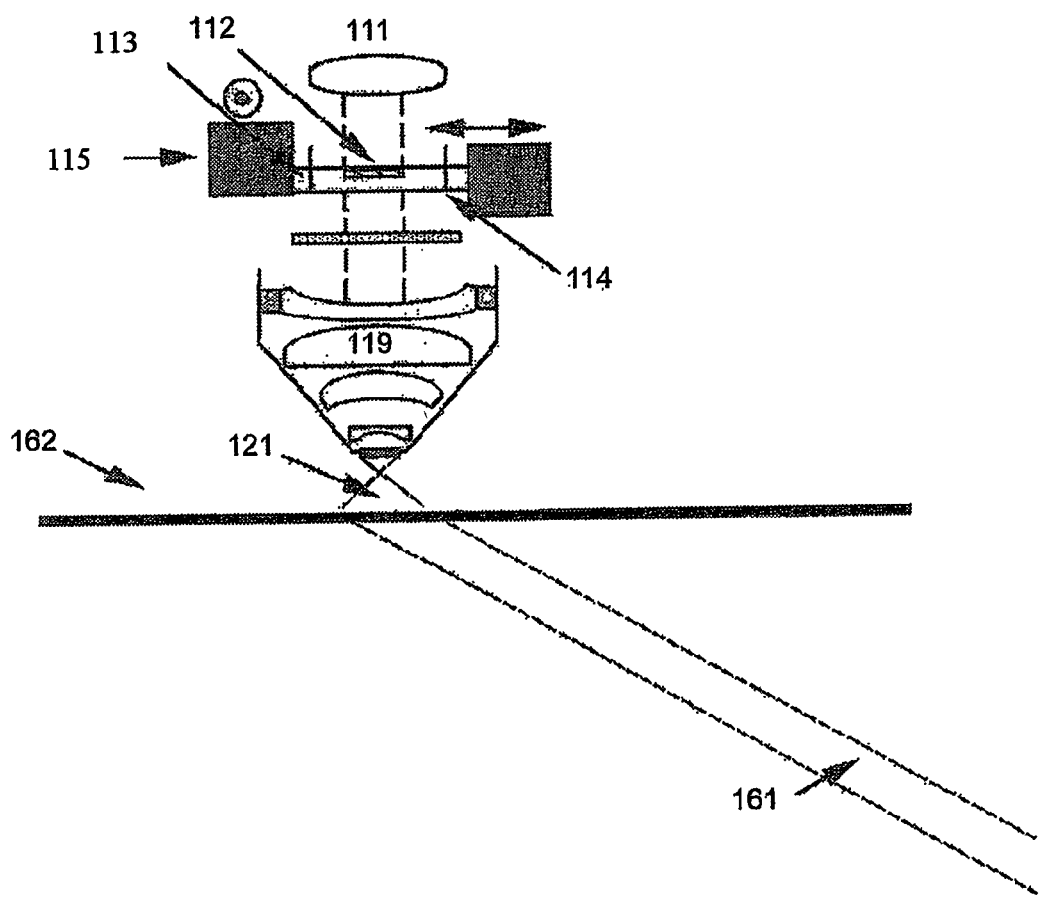
FIG. 4 illustrates the known holographic printer working in an H1 master writing mode for the case of a reflection H1 hologram.
Figure 5:
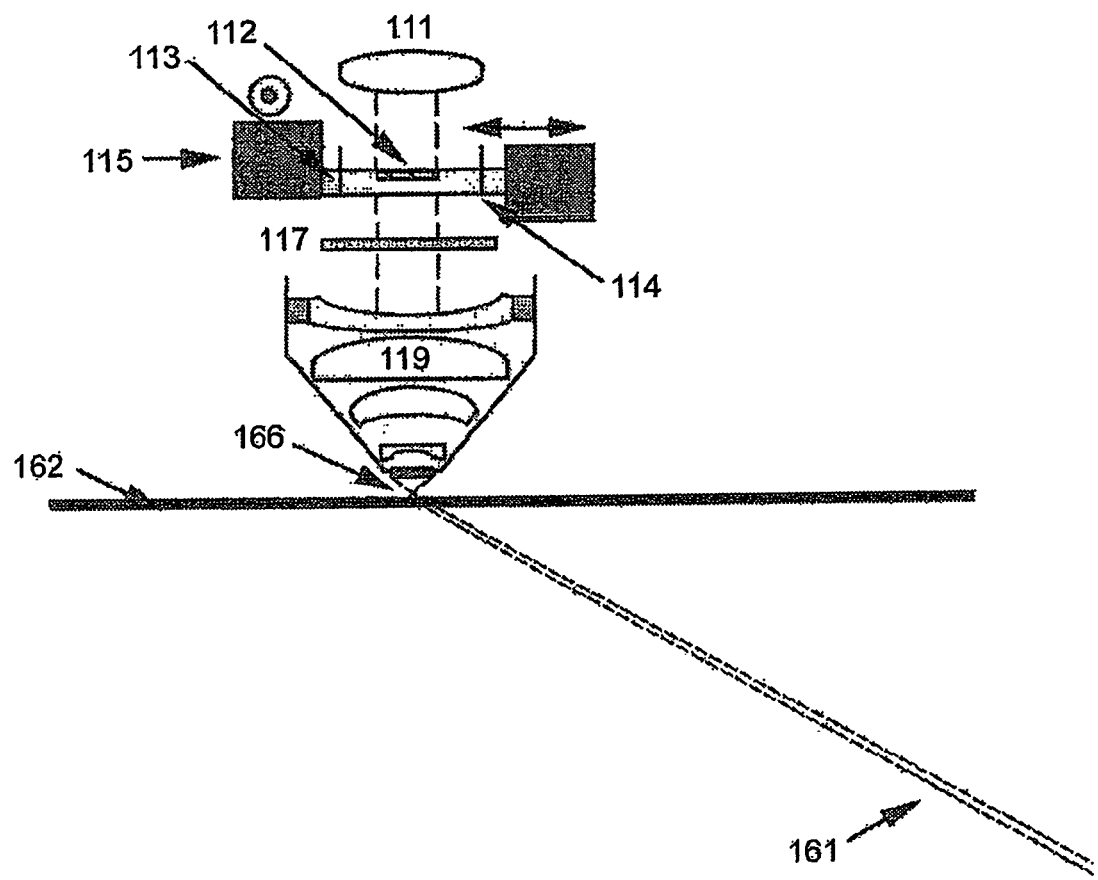
FIG. 5 illustrates the known holographic printer working in direct (1-step) writing mode for the case of a reflection hologram.
Figure 6:
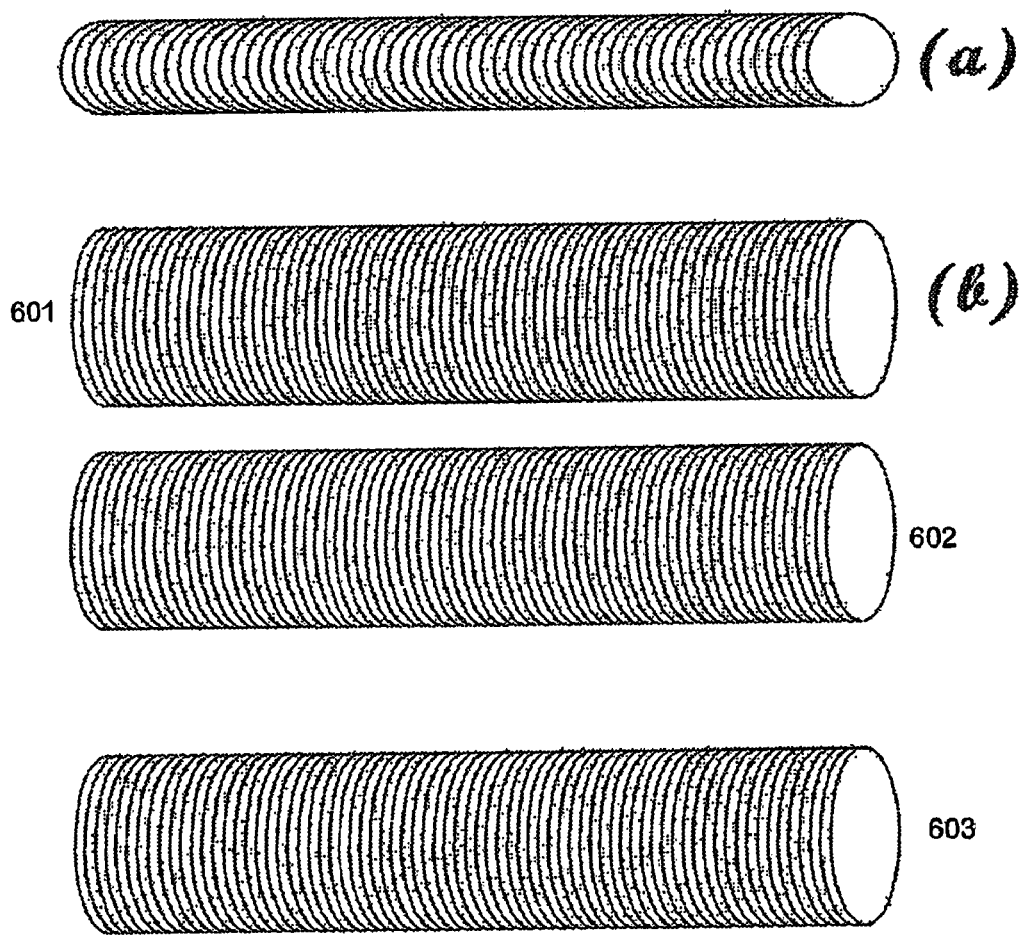
FIG. 6(a) illustrates the overlapping object beam density pattern recorded on the holographic material typical of an H1 master hologram written for the creation of a rainbow hologram by conventional transfer with each circle containing the perspective information for a certain viewpoint.
FIG. 6(b) illustrates the overlapping object beam density pattern recorded on the holographic material typical of an H1 master hologram written for the creation of a full-colour rainbow hologram by conventional transfer with each ellipse containing the perspective information for a certain viewpoint, the three rows representing the three primary colour separations.
Figure 7:
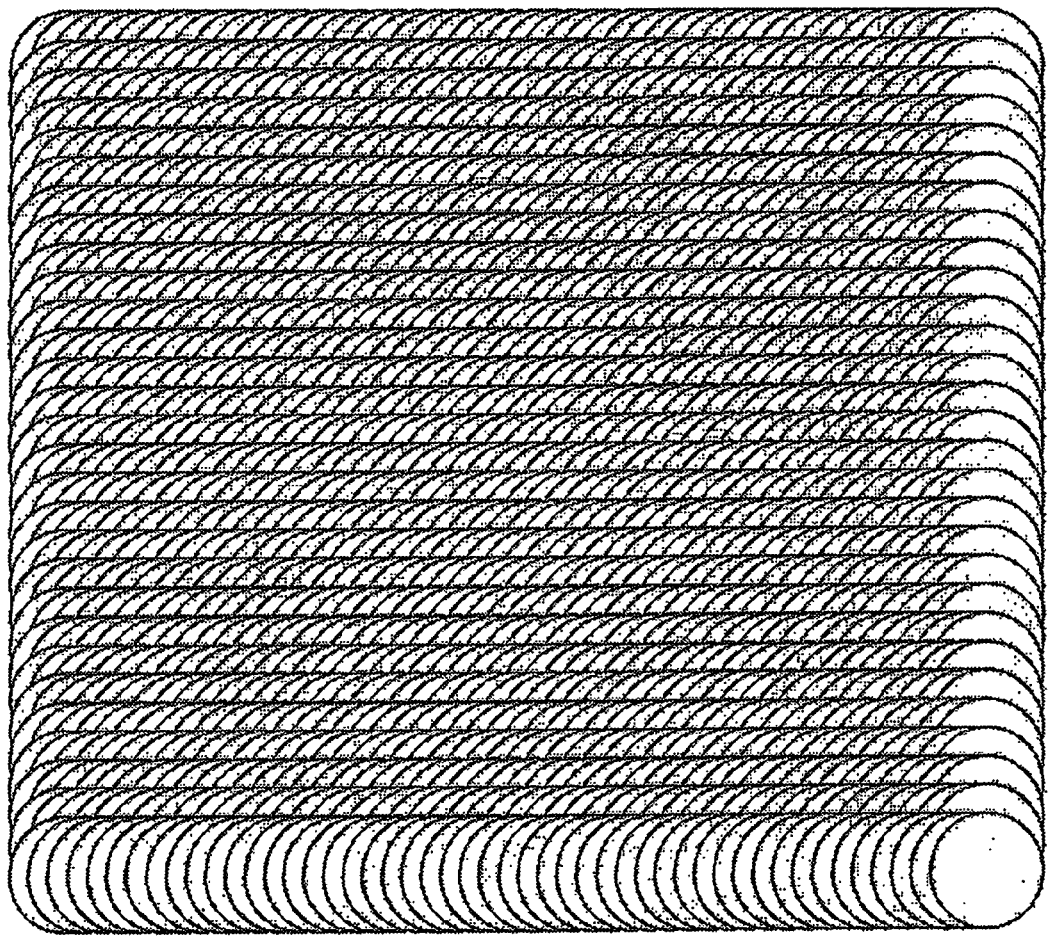
FIG. 7 illustrates the overlapping object beam density pattern recorded on the holographic material typical of an H1 full aperture master hologram written for the creation of a mono or full colour reflection hologram by conventional transfer with each circle containing the perspective information from a certain point in space as shown in FIG. 9.
Figure 8:
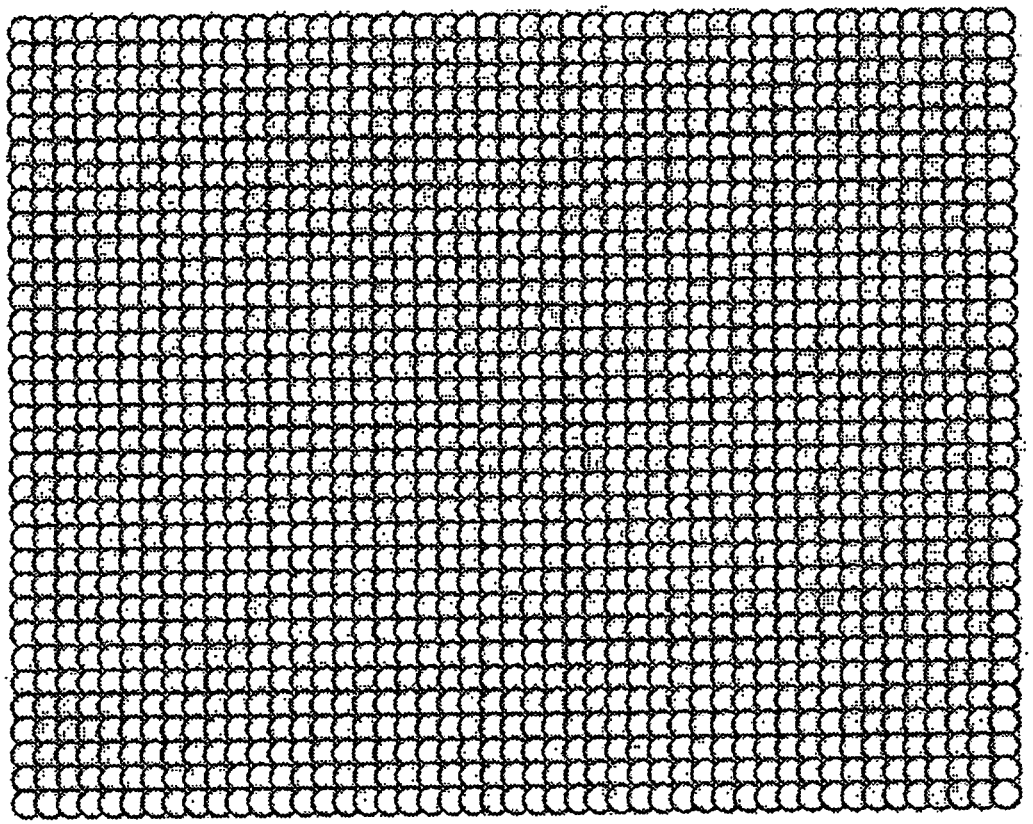
FIG. 8 illustrates the object beam density pattern recorded on the holographic material typical of a directly written (1-step) hologram with each circle containing the directional and amplitude information of light originating from that point that constitutes the 3-D image.

In order to record an H1 transmission hologram perspective views of a real or computer generated object are loaded into the SLM one by one, a holographic pixel recorded, the recording material advanced and the process repeated for each image. For the case of the generation of a rainbow transmission master hologram a line of pixels is written onto the holographic recording material as illustrated in FIG. 6(a). Each circle represents an interference pattern containing information about a certain perspective view along a horizontal viewing line. FIG. 6(b) illustrates the case pertaining to the generation of an RGB rainbow hologram master where three lines of pixels are written at the achromatic angle each line corresponding to a red, green or blue component image in the axial viewing position of the final hologram. The recording geometry for FIG. 6(b) is shown in FIG. 3. In order to record an H1 transmission hologram suitable for the generation of a white-light reflection hologram a grid a pixels having different vertical and horizontal packing densities is written as shown in FIG. 7. If a reflection type master hologram is required then the system is configured to the state shown in FIG. 4. In order to write a direct one-step reflection hologram, the basic image data is mathematically transformed according to special pixel-swapping rules, the system is configured as shown in FIG. 5, and pixels are written as shown in FIG. 8.

Figure 9:
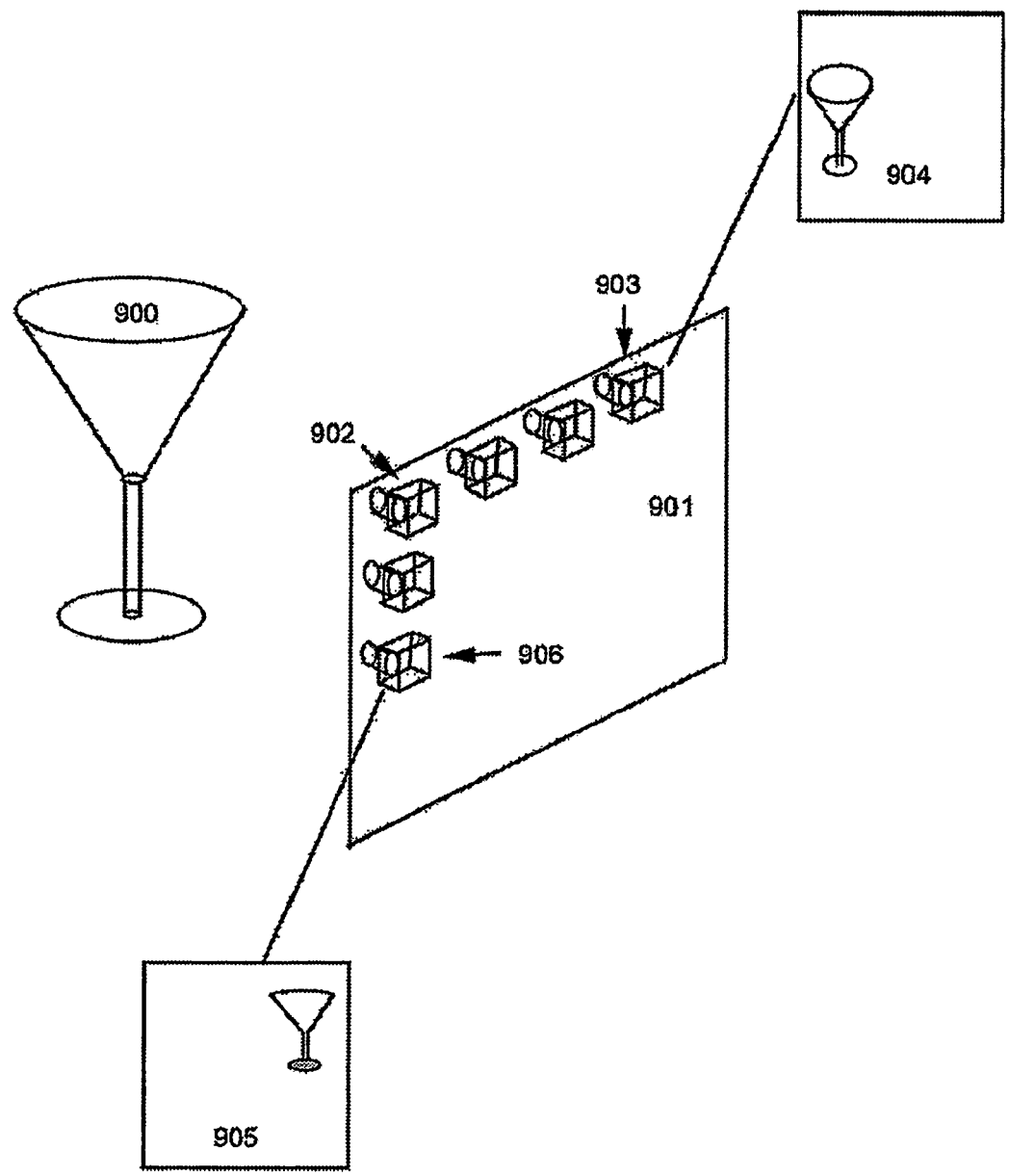
FIG. 9 illustrates the process of acquiring data from a series of sequential camera shots that can be used to generate the holograms—the diagram is also used to represent a computer model of an object where a viewing (or camera) plane is defined on which perspective views are generated.

Turning now to consider the preferred embodiment of the present invention, in one embodiment a computer is used to generate a three dimensional model of an object using a standard commercial computer program. Current computer programs can produce very lifelike models using a variety of sophisticated rendering processes that mimic real life effects. In addition advances in computer technology have now seen the calculation times, required for such programs to run, dramatically decreased. Three dimensional scanners using Moiré or other principles now permit the incorporation of real world 3-D images in such computer models. The storage memory required for such 3-D models is largely dependent on the texture maps used therein and hence computer files representing such 3-D models are usually relatively small and may be transmitted over the internet easily. In the preferred embodiment of the invention we use such 3-D computer models to generate a series of 2-D camera views from a virtual viewing plane as shown in FIG. 9. Here the viewing plane is labeled 901 and individual 2-D perspective camera images, such as 905 and 904, of the computer represented object 900 are generated at multiple locations on the viewing plane such as 902 and 903. The spacing and density of such 2-D views are generally controlled according to the information required for a certain type of hologram but in one embodiment they form a regular 2-D matrix and in another a regular horizontal 1-D array.

In another embodiment of the invention a real model is used instead of a computer representation and a real camera is employed to record individual photographs (either digitally or via photographic film that is subsequently digitized). In such a case FIG. 9 should be interpreted in the following fashion. Object 900 represents the object to be holographed. 901 represents the plane on which a camera 902 is positioned. Photographs of the object 900 are taken at a variety of positions on this plane. For example the view position 906 yields the photograph 905 and the view position 903 yields the photograph 904. Generally some mechanism is used to transport a camera from position to position in a sequential fashion often using a 1 or 2 dimensional translation stage to accomplish this. As before, the spacing and density of such 2-D views are generally controlled according to the information required for a certain type of hologram but in one embodiment they form a regular 2-D matrix and in another a regular horizontal 1-D array.

In both of the above cases restricted animation, which may be transferred to the final hologram, may be modeled by arranging that the model 900 moves in a defined sense (representing such animation) as different camera positions are selected on the plane 901, such camera positions following sequential monotonic trajectories on the plane. On observing the final hologram, an observer following such sequential monotonic trajectory in the observation space will perceive the animation.

Mathematical Definition of the 3-D Image Data

The preferred embodiment works by defining a set of 2-D views of a real or computer represented object 900 (FIG. 9) on a certain viewing plane 901 (for each of several colours) and processing such views digitally to generate data (e.g. 904, 905) that may then be displayed on spatial light modulators within the printing device described above.

Figure 10:
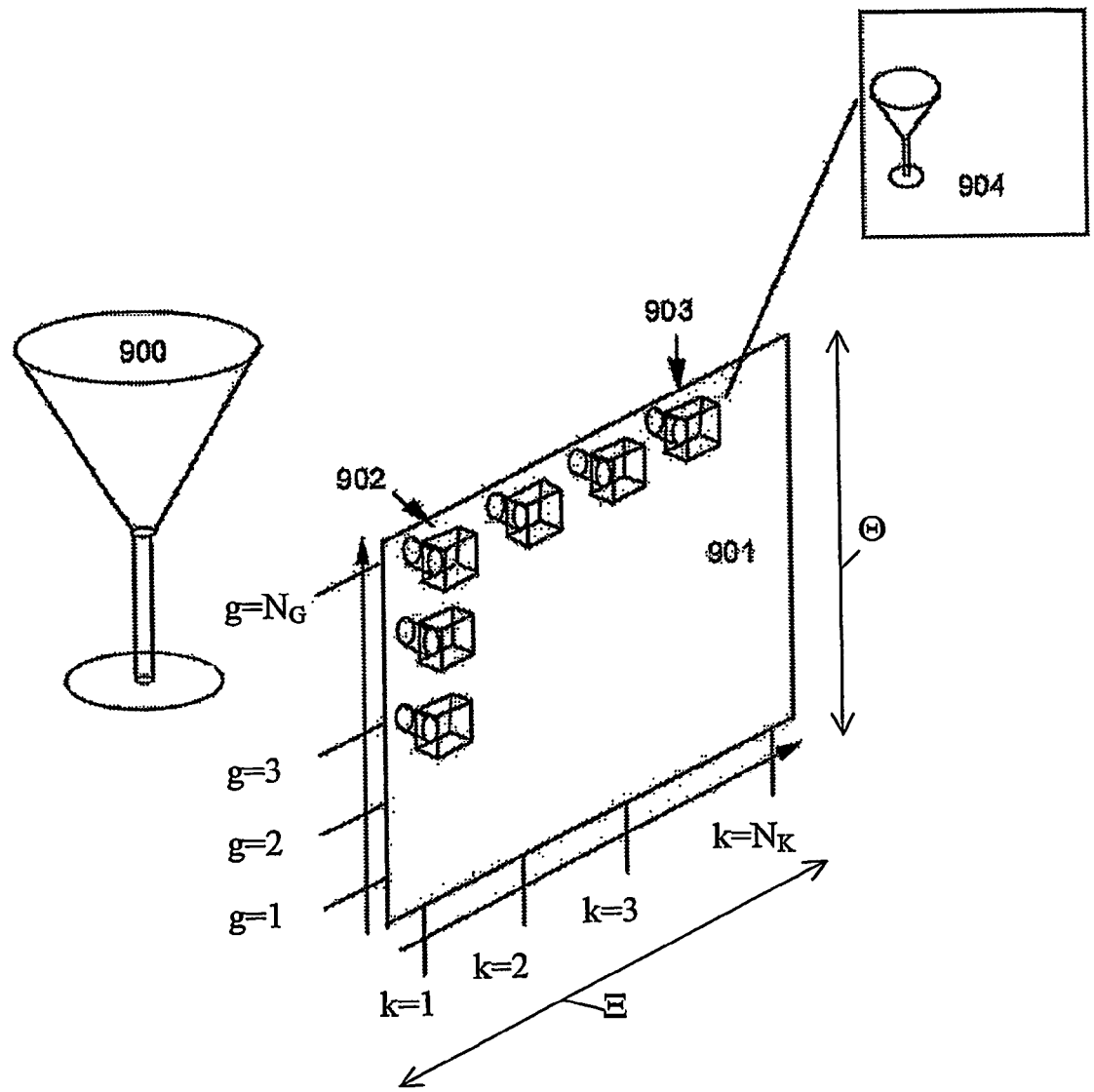
FIG. 10 illustrates the recording of various perspective views of an object or virtual object and the mathematical discretization of the camera tracking plane.

With reference to FIG. 10, which shows the object 900 being digitally photographed, let us define the Cartesian coordinates $\xi$ and $\zeta$ to represent respectively the x and y directions on the camera plane 901. We define the origin of this coordinate system as the bottom left hand corner of 901. Now let us further discretize the plane 901 as follows:

$$\xi = (k-1)\frac{\Xi}{(N_K - 1)}, \qquad k = 1, \ldots, N_K \qquad (1)$$

$$\zeta = (g-1)\frac{\Theta}{(N_G - 1)}, \qquad g = 1, \ldots, N_G \qquad (2)$$

where the integers k and g label perspective view locations on 901. A grid of ($N_K \times N_G$) perspective views is thus envisaged to cover the plane 901 which has dimensions $\Xi \times \Theta$.

Figure 11:
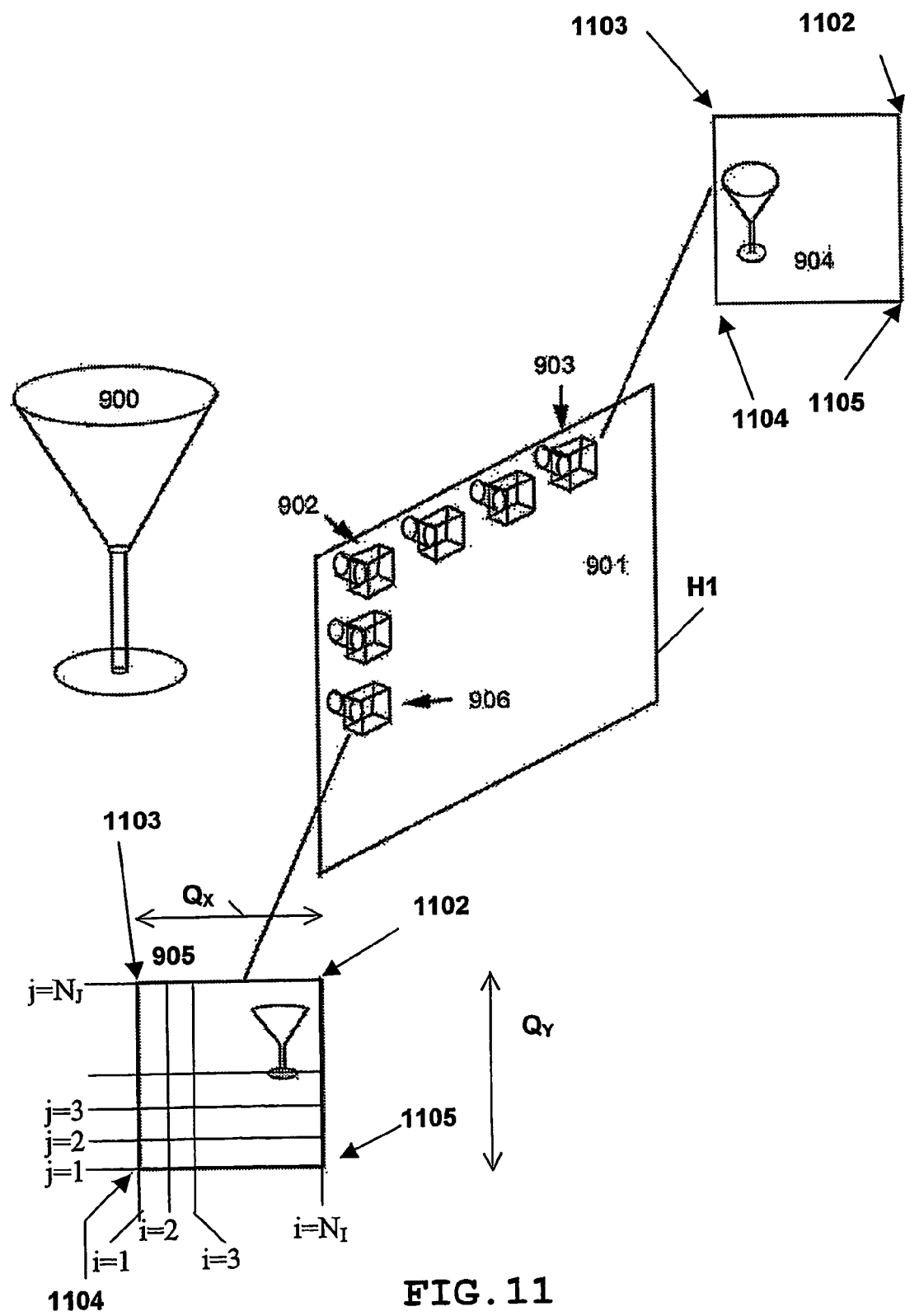
FIG. 11 illustrates the mathematical discretization of each camera shot.

With reference to FIG. 11 let us now define the Cartesian coordinates x and y to describe each perspective view of size $Q_X \times Q_Y$ (e.g. 904, 905). Again we use an origin at the bottom left-hand corner and discretize as above:

$$x = (i-1)\frac{Q_X}{(N_I - 1)}, \qquad i = 1, \ldots, N_I \tag{3}$$

$$y = (j-1)\frac{Q_Y}{(N_J - 1)}, \qquad j = 1, \ldots, N_J \tag{4}$$

A grid of ($N_I \times N_J$) pixels is thus envisaged to cover each perspective view with each such view having dimensions of $Q_X \times Q_Y$. It is useful to project the "perspective-view" plane (904 & 905 etc of FIG. 11) onto the hologram plane (1201 in FIG. 12).

In the case that we wish to model a full-parallax 3-D scene we define the luminous intensity tensor $^{kg}I_{ij}$. This tensor represents the totality of information describing the 3-D scene. It can either be provided by multiple photographic data or as the output of a standard commercial 3-D modeling program. In the case of horizontal parallax holograms the index g is fixed and we define the luminous intensity tensor as simply $^{k}I_{ij}$.

Mathematical Definition of the Hologram

Figure 12:
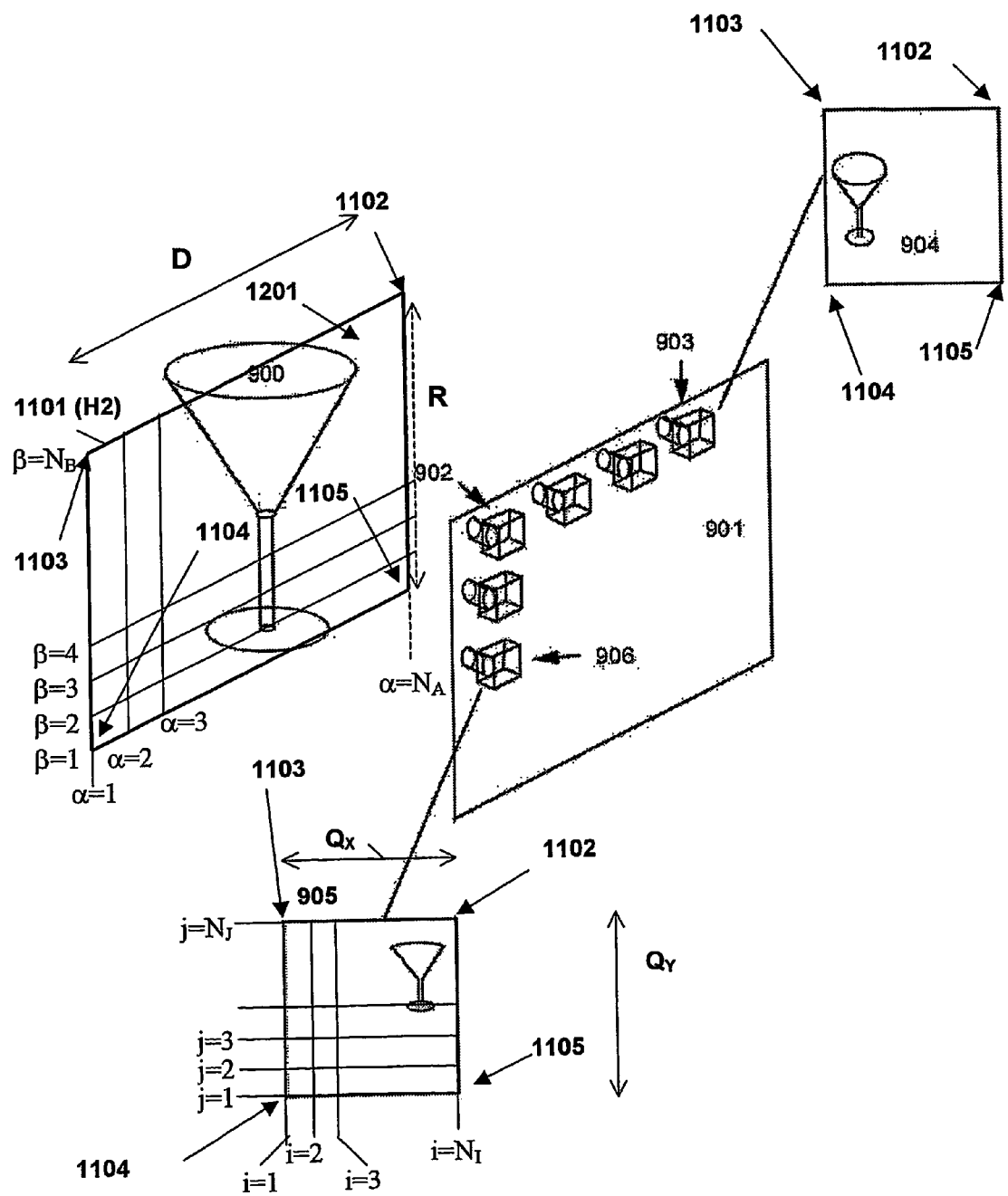
FIG. 12 illustrates the mathematical discretization of the hologram.

FIG. 12 shows the hologram 1201, that we wish to generate, of the 3D object 900. The viewing plane of this hologram is now represented by 901 and individual viewing locations by, for example, 903 and 906. Clearly we wish to arrange that when a viewer places his eye at 906 he will see the image 905. Conversely when the viewer places his eye at 903 he should see the image 904.

The hologram that will be written is composed of many individual holopixels (FIG. 12), the location of which is described by the Cartesian coordinates(X, Y). As before the following notation will be adopted:

$$X = (\alpha - 1)\frac{D}{N_A - 1}, \qquad \alpha = 1, \ldots, N_A \tag{5}$$

$$Y = (\beta - 1)\frac{R}{N_B - 1}, \qquad \beta = 1, \ldots, N_B \tag{6}$$

where D represents the hologram (horizontal) width and R the hologram height.

Let us now imagine a viewing plane which is geometrically coincident with the camera plane, situated at a distance H from the hologram and laterally centred. In this case the Cartesian coordinates ($\xi, \zeta$) that have been defined above may be used for both the treatment of the viewing plane and the camera plane.

In the case of horizontal parallax holograms, the view of the hologram is the same irrespective of the vertical position bar a simple image shift. In this case a line may be defined, which we will call the camera line, which is horizontal and which is vertically centred in the viewing plane. If an H1 hologram were being written, this line would coincide exactly with the physical strip-master. Our computer model would then supply us with $N_K$ discrete views at regular intervals along this line. The variable $\zeta$ would no longer be needed and the distance $\xi$ from the LHS of the camera line to a given camera view would be given by equation 1.

We now assume that all optical distortion is absent from the printer objective. This enables us to establish the required formalism for the paraxial case. Later we will then generalize our mathematics to the non-paraxial finite-distortion case.

Figure 13:
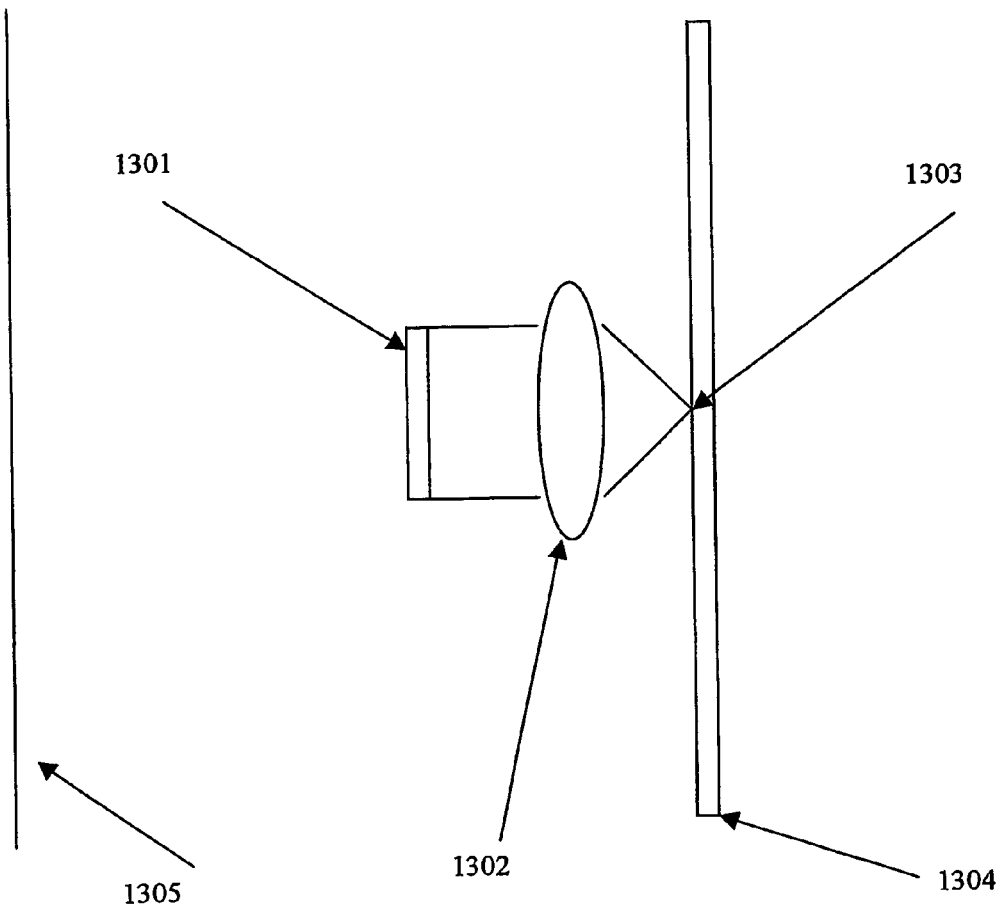
FIG. 13 illustrates the simplified recording scheme (seen from top) by which a hologram is written.

FIG. 13 shows a simplified diagram of how we intend to write the hologram, pixel by pixel. Data is written to an SLM (1301). A laser beam illuminates this SLM and is then focused by the objective 1302 to the holopixel 1303 on the hologram 1304 (reference beam not shown). Since the objective (1302) is paraxial we can, without loss of generality, project the SLM plane (1301) onto the camera/viewing plane (1305) exactly in the same fashion as we projected the perspective view plane onto the hologram plane above. We thus define the location of a pixel on the SLM by its (projected) x and y Cartesian coordinates (u, v) on the viewing plane where $$u = (\mu - 1)\frac{\Pi}{N_M - 1}, \qquad \mu = 1, \ldots, N_M \tag{7}$$

$$v = (\nu - 1)\frac{\Sigma}{N_V - 1}, \qquad \nu = 1, \ldots, N_V \tag{8}$$

The parameters $\Pi$ and $\Sigma$ effectively define respectively the horizontal and vertical fields of view (FOV) of the printer writing head. The objective optics are almost always circularly symmetric but when combined with an SLM unit, we obtain different FOVs in the horizontal and vertical directions. The paraxial printer FOVs are related to the parameters $\Pi$ and $\Sigma$ by the following relations:

$$\Psi_{PH} = 2\tan^{-1}\left\{\frac{\Pi}{2H}\right\} \tag{8a}$$

$$\Psi_{PV} = 2\tan^{-1}\left\{\frac{\Sigma}{2H}\right\}$$

Here the subscript P refers to "Printer" and the subscripts "H" and "V" refer respectively to horizontal and vertical. The parameter H, as discussed above, is the distance between the hologram and the viewing/camera plane.

To recapitulate, in the case of a full parallax hologram our computer data will consist of $N_K \times N_G$ perspective views of the required hologram image. Generally we will express this information as $N_K \times N_G$ intensity matrices or by using the simple intensity tensor $^{kg}I_{ij}$, which gives the intensity distribution, I, at the camera view pixel (i, j) for the horizontal camera position k and the vertical camera position g. In the case of a single (horizontal) parallax hologram our computer model will consist of $^{k}I_{ij}$. Ultimately we wish to calculate the data that must be written to the SLM(s) which we refer to as the paraxial mask file intensity distributions and which we will denote in tensor form as $^{\mu\nu}S_{\alpha\beta}$.

Single Parallax Monochrome Reflection Hologram with Static SLM

There are several choices as to how physically a single parallax direct write hologram may be written. Firstly, we may decide to keep the SLM static or we may use an objective having a larger entrance pupil and opt to move the SLM within this pupil. Secondly various formats of computer data that effectively correspond to different (virtual) camera geometries may be used. A simple translating camera will produce a different intensity tensor $^{k}I_{ij}$ than a specially programmed camera for example. Finally, different viewing window geometries may be selected. If we elect to use the full FOV of the objective when writing each holopixel then we will have a different result than if we constrain our viewing window to be a well-defined rectangle.

All the above choices must be made according to the specific application at hand. In the following sections we will treat the most important major cases and derive for each geometry the pixel-swapping (or interpolatory) transformations necessary to convert the single parallax perspective tensor $^kI_{ij}$ into the mask tensor $^{\mu\nu}S_{\alpha\beta}$.

Figure 14A:
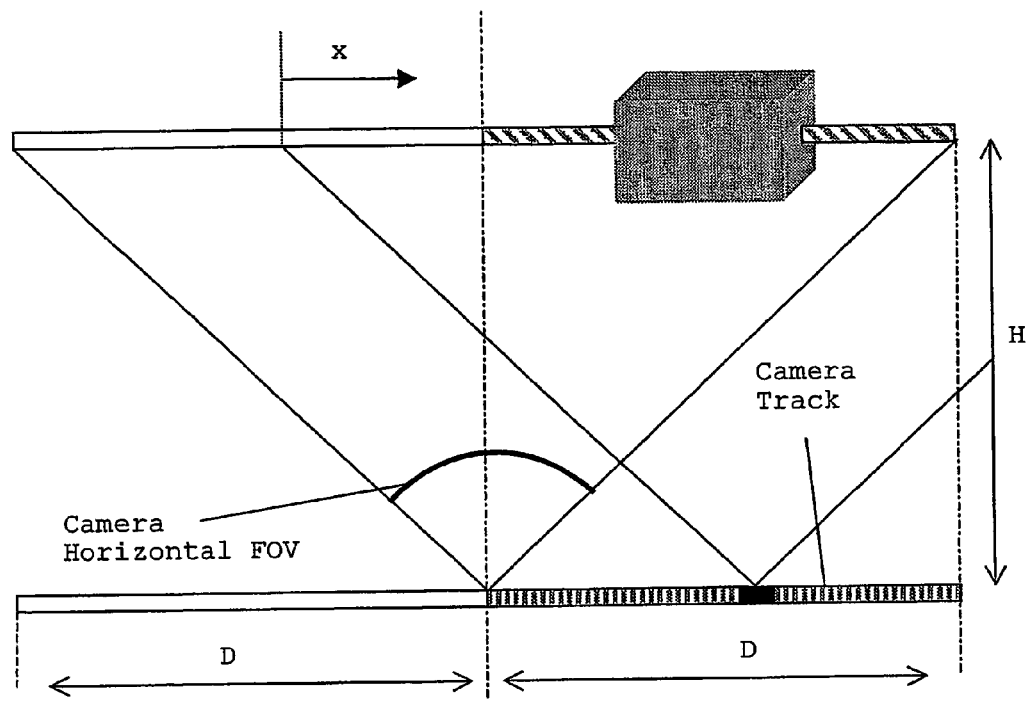
FIG. 14a illustrates the recording geometry (single parallax) for a translating camera that is always pointing forwards and of fixed field of view (FOV)
Figure 14B:
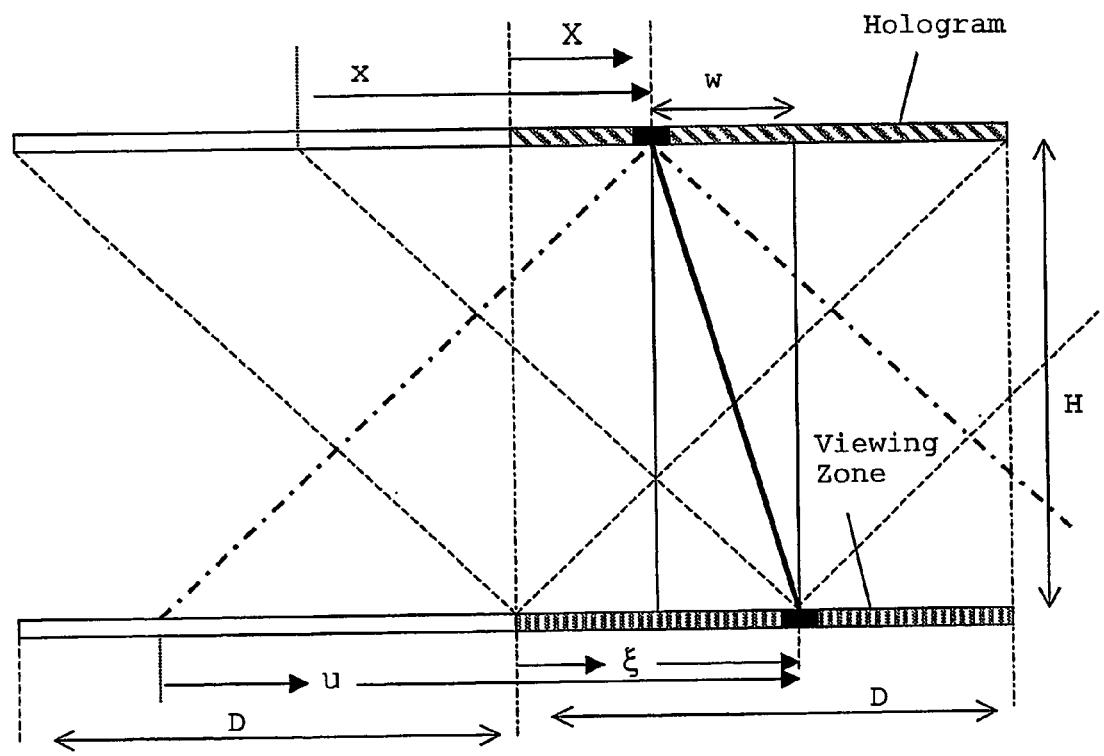
FIG. 14b illustrates the hologram geometry (seen from top) for a fixed viewing window that is equal in shape and size to the actual hologram (simple translating camera, fixed SLM, single parallax)

Non-Centred Image with Fixed Rectangular Viewing Window of Same Size as Hologram In this section a computer model, $^kI_{ij}$, will be assumed. This model has been derived by a simple translating camera which follows a horizontal trajectory through the mid-point of the hologram viewing plane (when one interchanges the hologram+viewing plane for the virtual object+camera plane—see FIG. 14a). The viewing zone of the hologram is now defined to be geometrically identical to the actual hologram and thus constitutes a rectangle having horizontal dimension D and vertical dimension R (FIG. 14b). Hence $\Xi = D$.

The viewing window is laterally displaced from the hologram by a distance H and hence the camera track is also laterally displaced from the virtual object by this same distance H. The (virtual) camera FOV ($\Psi_{CH}$) is now chosen such that the rectangular view of the camera at a distance H is of width 2D. Therefore, when positioned at the extreme LHS of the viewing line, the camera's view will just extend to the extreme RHS of the hologram and visa-versa as shown in FIG. 14b. So too the horizontal FOV of the printer write-head ($\Psi_{PH}$) is chosen to be the same as the horizontal camera FOV ($\Psi_{CH}$). Mathematically, $$Q = \Pi = 2D, \quad Q_Y = R \quad \text{and} \quad \Psi_{CH} = \Psi_{PH} = 2\tan^{-1}\left\{\frac{D}{H}\right\}.$$

Since the hologram is single-parallax the vertical camera FOV is chosen as $$\Psi_{CV} = 2\tan^{-1}\left\{\frac{R}{2H}\right\}$$

and the printer FOV is chosen as in equation 8a.

Now, at the holopixel defined by (X,Y) (see FIG. 14b) it can be seen that the SLM horizontal pixel coordinate is defined by u=D+w for the indicated ray. To find the corresponding intensity information from the virtual camera perspective views we need to look up that perspective view corresponding to $\xi = X+w$ and to select the horizontal (perspective view) pixel coordinate defined by x=D−w in this particular view. Clearly we will select the vertical coordinate by requiring that y=Y. Therefore $$u = D + w = (\mu - 1)\frac{2D}{N_M - 1} \tag{9}$$

from whence it is trivial to see that $$w = (\mu - 1)\frac{2D}{N_M - 1} - D \tag{10}$$

Also from this equation and the relation $\xi = X+w$ it follows that $$(k-1)\frac{D}{N_K - 1} = (\alpha - 1)\frac{D}{N_A - 1} + (\mu - 1)\frac{2D}{N_M - 1} - D \tag{11}$$

which simplifies to $$k = \frac{(\alpha - 1)(N_K - 1)}{(N_A - 1)} + \frac{2(\mu - 1)(N_K - 1)}{(N_M - 1)} - N_K + 2 \tag{12}$$

This equation states that the ray defined by the mask file index $\mu$ and emanating from the holopixel whose index coordinates are $(\alpha,\beta)$ intersects with the camera view defined by the index k as given in this expression. To understand which pixel in the perspective view file this ray corresponds to we use the relation X=D−w derived above from whence it is seen that $$(i-1)\frac{2D}{N_I - 1} = D - (\mu - 1)\frac{2D}{N_M - 1} + D \tag{13}$$

$$= -(\mu - 1)\frac{2D}{N_M - 1} + 2D$$

or more simply $$i = N_I - \frac{(\mu - 1)(N_I - 1)}{N_M - 1} \tag{14}$$

Finally, from the equation y=Y it follows that $$(j-1)\frac{R}{N_J - 1} = (\beta - 1)\frac{R}{N_B - 1} \tag{15}$$

or more simply $$j = \frac{(\beta - 1)(N_J - 1)}{N_B - 1} + 1 \tag{16}$$

If we wish to limit the vertical FOV of the hologram as a function of the holopixel coordinate Y such as to create a viewing window of exactly the same dimensions as the actual hologram then we will have to impose the condition that $$^{\mu\nu}S_{\alpha\beta} = {}^kI_{ij} \quad \text{when} \quad \frac{\Sigma}{2} - Y \le v \le \frac{\Sigma}{2} - Y + R \tag{17}$$
$$= 0 \quad \text{otherwise} \ (0 \equiv \text{zero brightness})$$

where, of course, $\Sigma \ge 2R$. This condition on v translates into the following condition on v:

$$\left\{\frac{1}{2} - \frac{(\beta-1)}{N_B-1}\frac{R}{\Sigma}\right\}(N_V - 1) + 1 \leq v \leq \left\{\frac{1}{2} - \frac{(\beta-1)}{N_B-1}\frac{R}{\Sigma} + \frac{R}{\Sigma}\right\}(N_V - 1) + 1 \quad (18)$$

And thus the full pixel-swapping transformation may be written as follows:

$$^{\mu\nu}S_{\alpha\beta} = {}^k I_{ij} \quad \text{when} \left\{\frac{1}{2} - \frac{(\beta-1)}{N_B-1}\frac{R}{\Sigma}\right\}(N_V - 1) + 1 \leq \quad (19)$$

$$v \leq \left\{\frac{1}{2} - \frac{(\beta-1)}{N_B-1}\frac{R}{\Sigma} + \frac{R}{\Sigma}\right\}(N_V - 1) + 1$$

$$\text{and } 0 < k \leq N_K$$

$$= 0 \quad \text{otherwise}$$

where $$k = \frac{(\alpha-1)(N_K-1)}{(N_A-1)} + \frac{2(\mu-1)(N_K-1)}{(N_M-1)} - N_K + 2, \quad (20)$$

$$i = N_I - \frac{(\mu-1)(N_I-1)}{N_M-1}, \quad (21)$$

$$j = \frac{(\beta-1)(N_J-1)}{N_B-1} + 1 \quad (22)$$

In the case that no restriction is imposed on $v$ then we have the case of a rolling vertical window with every holopixel having an identical vertical FOV given by $$\Psi_{HV} = 2\tan^{-1}\left\{\frac{\Sigma}{2H}\right\} \quad (23)$$

Note that this is the same as the paraxial (vertical) printer FOV of equation 8a $$\Psi_{PV} = 2\tan^{-1}\left\{\frac{\Sigma}{2H}\right\} \quad (23a)$$

but it is generally different from the virtual (vertical) camera FOV $$\Psi_{CV} = 2\tan^{-1}\left\{\frac{R}{2H}\right\} \quad (23b)$$

In the case of no restriction on $v$ we may write the pixel swap transformation more simply as:

$$^{\mu\nu}S_{\alpha\beta} = {}^k I_{ij} \quad \forall v \text{ when } 0 < k \leq N_K \quad (24)$$

$$= 0 \quad \text{otherwise}$$

where $$k = \frac{(\alpha-1)(N_K-1)}{(N_A-1)} + \frac{2(\mu-1)(N_K-1)}{(N_M-1)} - N_K + 2, \quad (25)$$

$$i = N_I - \frac{(\mu-1)(N_I-1)}{N_M-1}, \quad (26)$$

$$j = \frac{(\beta-1)(N_J-1)}{N_B-1} + 1 \quad (27)$$

These equations define how the digital computer model ${}^k I_{ij}$ consisting of conventional perspective views is converted into the mask file information ${}^{\mu\nu}S_{\alpha\beta}$ that is necessary to write the holopixels one by one via the SLM.

We have implicitly assumed that all the parameters i,j,k, g,$\alpha,\beta,\mu$ and $v$ are integers. Generally this does not necessarily have to be the case and the above transforms are perfectly valid if we insist on a rational representation. Indeed the transformations given above generally require, in the calculation of ${}^{\mu\nu}S_{\alpha\beta}$ with integer parameters $\alpha,\beta,\mu$ and $v$, a knowledge of ${}^k I_{ij}$ with rational values of k, i and j. Such a situation means that either a computer perspective model must be generated on a specialized mesh that leads to a uniform mesh once the data is transformed to mask space or multi-dimensional interpolation is used to calculate the values of ${}^k I_{ij}$ with the required rational values of k, i and j. Both solutions are practical and the choice of which method to use depends on the perspective model software and the computer hardware. There is, however, a third solution to the above problem where all index parameters are integers. For instance, if we choose $N_M$ to be odd and we further require $$N_K = N_A = \frac{N_M + 1}{2} \quad (28\text{-}30)$$

$$N_I = N_M$$

$$N_J = N_B$$

then it follows that the transformations given above remain closed in the integer set. In such a case simplified mask transformations may be written. For the case of a well defined rectangular viewing window we may therefore write:

$$^{\mu\nu}S_{\alpha\beta} = {}^k I_{ij} \quad \text{when} \left\{\frac{1}{2} - \frac{(\beta-1)}{N_B-1}\frac{R}{\Sigma}\right\}(N_V - 1) + 1 \leq \quad (31)$$

$$v \leq \left\{\frac{1}{2} - \frac{(\beta-1)}{N_B-1}\frac{R}{\Sigma} + \frac{R}{\Sigma}\right\}(N_V - 1) + 1$$

$$\text{and } 0 \leq k \leq N_K$$

$$= 0 \quad \text{otherwise}$$

where $$k = \mu + \alpha - N_K, \quad (32)$$

$$i = N_M - \mu + 1, \quad (33)$$

$$j = \beta \quad (34)$$

and in the case of no restriction on $v$:

$$^{\mu\nu}S_{\alpha\beta} = {}^k I_{ij} \; 0 \leq k \leq N_K = 0 \text{ otherwise} \quad (35)$$

$$\text{where } k = \mu + \alpha - N_K, \quad (36)$$

$$i = N_M - \mu + 1, \quad (37)$$

$$j = \beta \quad (38)$$

Centred Image with Fixed Rectangular Viewing Window

Figure 15:
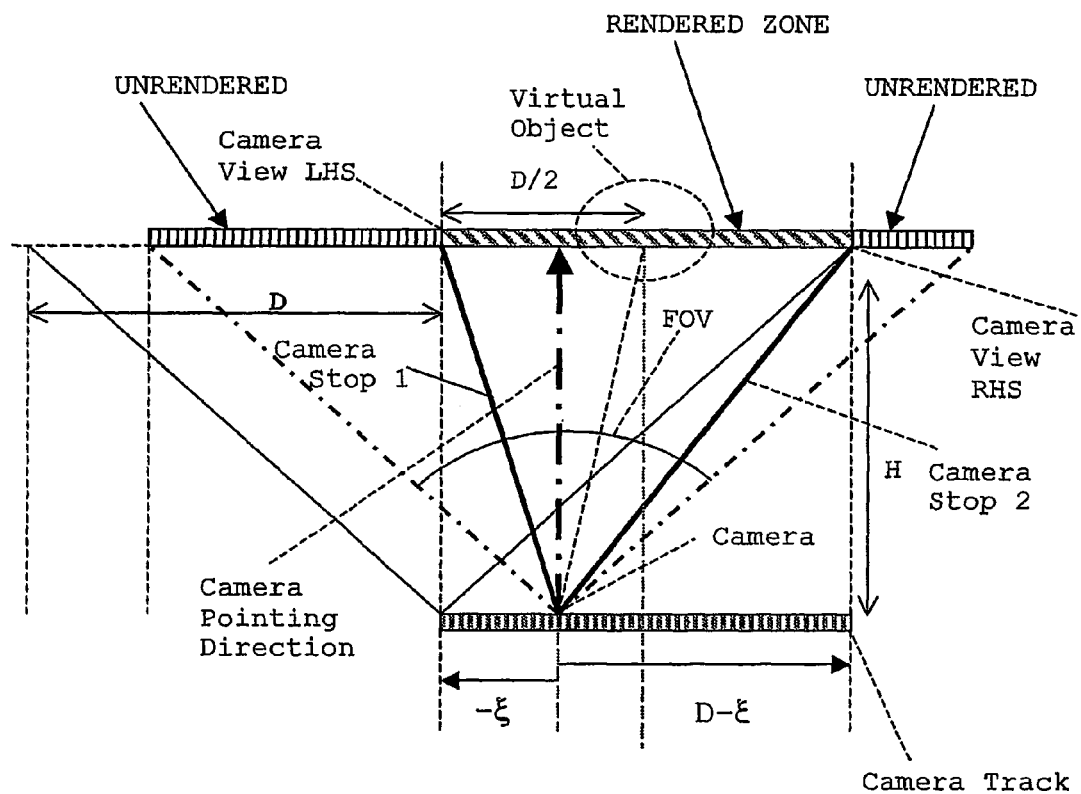
FIG. 15 illustrates the centred camera geometry seen from top)

In the above section the case of a computer perspective model which was generated by a simply translating camera has been treated. However, such a model is rather inefficient as 2× as much rendering data must be calculated as is actually required for the case of a hologram viewing window equal to the hologram size. For more realistic cases, as shall be shown further on, the factor is even greater than 2×. It is thus rather more logical to render only that part of the data that actually appears on the hologram. This may be accomplished (see FIG. 15) by using effectively the same virtual camera geometry as above but by introducing camera stops outside of which no rendering is done. This means that we only render a sliding window in the full field of our virtual camera. Thus we set $$\Psi_{CH} = 2\tan^{-1}\left\{\frac{D}{H}\right\} \quad (39\text{-}40)$$

$$\Psi_{CV} = 2\tan^{-1}\left\{\frac{R}{2H}\right\}$$

where $\Psi_{CH}$ is the horizontal camera field-of-view and $\Psi_{CV}$ is the vertical camera field-of-view and we render only between $\xi=0$ and $\xi=D$. In this way the coordinate point x=0 of every perspective view coincides with x=0 and we may use $Q_X=D$ instead of $Q_X=2D$ as in the previous section. Thus, in FIG. 12 points 1102-1105 on the perspective view plane 905 correspond to points 1102-1105 on the hologram plane 1101.

Figure 16:
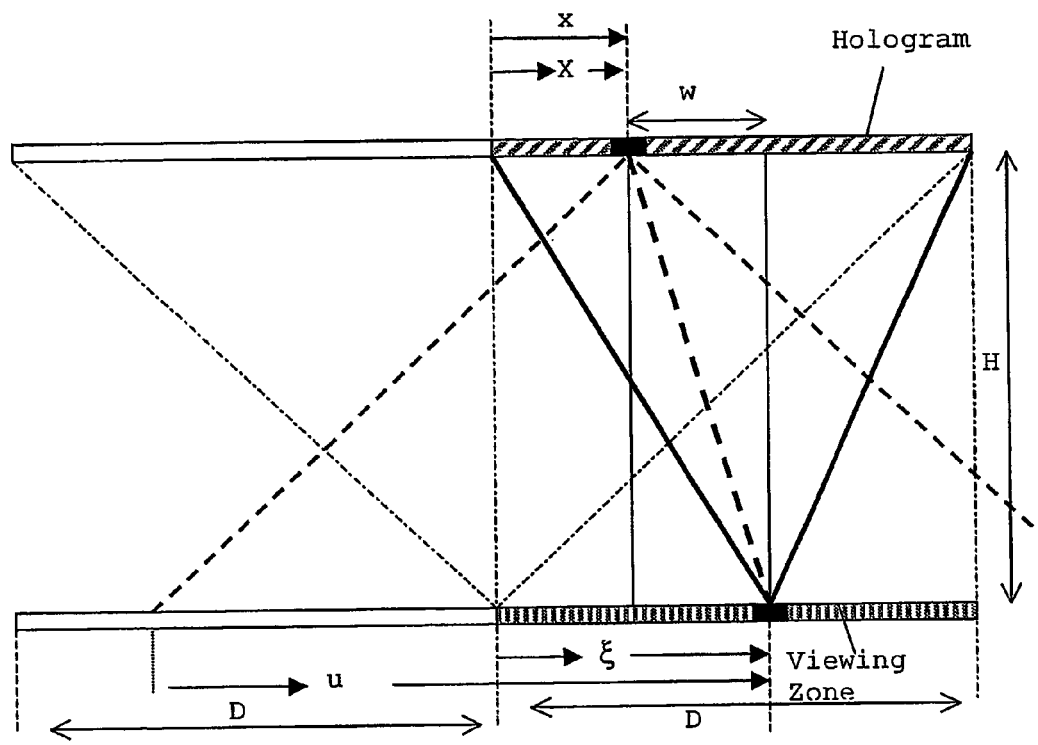
FIG. 16 illustrates a centred camera geometry (seen from top) for the case of a hologram viewing window equal in size and shape to the hologram (single parallax, fixed SLM)

Proceeding as before and with reference this time to FIG. 16 (note that here $\Psi_{PH}=\Psi_{CH}$), at the holopixel defined by (X,Y) it is seen that u=D+w. To find the corresponding intensity information from the virtual camera perspective views it is necessary to look up, also as before, the perspective view corresponding to $\xi=X+w$. However the horizontal pixel coordinate defined by x=X must now be selected in this particular view. The vertical coordinate is selected as always by requiring that y=Y.

Thus $$u = D + w = (\mu - 1)\frac{2D}{N_M - 1} \quad (41)$$

from whence trivially it follows that $$w = (\mu - 1)\frac{2D}{N_M - 1} - D \quad (42)$$

Also from this equation and the relation $\xi=X+W$ it follows that $$(k-1)\frac{D}{N_K - 1} = (\alpha - 1)\frac{D}{N_A - 1} + (\mu - 1)\frac{2D}{N_M - 1} - D \quad (43)$$

which simplifies to $$k = \frac{(\alpha - 1)(N_K - 1)}{N_A - 1} + \frac{2(\mu - 1)(N_K - 1)}{N_M - 1} - N_K + 2 \quad (44)$$

This equation states that the ray defined by the mask file index μ and emanating from the holopixel whose index coordinates are (α,β) intersects with the camera view defined by the index k as given in this expression. To understand which pixel in the perspective view file this ray corresponds to, the relation x=X, derived above, is used—whence $$(i-1)\frac{D}{N_I - 1} = (\alpha - 1)\frac{D}{N_A - 1} \quad (45)$$

or more simply $$i = \frac{(\alpha - 1)(N_I - 1)}{N_A - 1} + 1 \quad (46)$$

Finally, as before, from the equation y=Y it follows that $$(j-1)\frac{R}{N_J - 1} = (\beta - 1)\frac{R}{N_B - 1} \quad (47)$$

or more simply $$j = \frac{(\beta - 1)(N_J - 1)}{N_B - 1} + 1 \quad (48)$$

Thus, for a proper rectangular viewing window the following transformation is derived:

$$^{\mu\nu}S_{\alpha\beta} = {}^k I_{ij} \text{ when } \left\{\frac{1}{2} - \frac{(\beta-1)}{N_B - 1}\frac{R}{\Sigma}\right\}(N_V - 1) + 1 \leq \quad (49)$$

$$\nu \leq \left\{\frac{1}{2} - \frac{(\beta-1)}{N_B - 1}\frac{R}{\Sigma} + \frac{R}{\Sigma}\right\}(N_V - 1) + 1$$

and $0 < k \leq N_K$ $= 0$ otherwise where $$k = \frac{(\alpha - 1)(N_K - 1)}{(N_A - 1)} + \frac{2(\mu - 1)(N_K - 1)}{(N_M - 1)} - N_K + 2, \quad (50)$$

$$i = \frac{(\alpha - 1)(N_I - 1)}{N_A - 1} + 1, \quad (51)$$

$$j = \frac{(\beta - 1)(N_J - 1)}{N_B - 1} + 1 \quad (52)$$

In the case that no restriction is imposed on ν then we have the case of a rolling vertical window with every holopixel having an identical vertical FOV. In this case the pixel swap transformation may be written as:

$$^{\mu\nu}S_{\alpha\beta} = {}^k I_{ij} \quad \forall\, v \text{ when } 0 < k \le N_K \qquad (53)$$
$$= 0 \quad \text{otherwise}$$

where $$k = \frac{(\alpha-1)(N_K-1)}{(N_A-1)} + \frac{2(\mu-1)(N_K-1)}{(N_M-1)} - N_K + 2, \qquad (54)$$

$$i = \frac{(\alpha-1)(N_I-1)}{N_A-1} + 1, \qquad (55)$$

$$j = \frac{(\beta-1)(N_J-1)}{N_B-1} + 1 \qquad (56)$$

As before certain constraints can be identified that restrict the above transformations to the integer set. Thus, for example, we may require $N_M$ to be odd as before and we may further require $$N_K = \frac{N_M+1}{2} = N_A = N_I \qquad (57\text{-}58)$$
$$N_J = N_B$$

In such a case a simplified mask transformation may be written where all indices are integer. For the case of a well defined rectangular viewing window it follows that:

$$^{\mu\nu}S_{\alpha\beta} = {}^k I_{ij} \text{ when } \left\{\frac{1}{2} - \frac{(\beta-1)}{N_B-1}\frac{R}{\Sigma}\right\}(N_V-1) + 1 \le \qquad (59)$$
$$v \le \left\{\frac{1}{2} - \frac{(\beta-1)}{N_B-1}\frac{R}{\Sigma} + \frac{R}{\Sigma}\right\}(N_V-1) + 1$$
$$\text{and } 0 < k \le N_K$$
$$= 0 \quad \text{otherwise}$$

where $$k = \mu + \alpha - N_K, \qquad (60)$$
$$i = \alpha, \qquad (61)$$
$$j = \beta \qquad (62)$$

and for the case of no restriction on $v$ $$^{\mu\nu}S_{\alpha\beta} = {}^k I_{ij} \quad \forall v \text{ when } 0<k\le N_K \text{=0 otherwise} \qquad (63)$$

where $$k=\mu+\alpha-N_K,\ i=\alpha,\ j=\beta. \qquad (64\text{-}66)$$

Centred Image with Maximum FOV

In the previous two sections the horizontal size of the viewing window has been restricted to be the same physical dimension as the actual hologram. The advantage of doing this is that in the viewing zone you either see all the hologram or nothing. However, each holopixel is potentially capable of replaying a fixed FOV. If all of this FOV were to be used, the effect would be a scrolling horizontal window instead of an abrupt image termination (assuming of course that the observer is located at the viewing plane). This case may be treated by considering a camera track longer than previously considered. Hence $\Xi==D+T$. We further set $\Pi=T$ (defining the horizontal printer FOV). Finally, we set $Q_X=D$ and $Q_Y=R$ (defining the centred camera). As in the section entitled "Centred Image with Fixed Rectangular Viewing Window" a centred camera (FIG. 17) is considered and we choose $$\Psi_{CH} = 2\tan^{-1}\left\{\frac{T}{2H}\right\} \qquad (67\text{-}68)$$
$$\Psi_{CV} = 2\tan^{-1}\left\{\frac{R}{2H}\right\}$$

where $\Psi_{CH}$ is the horizontal camera field-of-view, $\Psi_{CV}$ is the vertical camera field-of-view and rendering is performed only between X=0 and X=D.

Figure 18:
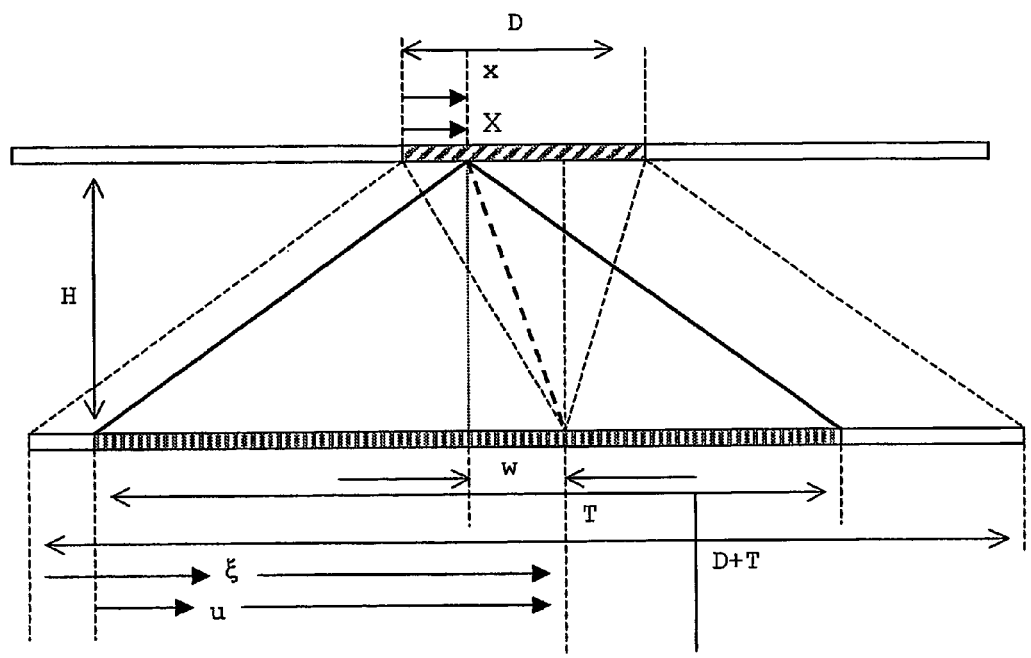
FIG. 18 illustrates the hologram geometry (seen from top) for the maximum FOV centred camera case (single parallax, fixed SLM)

As before and with reference this time to FIG. 18, at the holopixel defined by (X,Y) it is seen that $u=T/2+W$. To find the corresponding intensity information from the virtual camera perspective views it is necessary now to look up the perspective view corresponding to $\xi=T/2+X+w$. And as in the section entitled "Centred Image with Fixed Rectangular Viewing Window" it is necessary to select the horizontal pixel coordinate defined by x=X in this particular view. The vertical coordinate is selected as always by requiring that y=Y. Thus our expression (equation 10) for w becomes $$w = u - \frac{T}{2} = (\mu-1)\frac{T}{N_M-1} - \frac{T}{2} \qquad (69)$$

Likewise the new equation $\xi=T2+X+w$ now leads to:

$$(k-1)\frac{D+T}{N_K-1} = \frac{T}{2} + (\alpha-1)\frac{D}{N_A-1} + (\mu-1)\frac{T}{N_M-1} - \frac{T}{2} \qquad (70)$$

which simplifies to $$k = \frac{D}{D+T}\frac{(\alpha-1)(N_K-1)}{N_A-1} + \frac{T}{D+T}\frac{(\mu-1)(N_K-1)}{N_M-1} + 1 \qquad (71)$$

The equations for i and j remain as in the section entitled "Centred Image with Fixed Rectangular Viewing Window" and hence the final mask transformation for maximum FOV may be written:

$$^{\mu\nu}S_{\alpha\beta} = {}^k I_{ij} \quad \forall v \text{ when } 0 < k \le N_K \qquad (72)$$
$$= 0 \quad \text{otherwise}$$

where $$k = \frac{D}{D+T}\frac{(\alpha-1)(N_K-1)}{N_A-1} + \frac{T}{D+T}\frac{(\mu-1)(N_K-1)}{N_M-1} + 1, \qquad (73)$$

$$i = \frac{(\alpha-1)(N_I-1)}{N_A-1} + 1, \qquad (74)$$

$$j = \frac{(\beta-1)(N_J-1)}{N_B-1} + 1 \qquad (75)$$

Figure 19:
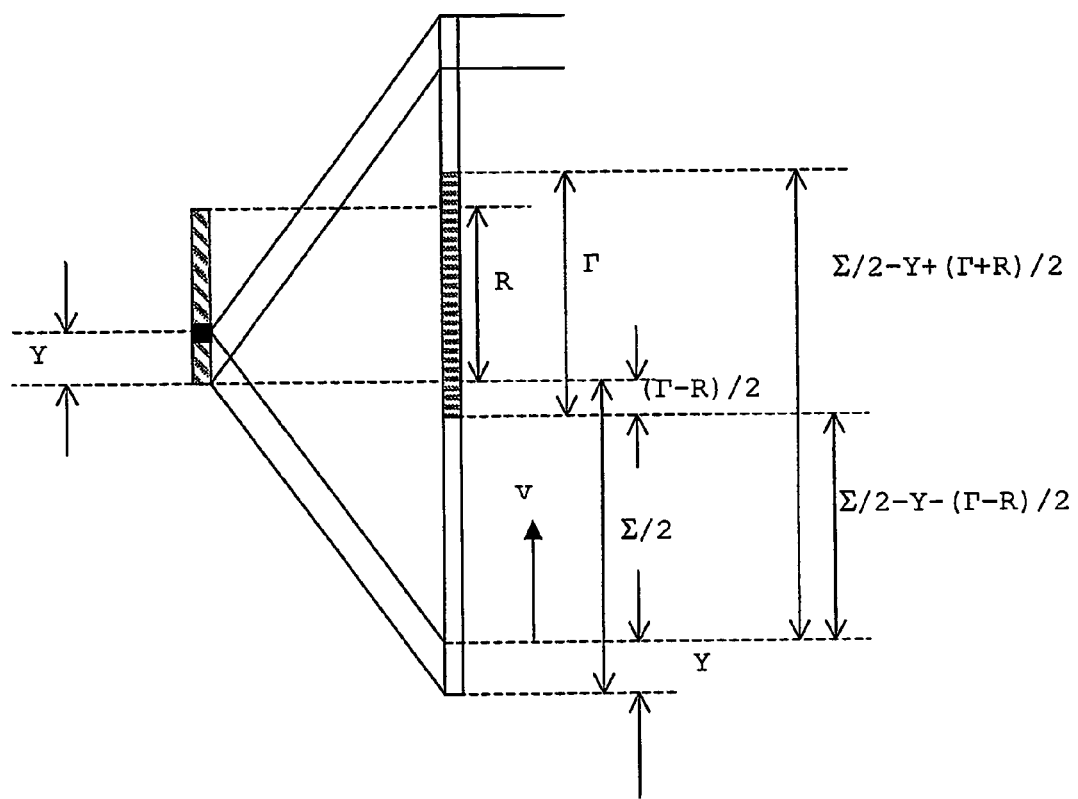
FIG. 19 illustrates the geometry (seen from the side) for a restricted vertical viewing window of height $\Gamma$ (the hologram is to the left and the viewing zone to the right)

If we wanted to limit the vertical viewing window to be of a fixed height $\Gamma$ whilst keeping a maximum horizontal FOV, we could also use (see FIG. 19):

$$^{\mu\nu}S_{\alpha\beta} = {}^k I_{ij} \text{ when } v \geq (N_V - 1)\left\{\frac{1}{2} - \frac{(\beta-1)R}{(N_B-1)\Sigma} + \frac{R-\Gamma}{2\Sigma}\right\} + 1 \quad (76)$$

$$\text{and } v \leq (N_V - 1)\left\{\frac{1}{2} - \frac{(\beta-1)R}{(N_B-1)\Sigma} + \frac{R+\Gamma}{2\Sigma}\right\} + 1$$

$$\text{and } 0 < k \leq N_K$$

$$= 0 \quad \text{otherwise} \quad (77)$$

where $$k = \frac{D}{D+T}\frac{(\alpha-1)(N_K-1)}{N_A-1} + \frac{T}{D+T}\frac{(\mu-1)(N_K-1)}{N_M-1} + 1, \quad (78)$$

$$i = \frac{(\alpha-1)(N_I-1)}{N_A-1} + 1, \quad (79)$$

$$j = \frac{(\beta-1)(N_J-1)}{N_B-1} + 1 \quad (80)$$

with $$\Sigma \geq R + \Gamma \quad (81)$$

In passing it should be noted that this condition may equally well be applied to the transformations of equations 19,31,49 and 59 if our intention is to restrict the vertical window to a height $\Gamma$. One may want to do this, by example, to achieve a greater hologram brightness.

Rectangular Viewing Window of General Size

In the above sections the case of a rectangular window of the same size as the hologram and the case of a scrolling window of unrestrained field of view have been treated. In this section, for completeness, the case of an arbitrarily sized viewing window and an arbitrary recording FOV will be treated.

In our above discussions of rectangular windows certain key parameters, such as the hologram recording FOV and the distance from the viewing plane to the hologram, were chosen in such a manor as to use most efficiently the printer SLM. However, under real conditions it is possible that to restrain $\Pi$ to be equal to exactly twice the size of the hologram, for instance, as we have discussed in our first two analyses, may at some times be inconvenient. If a rectangular viewing window of horizontal dimension L and vertical dimension $\Gamma$ is considered then our previous discussions can be generalized to requiring only that $\Pi \geq D+L$ and that $\Sigma \geq R+\Gamma$. A centred camera will be used as in the two previous sections above and so we will require that $Q_X=D$ and $Q_Y=R$. Since the horizontal dimension of the viewing window is L we shall require $\Xi=L$.

As before it should be noted that the recording or printer FOVs are defined by $\Pi$ and $\Sigma$. The camera FOVs however are now somewhat different. We will require that $$\Psi_{CH} = 2\tan^{-1}\left\{\frac{D+L}{2H}\right\} \quad (81a)$$

$$\Psi_{CV} = 2\tan^{-1}\left\{\frac{R}{2H}\right\}$$

where, as before, $\Psi_{CH}$ is the horizontal camera field-of-view, $\Psi_{CV}$ is the vertical camera field-of-view and rendering is performed only between X=0 and X=D.

Figure 20:
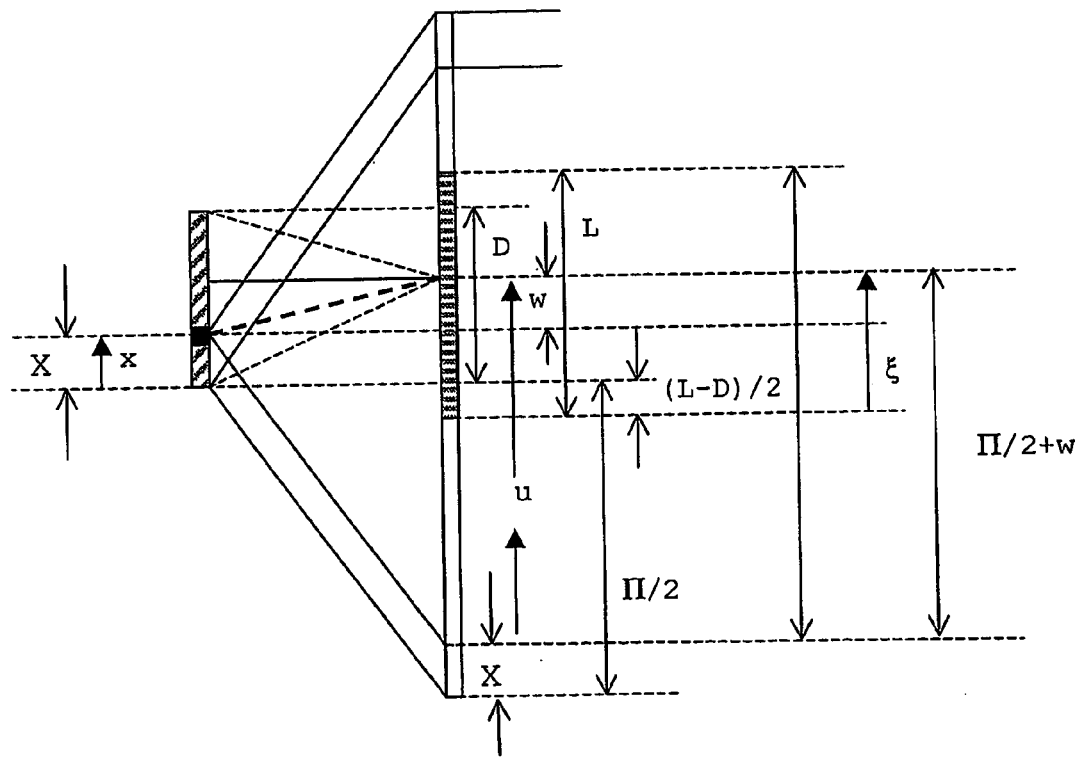
FIG. 20 illustrates the geometry for a general rectangular window with oversized SLM (seen from top)

With reference to FIG. 20, it is seen that u=$\Pi$/2+w. The corresponding equation for $\xi$ is now $\xi$=(L−D)/2+X+w and the equation for x is x=X. As usual the equation y=Y remains unchanged. These equations now tell us the rules for k, i and j:

$$k = \left\{\frac{N_K-1}{L}\right\}\left\{\frac{L-D}{2} + \frac{(\alpha-1)D}{N_A-1} + \frac{(\mu-1)\Pi}{N_M-1} - \frac{\Pi}{2}\right\} + 1 \quad (82)$$

$$i = \frac{(\alpha-1)(N_I-1)}{N_A-1} + 1, \quad (83)$$

$$j = \frac{(\beta-1)(N_J-1)}{N_B-1} + 1 \quad (84)$$

The vertical window is dwelt with exactly as previously and hence the general mask transformation may be written as:

$$^{\mu\nu}S_{\alpha\beta} = {}^k I_{ij} \text{ when } v \geq (N_V - 1)\left\{\frac{1}{2} - \frac{(\beta-1)R}{(N_B-1)\Sigma} + \frac{R-\Gamma}{2\Sigma}\right\} + 1 \quad (85)$$

$$\text{and } v \leq (N_V - 1)\left\{\frac{1}{2} - \frac{(\beta-1)R}{(N_B-1)\Sigma} + \frac{R+\Gamma}{2\Sigma}\right\} + 1$$

$$\text{and } 0 \leq k \leq N_K$$

$$= 0 \quad \text{otherwise} \quad (86)$$

where $$k = \left\{\frac{N_K-1}{L}\right\}\left\{\frac{L-D}{2} + \frac{(\alpha-1)D}{N_A-1} + \frac{(\mu-1)\Pi}{N_M-1} - \frac{\Pi}{2}\right\} + 1, \quad (87)$$

$$i = \frac{(\alpha-1)(N_I-1)}{N_A-1} + 1, \quad (88)$$

$$j = \frac{(\beta-1)(N_J-1)}{N_B-1} + 1 \quad (89)$$

In passing we should note that usually one should try and arrange that $\Pi$=D+L in order to utilize the full horizontal resolution of the SLM.

Moving SLM, Centred Camera and General Rectangular Window

Up until now the case of a static SLM which remains fixed in the entrance pupil of the writing objective has been considered. However, when we wish to make a hologram with a well defined rectangular window, we may do so by moving the SLM within the entrance pupil of the objective. In this case, of course, the objective must have a larger entrance pupil relative to the SLM size in order to accommodate such motion. One of the principle advantages of this scheme is its use in dual-mode printers. Generally MW printers that write H1 type master holograms require a moving SLM (in order to use effectively the SLM resolution) and hence, by using this scheme in a dual function printer, exactly the same print-head assembly can be employed to write either a 1-step hologram or an H1 hologram master. This is not the case if we use a static SLM.

Let us assume as usual that our hologram is of horizontal size D and vertical size R and that our viewing window, displaced laterally from the hologram by a distance H, is of horizontal dimension L and vertical dimension $\Gamma$. If the maximum angular resolution possible is to be attained with our SLM, H must be chosen with reference to the FOV of the writing objective such that the virtual image of the SLM at the viewing plane is of horizontal dimension L.

Now one can choose to move the SLM only horizontally, or one can choose to move it in a two-dimensional fashion. If it is moved 2-dimensionally then all the vertical pixels of the SLM will be used only in the case that the vertical SLM image size in the viewing plane is $\Gamma$. If the vertical size is restricted such that the aspect ratio of the SLM no longer corresponds to the aspect ratio of the viewing window then generally we will only use a fixed percentage of the vertical SLM height and $\Sigma \geq \Gamma$. In the case that we elect to only move the SLM horizontally and to permanently position it in the vertical centre of the objective pupil then either an unrestricted scrolling window can be used or $v$ can be restrained, as in the previous sections, so as to create a fixed rectangular viewing window.

Firstly it should be pointed out that for the case of a horizontal viewing window size of L, the writing objective must have an FOV of at least $$\Psi_{min} = 2\tan^{-1}\left(\frac{L+D}{2H}\right) \tag{90}$$

In the unlikely event that the viewing window is taller than it is wider then we would require that $$\Psi_{min} = 2\tan^{-1}\left(\frac{\Gamma+R}{2H}\right) \tag{91}$$

but it should be noted that this is rather unlikely in the context of a single parallax hologram. It should also be noted that these equations constitute absolute limits pertaining to the translation of the SLM within the objective pupil in either a strictly horizontal or a strictly vertical fashion. Slightly more severe criteria may be derived by examining the outer diagonal points of the SLM within the objective pupil.

Figure 21:
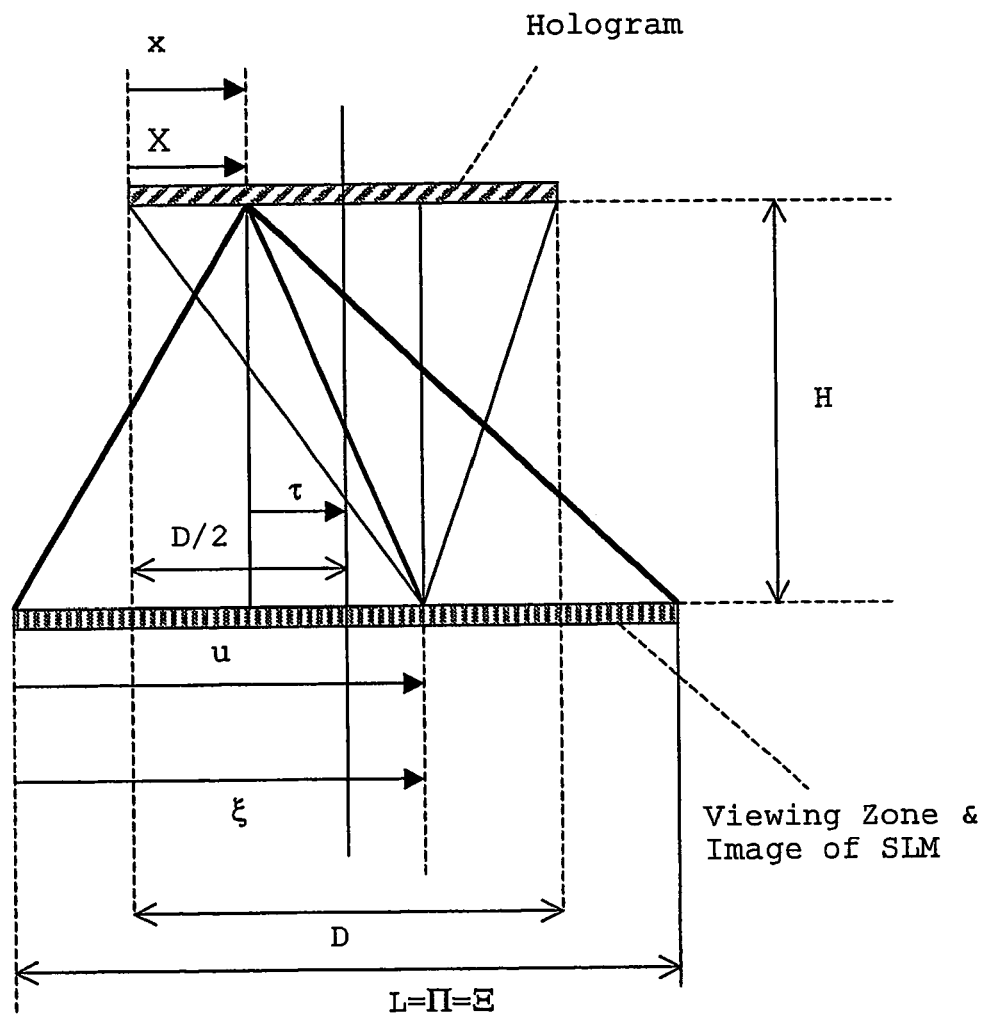
FIG. 21 illustrates the geometry for a general rectangular viewing window with tracking SIM and centred camera (seen from top)
Figure 21A:
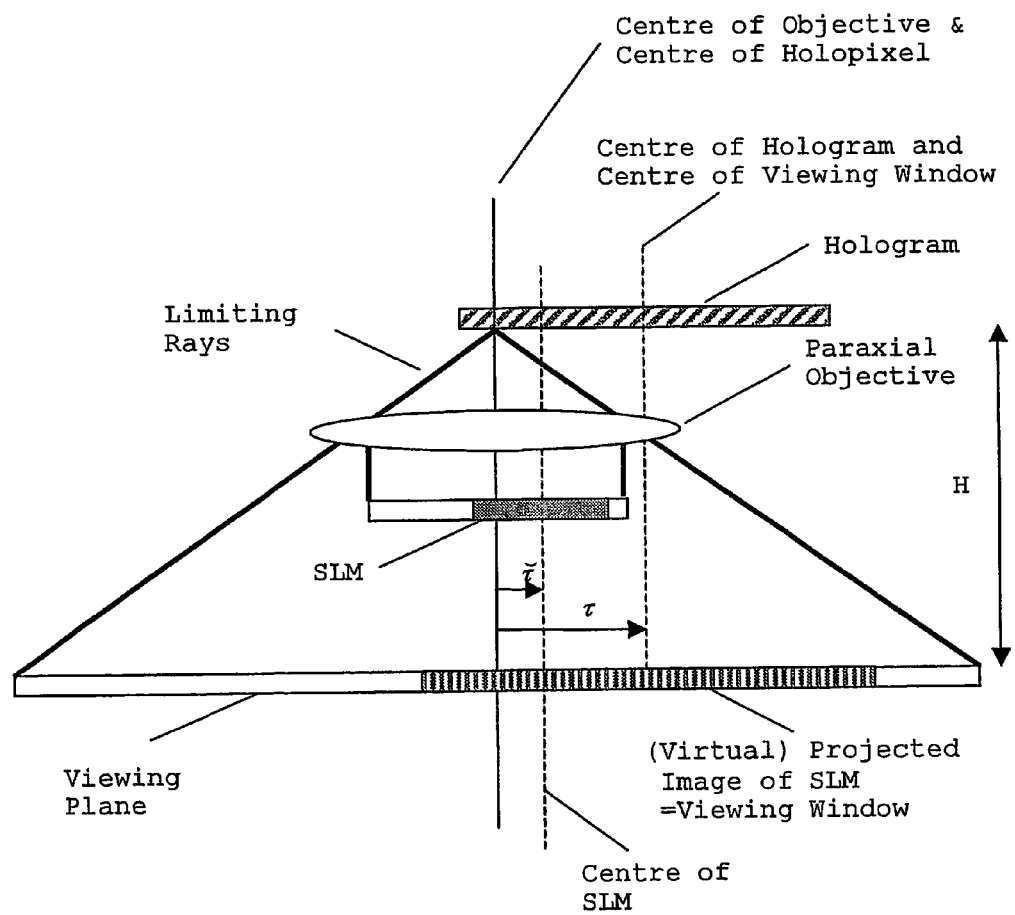
FIG. 21a illustrates, for the case of a tracking SLM, the relationship between the horizontal position of the centre of the SLM relative to the centre of the objective and the horizontal position of the centre of the projected image of the SLM at the viewing plane, again relative to the centre of the objective.
Figure 22:
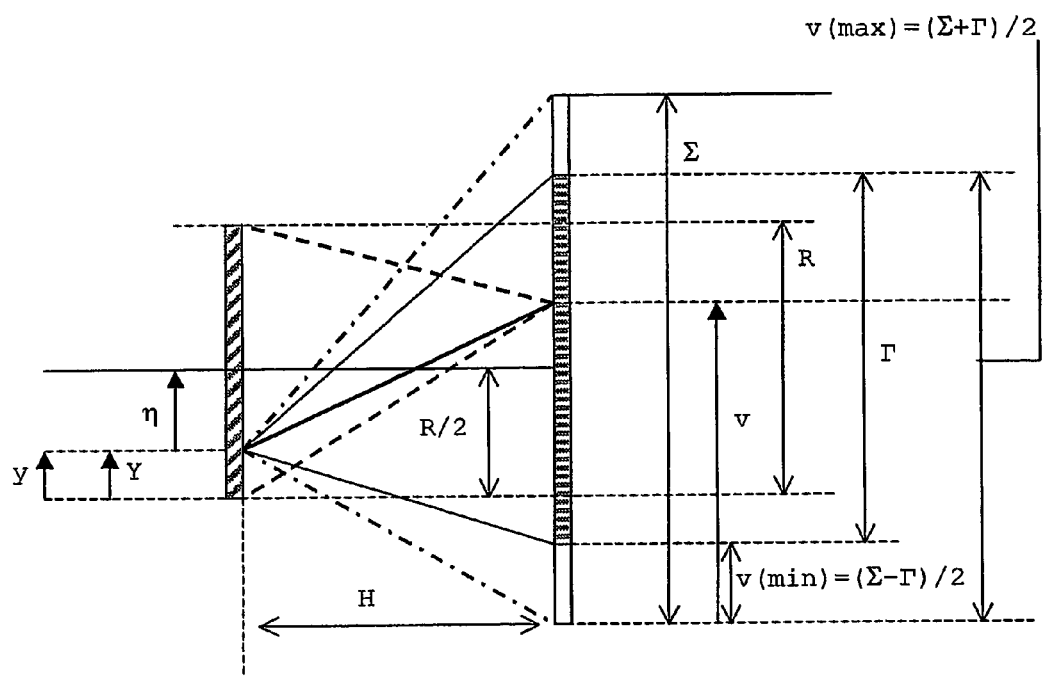
FIG. 22 illustrates the geometry for a general rectangular window with tracking SLM and centred camera (seen from the side)

Let us consider a 2-D displacement of the SLM by denoting the x and y coordinates of the centre of the projected image of the SLIM at the viewing plane by $\tau$ and $\eta$. We choose the origin of this coordinate system at the holopixel being written—namely(X,Y). FIGS. 21 and 22 show the geometry from respectively a top and side view. In order to keep the image of the SLM at a fixed location on the viewing plane as indicated in the diagrams we will move it according to the law $$\tau = \frac{D}{2} - X = \frac{D}{2} - (\alpha - 1)\frac{D}{N_A - 1} \tag{92-93}$$

$$\eta = \frac{R}{2} - Y = \frac{R}{2} - (\beta - 1)\frac{R}{N_B - 1}$$

Note that the actual x and y coordinates ($\check{\tau}$ and $\check{\eta}$) of the centre of the SLM relative to the centre of the paraxial objective are just linearly proportional to $\tau$ and $\eta$ (i.e. $\check{\tau}=a\tau$ and $\check{\eta}=a\eta$ where the constant a is related to the characteristics (magnification) of the objective—see FIG. 22a). Since a centred virtual camera is being considered we require $Q_X=D$ and $Q_Y=R$. Since our viewing window is of size (L×$\Gamma$) we will also require that $\Xi=\Pi=L$ and that $\Sigma \geq \Gamma$.

From FIGS. 21 and 22 we see immediately that $u=\xi$, $x=X$ and $y=Y$. Also from FIG. 22 we see that in order to limit the vertical window size to $\Gamma \leq \Sigma$ we must ensure that $$\frac{\Sigma - \Gamma}{2} \leq v \leq \frac{\Sigma + \Gamma}{2} \tag{94}$$

Thus we may write the mask transformation for the case of a 2-D moving SLM, centred virtual camera and of general rectangular viewing area as $$^{\mu v}S_{\alpha\beta} = {}^k I_{ij} \quad \text{when} \quad \frac{\Sigma - \Gamma}{2\Sigma}(N_V - 1) + 1 \leq \tag{95}$$

$$v \leq \frac{\Sigma + \Gamma}{2\Sigma}(N_V - 1) + 1$$

and $0 < k \leq N_K$ $$= 0 \quad \text{otherwise} \tag{96}$$

where $$k = \frac{(\mu - 1)(N_K - 1)}{N_M - 1} + 1, \tag{97}$$

$$i = \frac{(\alpha - 1)(N_I - 1)}{N_A - 1} + 1, \tag{98}$$

$$j = \frac{(\beta - 1)(N_J - 1)}{N_B - 1} + 1 \tag{99}$$

If we do not wish to limit the hologram vertical FOV and hence to have a vertical scrolling window, then we may decide to fix the SLM vertically in the objective mid-plane and move it only horizontally. The above transform will then also apply with the exception'that there is no restriction on $\Gamma$.

If we demand that $N_K=N_M$, $N_I=N_A$ and $N_J=N_B$ we see that the rules for k, i and j become trivially k=$\mu$,m i=$\alpha$ and j=$\beta$.

Full Parallax Monochrome Reflection Hologram with Static SLM

Transformations derived for the single parallax case may be generalized with the greatest of ease to the full parallax case.

Non-Centred Image with Fixed Rectangular Viewing Window of Same size as Hologram for the Full-Parallax Case We should first point out that a non-centred virtual camera of fixed FOV and which only translates in two dimensions provides a poor solution to any real design. This is because the computer is forced to generate at least four times the perspective information than is actually required.

Figure 23:
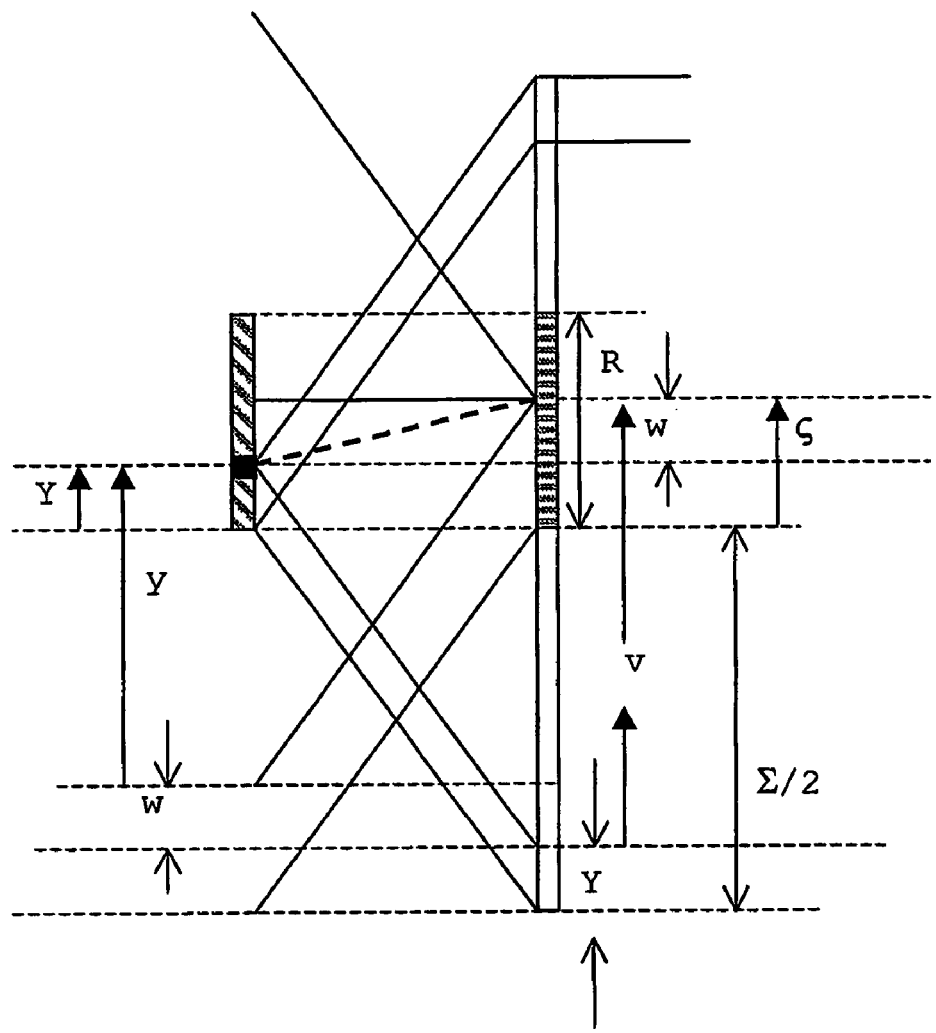
FIG. 23 illustrates the geometry for the full-parallax case with translating camera (seen from the side)

As we have discussed before, FIG. 14a shows a view, from the top, of the camera tracking from left to right. Note that the camera always points straight ahead and that the camera FOV remains fixed. FIG. 14b shows the relevant geometry for the horizontal parallax. Since generally the aspect ratio of the SLM will not be the same as the aspect ratio of the hologram viewing zone, the side view looks a little different and is shown in FIG. 23.

Since the horizontal viewing width is D we must require that $\Xi=D$. Since the vertical viewing height is R we likewise require that $\Theta=R$. Our choice of a translating virtual camera imposes the constraints $Q_X=2D$ and $Q_Y=2R$ and finally we will choose H such that $\Pi=2D$. Note that $\Sigma \geq 2R$ as generally the aspect ratios of SLM and viewing zone will not be the same.

FIG. 14b and the logic of the section entitled "Non-Centred Image with Fixed Rectangular Viewing Window of Same Size as Hologram" can now be used to derive transformation rules for the indices k and i. These rules are identical to those given in equations 12 and 14. Referring now to FIG. 23 we see the relations u=D+w, ξ=X+w and x=D−w in the horizontal plane are now replaced with $$v = \frac{\Sigma}{2} + w, \quad \varsigma = Y + w \quad \text{and} \quad y = \frac{\Sigma}{2} - w$$

in the vertical plane. These relations give us equations for g and j:

$$g = \frac{N_G - 1}{R}\left\{\frac{R(\beta-1)}{N_B - 1} + \frac{\Sigma(v-1)}{N_V - 1} - \frac{\Sigma}{2}\right\} + 1 \quad (100\text{-}101)$$

$$j = \frac{\Sigma}{2R}\left\{\frac{(N_J - 1)(N_V - v)}{(N_V - 1)}\right\} + 1$$

Thus the full-parallax translating camera mask transformation may be written as $$^{\mu v}S_{\alpha\beta} = {}^{kg}I_{ij} \quad \text{when } 0 < g \leq N_G \quad (102)$$
$$\text{and } 0 < k \leq N_K$$
$$= 0 \quad \text{otherwise}$$

where $$k = \frac{(\alpha-1)(N_K-1)}{(N_A-1)} + \frac{2(\mu-1)(N_K-1)}{(N_M-1)} - N_K + 2, \quad (103)$$

$$i = N_I - \frac{(\mu-1)(N_I-1)}{N_M - 1}, \quad (104)$$

$$g = \frac{N_G - 1}{R}\left\{\frac{R(\beta-1)}{N_B - 1} + \frac{\Sigma(v-1)}{N_V - 1} - \frac{\Sigma}{2}\right\} + 1, \quad (105)$$

$$j = \frac{\Sigma}{2R}\left\{\frac{(N_J - 1)(N_V - v)}{(N_V - 1)}\right\} + 1. \quad (106)$$

In the case that $\Sigma=2R$ and both $N_M$ and $N_V$ are odd and further $$N_K = N_A = \frac{N_M + 1}{2} \quad (107\text{-}110)$$

$$N_I = N_M$$

$$N_G = N_B = \frac{N_V + 1}{2}$$

$$N_J = N_V$$

a much simplified transform may be written:

$$^{\mu v}S_{\alpha\beta} = {}^{kg}I_{ij} \text{ when } 0<g\leq N_G \text{ and } 0<k\leq N_K = 0 \text{ otherwise} \quad (111)$$

where $$k=\mu+\alpha-N_K, \quad (112)$$

$$i=N_M-\mu+1, \quad (113)$$

$$g=v+\beta-N_G, \quad (114)$$

$$j=N_V-v+1. \quad (115)$$

Centred Image with Fixed Rectangular Viewing Window of same size as Hologram for the Full Parallax Case We now generalize the concept of the centred camera to two dimensions. We thus change the camera apertures such that only data obeying the constraints $0 \leq X \leq D$ and $0 \leq Y \leq R$ is rendered. As usual we will choose H such that $\Pi=2D$.

The equations governing k and i remain as in the section entitled "Centred Image with Fixed Rectangular Viewing Window".

Figure 24:
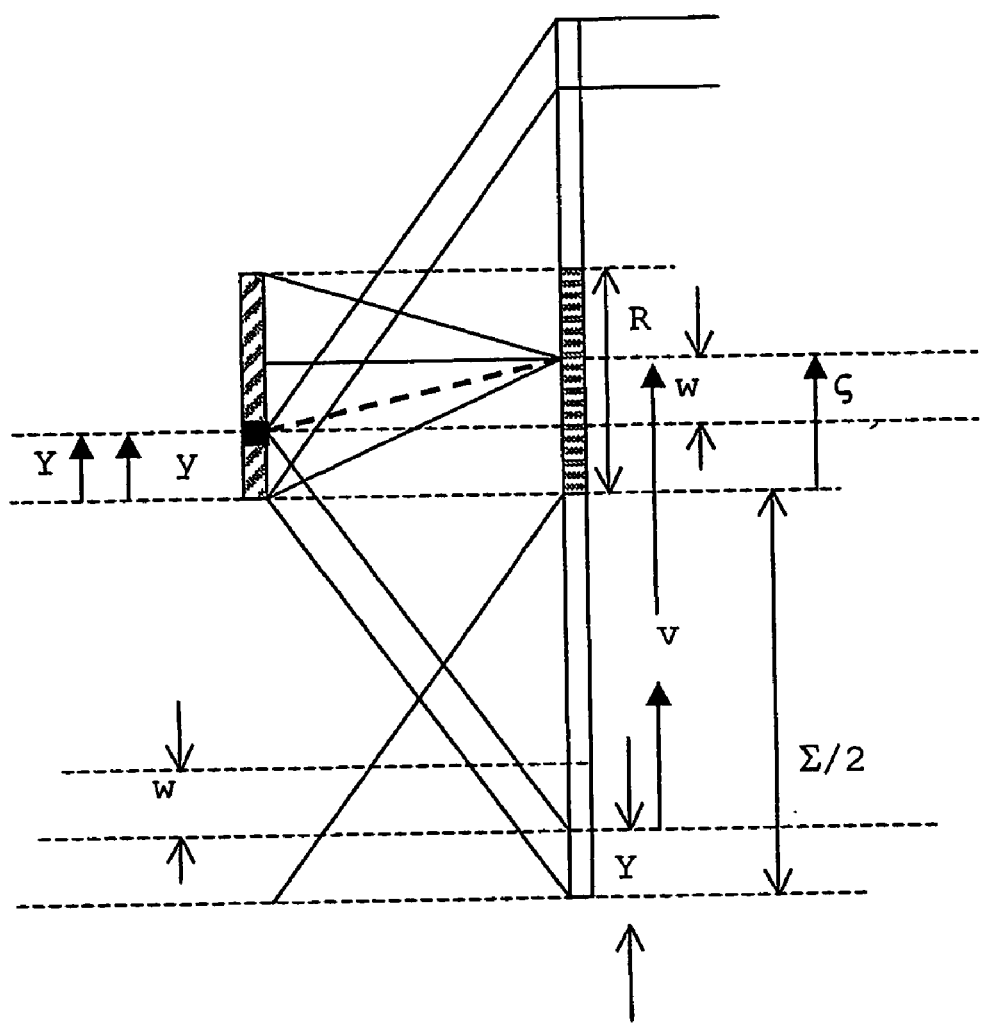
FIG. 24 illustrates the geometry for the full-parallax case with a centred camera (seen from the side)

However, as in the previous section, since the aspect ratio of the hologram viewing zone will not in general be the same as the aspect ratio of the SLM, the vertical view needs more care (see FIG. 24).

We now set $\Theta=R=Q_y$. We see that the single-parallax centred-camera relations u=D+w, ξ=X+w and x=X in the horizontal plane are now replaced with $$v = \frac{\Sigma}{2} + w,$$

ζ=Y+w and y=Y in the vertical plane. These relations give us the new equations for g and j:

$$g = \frac{N_G - 1}{R}\left\{\frac{R(\beta-1)}{N_B - 1} + \frac{\Sigma(v-1)}{N_V - 1} - \frac{\Sigma}{2}\right\} + 1 \quad (116)$$

$$j = \frac{(N_J - 1)(\beta - 1)}{N_B - 1} + 1 \quad (117)$$

The full-parallax centred-camera mask transformation may now be written as $$^{\mu v}S_{\alpha\beta} = {}^{kg}I_{ij} \quad \text{when } 0 < g \leq N_G \quad (118)$$
$$\text{and } 0 < k \leq N_K$$
$$= 0 \quad \text{otherwise}$$

where $$k = \frac{(\alpha-1)(N_K-1)}{(N_A-1)} + \frac{2(\mu-1)(N_K-1)}{(N_M-1)} - N_K + 2, \quad (119)$$

$$i = \frac{(\alpha-1)(N_I-1)}{N_A - 1} + 1, \quad (120)$$

$$g = \frac{N_G - 1}{R}\left\{\frac{R(\beta-1)}{N_B - 1} + \frac{\Sigma(v-1)}{N_V - 1} - \frac{\Sigma}{2}\right\} + 1 \quad (121)$$

$$j = \frac{(N_J - 1)(\beta - 1)}{N_B - 1} + 1 \quad (122)$$

In the case that $\Sigma=2R$ and both $N_M$ and $N_V$ are odd and further $$N_K = N_A = N_I = \frac{N_M + 1}{2} \quad (123)$$

-continued $$N_G = N_B = N_J = \frac{N_V + 1}{2} \quad (124)$$

a much simplified transform may be written:

$$^{\mu\nu}S_{\alpha\beta} = {}^{kg}I_{ij} \text{ when } 0 < g \leq N_G \text{ and } 0 < k \leq N_K = 0 \text{ otherwise} \quad (125)$$

where $$k = \mu + \alpha - N_K \quad (126)$$

$$i = \mu \quad (127)$$

$$g = \nu + \beta - N_G \quad (128)$$

$$j = \nu \quad (129)$$

The Maximum FOV Case for Full-Parallax Holograms

Figure 17:
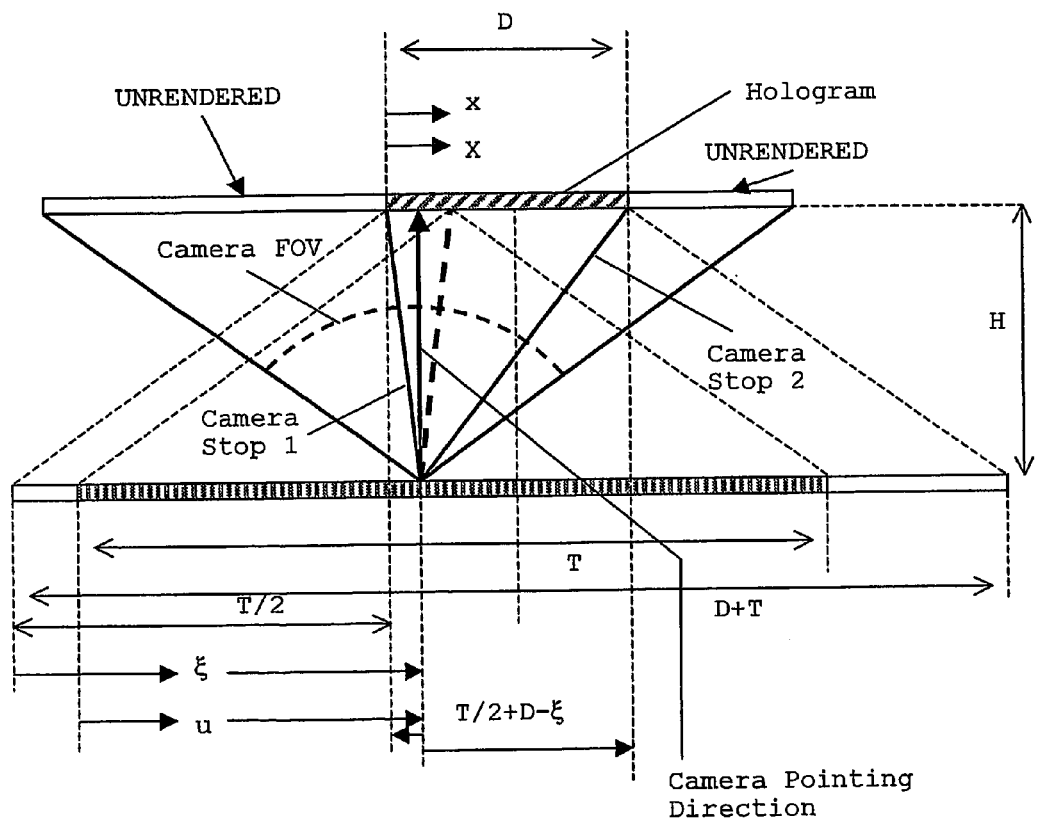
FIG. 17 illustrates the centering of the camera for the maximum FOV case (seen from top)

We now generalize the section entitled "Centred Image with Maximum FOV" to the case of horizontal and vertical scrolling windows of maximum FOV. With reference to FIG. 17 we choose the camera FOV to be $$\Psi_{CH} = 2 \tan^{-1}\left\{\frac{T}{2H}\right\} \quad (130\text{-}131)$$

$$\Psi_{CV} = 2 \tan^{-1}\left\{\frac{\Sigma}{2H}\right\}$$

and we choose to render only those points obeying the constraints $0 \leq X \leq D$ and $0 \leq Y \leq R$. We choose H such that $\pi = T$ (i.e. one chooses H so as to arrive at the required width of the viewing zone=D+T which of course depends on the horizontal printer $$FOV = \Psi_{PH} = 2 \tan^{-1}\left\{\frac{\Pi}{2H}\right\}).$$

Figure 25:
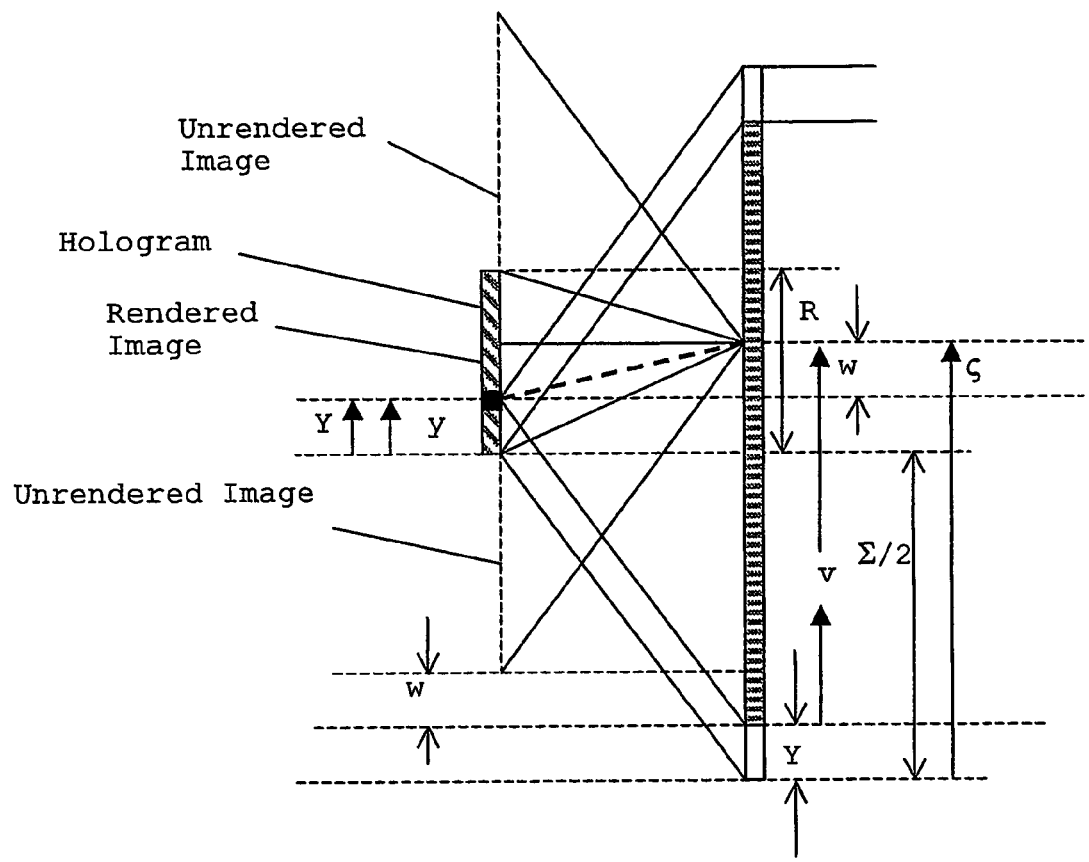
FIG. 25 illustrates the geometry for the full-parallax case, centred camera and maximum FOV scrolling windows (side view)

Other parameters are $\Xi = D + T$, $\Theta = R + \Sigma$, $Q_X = D$ and $Q_Y = R$. The equations for the horizontal plane are therefore as before. FIG. 25 depicts the vertical situation from which it can be seen that the key equations are $$v = \frac{\Sigma}{2} + w, \varsigma = \frac{\Sigma}{2} + Y + w \text{ and } y = Y.$$

The mask transformation for maximum FOV may therefore be written as:

$$^{\mu\nu}S_{\alpha\beta} = {}^{kg}I_{ij} \text{ when } 0 < g \leq N_G \quad (132)$$

$$\text{and } 0 < k \leq N_K$$

$$= 0 \text{ otherwise}$$

where $$k = \left[\frac{D}{D+T}\right]\frac{(\alpha-1)(N_K-1)}{(N_A-1)} + \left[\frac{T}{D+T}\right]\frac{(\mu-1)(N_K-1)}{(N_M-1)} + 1, \quad (133)$$

$$i = \frac{(\alpha-1)(N_I-1)}{N_A-1} + 1, \quad (134)$$

$$g = \left[\frac{R}{R+\Sigma}\right]\frac{(\beta-1)(N_G-1)}{N_B-1} + \left[\frac{\Sigma}{R+\Sigma}\right]\frac{(\nu-1)(N_G-1)}{N_V-1} + 1 \quad (135)$$

$$j = \frac{(N_J-1)(\beta-1)}{N_B-1} + 1 \quad (136)$$

As before, if we wanted to write a hologram with the maximum horizontal FOV but to limit the vertical window to a fixed height, $\Gamma$, then we could apply the conditional transform of equation 76. Or, in other words:

$$^{\mu\nu}S_{\alpha\beta} = {}^{kg}I_{ij} \text{ when } \nu \geq (N_V - 1)\left\{\frac{1}{2} - \frac{(\beta-1)R}{(N_B-1)\Sigma} + \frac{R-\Gamma}{2\Sigma}\right\} + 1 \quad (137)$$

$$\text{and } \nu \leq (N_V - 1)\left\{\frac{1}{2} - \frac{(\beta-1)R}{(N_B-1)\Sigma} + \frac{R+\Gamma}{2\Sigma}\right\} + 1$$

$$\text{and } 0 < k \leq N_K$$

$$\text{and } 0 < g \leq N_G$$

$$= 0 \text{ otherwise}$$

where $$k = \left[\frac{D}{D+T}\right]\frac{(\alpha-1)(N_K-1)}{(N_A-1)} + \left[\frac{T}{D+T}\right]\frac{(\mu-1)(N_K-1)}{(N_M-1)} + 1, \quad (138)$$

$$i = \frac{(\alpha-1)(N_I-1)}{N_A-1} + 1, \quad (139)$$

$$g = \left[\frac{R}{R+\Sigma}\right]\frac{(\beta-1)(N_G-1)}{N_B-1} + \left[\frac{\Sigma}{R+\Sigma}\right]\frac{(\nu-1)(N_G-1)}{N_V-1} + 1 \quad (140)$$

$$j = \frac{(N_J-1)(\beta-1)}{N_B-1} + 1 \quad (141)$$

This would use the same image data as was used in equations 132 to 136 but would simply convert the vertical scrolling window into a rectangular window.

An easier way to limit the vertical window to a fixed height, $\Gamma$ would be to re-render and incorporate the image clipping within the g index swap rule. In this case $\Theta = \Gamma$ which would be considerably more (computationally) efficient over the previous criteria that $\Theta = R + \Sigma$. In this case the mask transform becomes $$^{\mu\nu}S_{\alpha\beta} = {}^{kg}I_{ij} \text{ when } 0 < k \leq N_K \quad (141a)$$

$$\text{and } 0 < g \leq N_G$$

$$= 0 \text{ otherwise}$$

where $$k = \left[\frac{D}{D+T}\right]\frac{(\alpha-1)(N_K-1)}{(N_A-1)} + \left[\frac{T}{D+T}\right]\frac{(\mu-1)(N_K-1)}{(N_M-1)} + 1, \quad (141b)$$

$$i = \frac{(\alpha-1)(N_I-1)}{N_A-1} + 1, \quad (141c)$$

$$g = \left\{\frac{N_G-1}{\Gamma}\right\}\left\{\frac{\Gamma-R}{2} + \frac{(\beta-1)R}{N_B-1} + \frac{(\nu-1)\Sigma}{N_V-1} - \frac{\Sigma}{2}\right\} + 1 \quad (141d)$$

-continued $$j = \frac{(N_J - 1)(\beta - 1)}{N_B - 1} + 1 \tag{141e}$$

General Rectangular Viewing Zone for Full Parallax

Using exactly the same logic, it is trivially clear that the single parallax case of a general rectangular window may be generalized to full parallax. Assuming again a centred camera with $Q_X=D$ and $Q_Y=R$ and a rendering window defined by $\Xi=L$ and $\Theta=\Gamma$, the mask transformation may then be written:

$$^{\mu\nu}S_{\alpha\beta} = {}^{kg}I_{ij} \quad \text{when } 0 < k \le N_K \tag{142a}$$

$$\text{and } 0 < g \le N_G$$

$$= 0 \quad \text{otherwise}$$

where $$k = \left\{\frac{N_K - 1}{L}\right\}\left\{\frac{L - D}{2} + \frac{(\alpha - 1)D}{N_A - 1} + \frac{(\mu - 1)\Pi}{N_M - 1} - \frac{\Pi}{2}\right\} + 1 \tag{142b}$$

$$i = \frac{(\alpha - 1)(N_I - 1)}{N_A - 1} + 1, \tag{142c}$$

$$g = \left\{\frac{N_G - 1}{\Gamma}\right\}\left\{\frac{\Gamma - R}{2} + \frac{(\beta - 1)R}{N_B - 1} + \frac{(\nu - 1)\Sigma}{N_V - 1} - \frac{\Sigma}{2}\right\} + 1 \tag{142d}$$

$$j = \frac{(N_J - 1)(\beta - 1)}{N_B - 1} + 1 \tag{142e}$$

The Case of a Moving SLM for Full-Parallax Holograms

In the light of the above sections it will be clear to a person skilled in the art how the single parallax analysis already presented for a moving SLM may be generalized to the full-parallax case.

Offset Window Geometry

In all of the above discussions the viewing window, whether of a fixed rectangular topology or whether of a scrolling nature has been contemplated to be centrally placed in front of the hologram. However, in a commercial printer that must print large holograms, it is likely that sub-sections of the final hologram will have to be printed individually and then assembled. Hence we might consider dividing a 1 m×1 m hologram up into 4 pieces of 50 cm×50 cm each. Clearly a discussion of the printing of these sub-segments entails a discussion of a general viewing window being offset from the respective hologram segment.

Due to the importance of this topic two explicit examples will be presented—one for the single parallax case and one for the double parallax case. It will then be evident to someone skilled in the art how this technique may be generalized to the various other viewing and recording geometries hereto above presented.

Figure 25A:
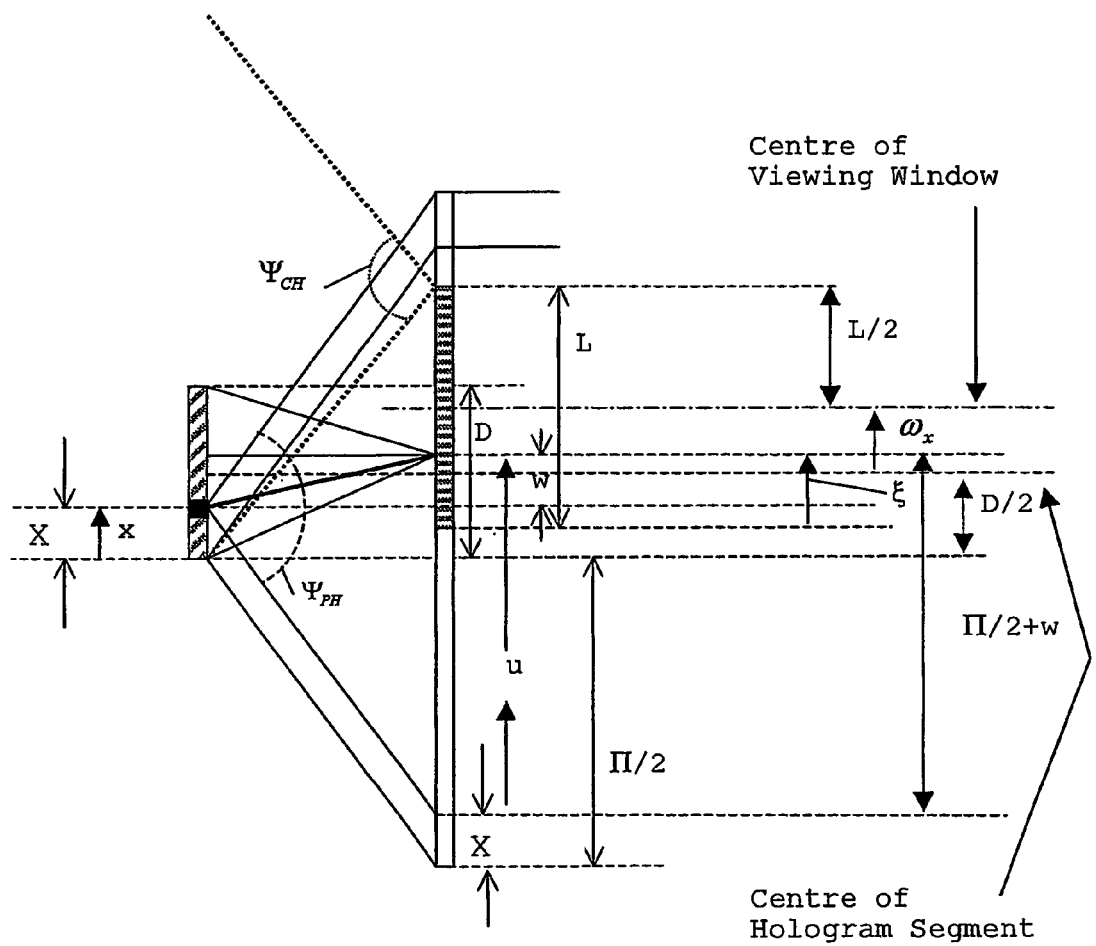
FIG. 25a illustrates an offset geometry whereby the viewing window is offset from the centre of the hologram—case of a general rectangular window—seen from the top.
Figure 25B:
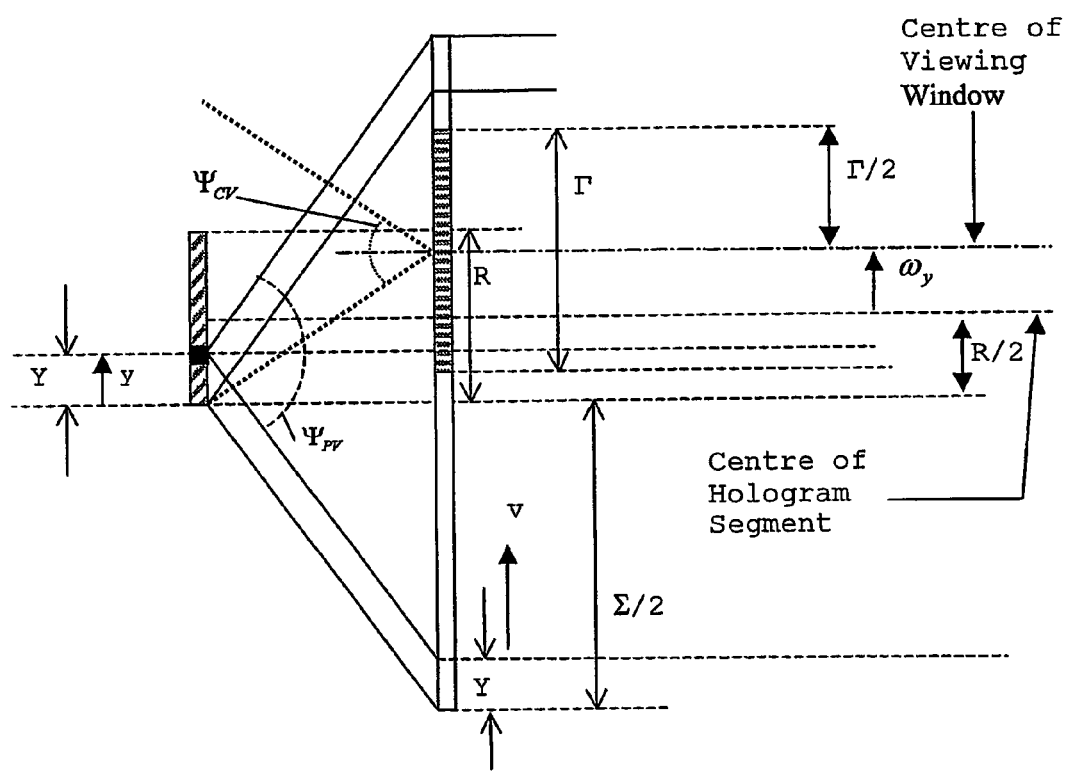
FIG. 25b illustrates an offset geometry whereby the viewing window is offset from the centre of the hologram—case of a general rectangular window & single horizontal parallax—seen from the side.

The first example that will be discussed in detail relates to a single parallax sub-hologram of size D×R with a generalized rectangular viewing zone of size L×Γ whose centre is generally laterally offset from the centre of the hologram by $\omega_x$ in the x direction and by $\omega_y$ in the y direction. FIGS. 25a and 25b show respectively the horizontal and vertical geometries. The visual data for the hologram are generated by a centred camera with the following FOVs (see FIGS. 25a and 25b):

$$\Psi_{CH} = 2\tan^{-1}\left\{\frac{D + L}{2H} + \frac{|\omega_x|}{H}\right\} \tag{143}$$

$$\Psi_{CV} = 2\tan^{-1}\left\{\frac{R}{2H} + \frac{|\omega_y|}{H}\right\}$$

where as usual data is only rendering between $0 \le X \le D$ and $0 \le Y \le R$.

It is worth pointing out here that the render data for an entire composite hologram may well be generated at one time and then this data may be sorted into data that is relevant to the various respective sub-holograms. Alternatively, as we have envisaged in equation 143, data is rendered individually for each sub-hologram.

With reference to FIG. 25a the previously derived equation $u=\Pi/2+w$ is seen to remain valid as do the equations $x=X$ and $y=Y$. However the $\xi$ equation changes to $$\xi + \frac{D - L}{2} + \omega_x = X + w \tag{143a}$$

By analysis of FIG. 25b the vertical window constraint is seen to be:

$$v \ge \frac{\Sigma}{2} - Y + \frac{R}{2} + \omega_y - \frac{\Gamma}{2} \tag{143b}$$

$$v \le \frac{\Sigma}{2} - Y + \frac{R}{2} + \omega_y + \frac{\Gamma}{2}$$

or in terms of indices $$v \ge \frac{N_V - 1}{\Sigma}\left\{\frac{\Sigma}{2} - \frac{(\beta - 1)}{(N_B - 1)}R + \frac{(R - \Gamma)}{2} + \omega_y\right\} + 1$$

$$v \le \frac{N_V - 1}{\Sigma}\left\{\frac{\Sigma}{2} - \frac{(\beta - 1)}{(N_B - 1)}R + \frac{(R + \Gamma)}{2} + \omega_y\right\} + 1$$

The mask transformation for a single parallax hologram with an offset rectangular window may therefore be written as follows:

$$^{\mu\nu}S_{\alpha\beta} = {}^{k}I_{ij} \quad \text{when } v \ge \tag{143c}$$

$$(N_V - 1)\left\{\frac{1}{2} - \frac{(\beta - 1)R}{(N_B - 1)\Sigma} + \frac{R - \Gamma}{2\Sigma} + \frac{\omega_y}{\Sigma}\right\} + 1$$

$$\text{and } v \le (N_V - 1)\left\{\frac{1}{2} - \frac{(\beta - 1)R}{(N_B - 1)\Sigma} + \frac{R + \Gamma}{2\Sigma} + \frac{\omega_y}{\Sigma}\right\} + 1$$

$$\text{and } 0 \le k \le N_K$$

$$= 0 \quad \text{otherwise} \tag{143d}$$

where $$k = \left\{\frac{N_K - 1}{L}\right\}\left\{\frac{L - D}{2} + \frac{(\alpha - 1)D}{N_A - 1} + \frac{(\mu - 1)\Pi}{N_M - 1} - \frac{\Pi}{2} - \omega_x\right\} + 1, \tag{143e}$$

$$i = \frac{(\alpha - 1)(N_I - 1)}{N_A - 1} + 1, \tag{143f}$$

-continued $$j = \frac{(\beta-1)(N_J-1)}{N_B-1} + 1 \quad (143g)$$

It should be noted that the horizontal printer FOV must always be larger or equal to its counterpart camera FOV in this case. The vertical printer FOV will also need to be significantly larger than its counterpart camera FOV (see FIG. 25b). Since the viewing window will always be the same for each component sub-hologram we will generally require that $\Pi \geq D_T+L$ and $\Sigma \geq R_T+\Gamma$ where $D_T$ and $R_T$ are respectively the width and height of the complete assembled hologram.

We may now trivially generalize the above example to the full parallax case. The mask transformation (note that we require $\Theta=\Gamma$) now becomes:

$$^{\mu\nu}S_{\alpha\beta} = {}^{kg}I_{ij} \text{ when } 0 < k \leq N_K \quad (143h)$$

$$\text{and } 0 < g \leq N_G$$

$$= 0 \quad \text{otherwise}$$

where $$k = \left\{\frac{N_K-1}{L}\right\}\left\{\frac{L-D}{2} + \frac{(\alpha-1)D}{N_A-1} + \frac{(\mu-1)\Pi}{N_M-1} - \frac{\Pi}{2} - \omega_x\right\} + 1 \quad (142i)$$

$$i = \frac{(\alpha-1)(N_I-1)}{N_A-1} + 1, \quad (142j)$$

$$g = \left\{\frac{N_G-1}{\Gamma}\right\}\left\{\frac{\Gamma-R}{2} + \frac{(\beta-1)R}{N_B-1} + \frac{(\nu-1)\Sigma}{N_V-1} - \frac{\Sigma}{2} - \omega_y\right\} + 1 \quad (142k)$$

$$j = \frac{(N_J-1)(\beta-1)}{N_B-1} + 1 \quad (142l)$$

Note that in this case we require $$\Psi_{CH} = 2\tan^{-1}\left\{\frac{D+L}{2H} + \frac{|\omega_x|}{H}\right\} \quad (142m)$$

$$\Psi_{CV} = 2\tan^{-1}\left\{\frac{R+\Gamma}{2H} + \frac{|\omega_y|}{H}\right\}$$

In addition both the horizontal and vertical printer FOVs should be larger or equal to their counterpart camera FOVs.

Viewing Plane Different From Camera Plane

Up until now it has been assumed that the viewing plane is collocated at the camera plane. However it is possible to generalize to the case where these two planes are not collocated. Using our intuition or more formally, Huygens' principle, we see that in fact a full-parallax hologram does not need to be viewed at the camera plane in order to be undistorted. In contrast, a single-parallax hologram will inevitably show distortion if the viewer does not view the hologram at the camera plane. Depending on the size and depth of the single parallax hologram in question such distortion may either be important or in some cases, negligible.

In the case where digital image data is already available at one camera distance, it may sometimes make sense to use such data for the creation of a hologram having a different viewing window position rather than re-rendering. In this case the teaching presented hereto above will allow someone skilled in the art to derive similar equations to those already presented but covering the more general case of non-collocated camera and viewing planes.

We may also consider the possibility of defining an astigmatic viewing window, whose boundaries focus at different distances in the vertical and horizontal. For example the following transformation would describe the case of a single parallax hologram with an astigmatic rectangular viewing window with the horizontal window focus being located on the camera plane at a distance H from the hologram and the vertical window focus being located at a distance $H_v$.

$$^{\mu\nu}S_{\alpha\beta} = {}^k I_{ij} \text{ when } \nu \geq \quad (142n)$$

$$(N_V-1)\left\{\frac{1}{2} - \frac{(\beta-1)RH}{(N_B-1)\Sigma H_V} + \frac{(R-\Gamma)H}{2\Sigma H_V}\right\} + 1$$

$$\text{and } \nu \leq (N_V-1)\left\{\frac{1}{2} - \frac{(\beta-1)RH}{(N_B-1)\Sigma H_V} + \frac{(R+\Gamma)H}{2\Sigma H_V}\right\} + 1$$

$$\text{and } 0 \leq k \leq N_K$$

$$= 0 \quad \text{otherwise} \quad (142o)$$

where $$k = \left\{\frac{N_K-1}{L}\right\}\left\{\frac{L-D}{2} + \frac{(\alpha-1)D}{N_A-1} + \frac{(\mu-1)\Pi}{N_M-1} - \frac{\Pi}{2}\right\} + 1, \quad (142p)$$

$$i = \frac{(\alpha-1)(N_I-1)}{N_A-1} + 1, \quad (142q)$$

$$j = \frac{(\beta-1)(N_J-1)}{N_B-1} + 1 \quad (142r)$$

This transformation might be used when we wished the vertical window to have light scrolling characteristics at the (horizontal) viewing plane with a consequently less severe vertical window collapse going away from and towards the hologram. Such windows are particularly useful for highly asymmetric holograms where the width, D is very different from the height, R.

Finally paraxial mask transformations may be derived for generalized viewing window topologies (circles—ellipses—multiple viewing zones) and windows possessing generalized scrolling characteristics. In addition curved surface viewing and camera planes and the case of cameras that do not point always in the same direction are easily treated using the same formalism as hereto described.

Objective Distortion

Figure 26:
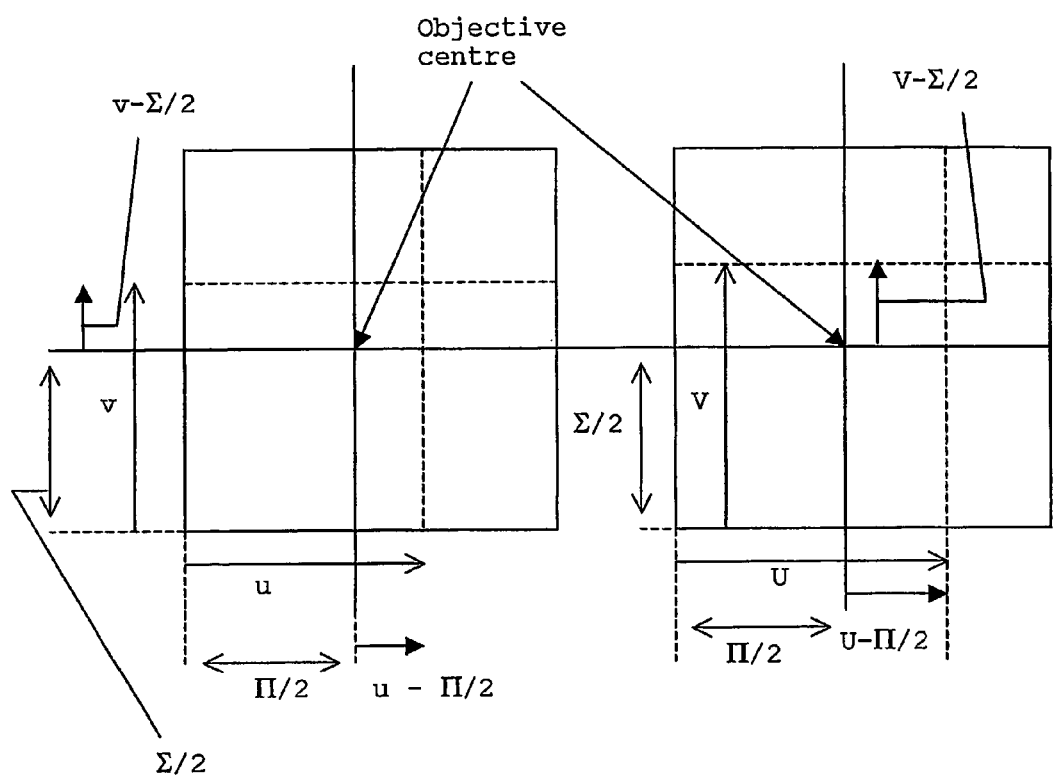
FIG. 26 illustrates the treatment of objective distortion: Normalized Object (left) and Image (right) planes.

In any real-world optical write-head of large FOV, there is inevitably significant optical distortion. Usually the predominant cause of this is aberration of the objective associated with a finite 5th Seidel coefficient. If we compare normalized object and image planes of a given objective as in FIG. 26 we may characterize this distortion by the following transformation:

$$u = \frac{\Pi}{2} + \left(U - \frac{\Pi}{2}\right)\rho(U, V) \quad (144)$$

$$v = \frac{\Sigma}{2} + \left(V - \frac{\Sigma}{2}\right)\rho(U, V) \quad (145)$$

-continued where $$\rho(U, V) = f((2U - \Pi)^2 + (2V - \Sigma)^2) \quad (146)$$

and $f$ is a single-valued 1-dimensional function that describes the distortion. These equations may also be interpreted as a transformation from real to paraxial object planes. By replacing the expressions $$u = (\mu - 1)\frac{\Pi}{N_M - 1}, \quad \mu = 1, \ldots, N_M \quad (147)$$

$$v = (\nu - 1)\frac{\Sigma}{N_V - 1}, \quad \nu = 1, \ldots, N_V \quad (148)$$

with $$u = \frac{\Pi}{2} + \left[(\mu - 1)\frac{\Pi}{N_M - 1} - \frac{\Pi}{2}\right]\rho_{\mu\nu}, \quad \mu = 1, \ldots, N_M \quad (149)$$

$$v = \frac{\Sigma}{2} + \left[(\nu - 1)\frac{\Sigma}{N_V - 1} - \frac{\Sigma}{2}\right]\rho_{\mu\nu}, \quad \nu = 1, \ldots, N_V \quad (150)$$

in all preceding equations we may thus derive mask-file transformations appropriate for use in write-heads with finite distortion. First let's take the case of the section entitled "Non-Centred Image with Fixed Rectangular Viewing Window of Same Size as Hologram" that treats single-parallax holograms. Here $\Pi = 2D$ $Q_X$ and $Q_Y = R$. Thus $$u = D + \left[(\mu - 1)\frac{2D}{N_M - 1} - D\right]\rho_{\mu\nu} = D + w \quad (151)$$

The equation $\xi = X + w$ then leads to $$(k-1)\frac{D}{N_K - 1} = (\alpha - 1)\frac{D}{N_A - 1} + \left[(\mu - 1)\frac{2D}{N_M - 1} - D\right]\rho_{\mu\nu} \quad (152)$$

Similarly the equation $x = D - w$ leads to $$(i-1)\frac{2D}{N_I - 1} = D - \left[(\mu - 1)\frac{2D}{N_M - 1} - D\right]\rho_{\mu\nu} \quad (153)$$

and the equation $y = Y$ leads to $$j = \frac{(\beta - 1)(N_J - 1)}{N_B - 1} + 1 \quad (154)$$

Likewise the vertical condition now becomes $$\frac{\Sigma}{2} - Y \leq \frac{\Sigma}{2} + \left[(\nu - 1)\frac{\Sigma}{N_V - 1} - \frac{\Sigma}{2}\right]\rho_{\mu\nu} \leq \frac{\Sigma}{2} - Y + R. \quad (155)$$

We therefore see that equations 19-22 are replaced by the following equations that are now valid for the finite objective distortion case:

$$^{\mu\nu}T_{\alpha\beta} = {}^k I_{ij} \quad \text{when} \quad \left\{\frac{1}{2} - \frac{(\beta - 1)}{N_B - 1}\frac{R}{\Sigma\rho_{\mu\nu}}\right\}(N_V - 1) + 1 \leq \quad (156)$$

$$\nu \leq \left\{\frac{1}{2} - \frac{(\beta - 1)}{N_B - 1}\frac{R}{\Sigma\rho_{\mu\nu}} + \frac{R}{\Sigma\rho_{\mu\nu}}\right\}(N_V - 1) + 1$$

$$\text{and } 0 < k \leq N_K, 0 \leq i \leq N_I \ \& \ 0 \leq j \leq N_J$$

$$= 0 \quad \text{otherwise}$$

where $$k = 1 + \frac{(\alpha - 1)(N_K - 1)}{(N_A - 1)} + (N_K - 1)\rho_{\mu\nu}\left[\frac{2(\mu - 1)}{(N_M - 1)} - 1\right], \quad (157)$$

$$i = 1 + \frac{(N_I - 1)}{2} - (N_I - 1)\rho_{\mu\nu}\left[\frac{(\mu - 1)}{N_M - 1} - \frac{1}{2}\right], \quad (158)$$

$$j = \frac{(\beta - 1)(N_J - 1)}{N_B - 1} + 1 \quad (159)$$

Note that for clarity S has now been replaced by T to distinguish data that has been corrected for optical distortion (T) over the data S which has not. Equation 24 remains invariant. Note also that equations 25-27 generalize to equations 157-159 and equations 31-38 are not relevant for the finite distortion case.

We may also generalize, for the finite distortion case, the (single parallax) equations presented in the section entitled "Centred Image with Fixed Rectangular Viewing Window". Equation 49 changes to equation 156. Equation 50 changes to equation 157. Equations 51 and 52 remain invariant as does equation 53. Equation 54 changes to equation 157. Equations 55 and 56 remain invariant.

Likewise we may generalize the (single-parallax) case of the section entitled "Centred Image with Maximum FOV" for finite distortion.

Here we start with the modified k equation:

$$(k-1)\frac{D+T}{N_K - 1} = \quad (160)$$

$$\frac{T}{2} + (\alpha - 1)\frac{D}{N_A - 1} + \frac{T}{2} + \left[(\mu - 1)\frac{T}{N_M - 1} - \frac{T}{2}\right]\rho_{\mu\nu} - \frac{T}{2}$$

from which we see that $$k = \frac{D}{D+T}(\alpha - 1)\frac{(N_K - 1)}{(N_A - 1)} + \quad (161)$$

$$\frac{T}{2}\frac{(N_K - 1)}{(D+T)} + \frac{T}{D+T}(N_K - 1)\rho_{\mu\nu}\left[\frac{\mu - 1}{N_M - 1} - \frac{1}{2}\right] + 1$$

Equations 72, 74 and 75 thus remain invariant whereas equation 73 transforms to equation 161. We may derive the analogue of equation 76 by noting that now $$\frac{\Sigma}{2} + \left[\frac{(\nu - 1)}{N_V - 1}\Sigma - \frac{\Sigma}{2}\right]\rho_{\mu\nu} \geq \Sigma\left\{\frac{1}{2} - \frac{R(\beta - 1)}{\Sigma N_B - 1} + \frac{R - \Gamma}{2\Sigma}\right\} \quad (162)$$

from whence we see that $$v \geq (N_V - 1)\left\{\frac{1}{2} - \frac{R}{\Sigma\rho_{\mu\nu}}\frac{(\beta-1)}{(N_B-1)} + \frac{R-\Gamma}{2\Sigma\rho_{\mu\nu}}\right\} + 1. \tag{163}$$

The other part of equation 76 follows in the same fashion whereupon we see that this equation transforms to $$^{\mu\nu}T_{\alpha\beta} = {}^{k}I_{ij} \quad \text{when } v \geq (N_V - 1)\left\{\frac{1}{2} - \frac{R}{\Sigma\rho_{\mu\nu}}\frac{(\beta-1)}{(N_B-1)} + \frac{R-\Gamma}{2\Sigma\rho_{\mu\nu}}\right\} + 1 \tag{164}$$

$$\text{and } v \leq (N_V - 1)\left\{\frac{1}{2} - \frac{R}{\Sigma\rho_{\mu\nu}}\frac{(\beta-1)}{(N_B-1)} + \frac{R+\Gamma}{2\Sigma\rho_{\mu\nu}}\right\} + 1$$

$$\text{and } 0 < k \leq N_K, 0 \leq i \leq N_I \ \& \ 0 \leq j \leq N_J$$

$$= 0 \quad \text{otherwise}$$

where $$k = \frac{D}{D+T}(\alpha-1)\frac{(N_K-1)}{(N_A-1)} + \tag{165}$$
$$\frac{T}{2}\frac{(N_K-1)}{(D+T)} + \frac{T}{D+T}(N_K-1)\rho_{\mu\nu}\left[\frac{\mu-1}{N_M-1} - \frac{1}{2}\right] + 1$$

$$i = \frac{(\alpha-1)(N_I-1)}{N_A-1} + 1, \tag{166}$$

$$j = \frac{(\beta-1)(N_J-1)}{N_B-1} + 1 \tag{167}$$

Equations 73-80 transform as equations 73-75.

As a further example of the generalization of the paraxial mask transformations to their finite distortion counterparts we note that equation 87 must be replaced by $$k = \left[\frac{N_K-1}{L}\right]\left[\frac{L-D}{2} + (\alpha-1)\frac{D}{N_A-1} + \rho_{\mu\nu}\Pi\left\{\frac{\mu-1}{N_M-1} - \frac{1}{2}\right\}\right] + 1 \tag{168}$$

Thus equation 85 then changes to equation 164. Equation 87 changes to equation 168 and equations 88 and 89 remain invariant.

The full-parallax offset-window transformation likewise generalizes to the following form:

$$^{\mu\nu}T_{\alpha\beta} = {}^{kg}I_{ij} \quad \text{when } 0 < k \leq N_K, 0 \leq i \leq N_I, 0 \leq j \leq N_J \tag{168a}$$

$$\text{and } 0 < g \leq N_G$$

$$= 0 \quad \text{otherwise}$$

where $$k = \left[\frac{N_K-1}{L}\right]\left[\frac{L-D}{2} + \tag{168b}\right.$$
$$\left.(\alpha-1)\frac{D}{N_A-1} + \rho_{\mu\nu}\Pi\left\{\frac{\mu-1}{N_M-1} - \frac{1}{2}\right\} - \omega_X\right] + 1$$

$$i = \frac{(\alpha-1)(N_I-1)}{N_A-1} + 1, \tag{168c}$$

$$g = \left[\frac{N_G-1}{\Gamma}\right]\left[\frac{\Gamma-R}{2} + \tag{168d}\right.$$
$$\left.(\beta-1)\frac{R}{N_B-1} + \rho_{\mu\nu}\Sigma\left\{\frac{v-1}{N_V-1} - \frac{1}{2}\right\} - \omega_Y\right] + 1$$

$$j = \frac{(N_J-1)(\beta-1)}{N_B-1} + 1 \tag{168e}$$

Following the technique that we have described and illustrated above, it will be clear to those skilled in the art how all single and double parallax paraxial mask transformations may be generalized to their finite distortion counterparts for the case of a static SLM.

Figure 27:
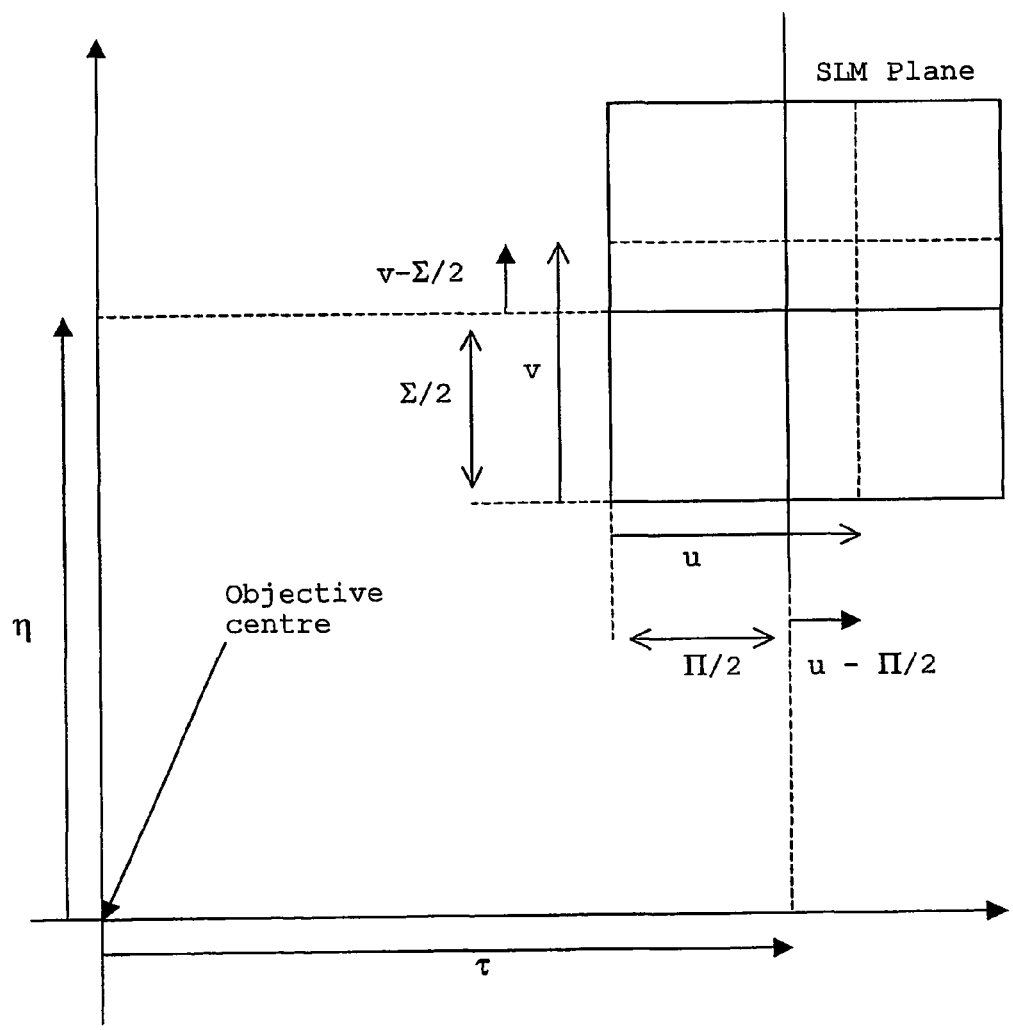
FIG. 27 illustrates the case of a moving SLM.

In the case that the SLM is moved during the writing of the hologram equations 144 to 146 are modified. FIG. 27 shows a normalized SLM object plane that is now displaced from the centre of the objective by an amount $\tau$ in the x direction and by an amount $\eta$ in the y direction (see equations 92 and 93). Equations 144 to 146 thus become $$u = \frac{\Pi}{2} - \tau + \left(U - \frac{\Pi}{2} + \tau\right)\rho(U+\tau, V+\eta) \tag{169-170}$$

$$v = \frac{\Sigma}{2} - \eta + \left(V - \frac{\Sigma}{2} + \eta\right)\rho(U+\tau, V+\eta)$$

where $$\rho(U+\tau, V+\eta) = f((2U-\Pi+2\tau)^2 + (2V-\Sigma+2\eta)^2)$$

We note that, as before, $f$ is a simple single-valued one dimensional function. We also note that $\tau$ is a function of $\alpha$ and that $\eta$ is a function of $\beta$. We may thus define the tensor $\rho_{\alpha\beta\mu\nu}$ as representing the distortion function at every point of interest.

As before, by replacing the expressions $$u = (\mu-1)\frac{\Pi}{N_M-1}, \quad \mu = 1, \ldots, N_M \tag{171}$$

$$v = (\nu-1)\frac{\Sigma}{N_V-1}, \quad \nu = 1, \ldots, N_V \tag{172}$$

with $$u = \frac{\Pi}{2} - \tau + \left[(\mu-1)\frac{\Pi}{N_M-1} - \frac{\Pi}{2} + \tau\right]\rho_{\alpha\beta\mu\nu}, \quad \mu = 1, \ldots, N_M \tag{173}$$

$$v = \frac{\Sigma}{2} - \eta + \left[(\nu-1)\frac{\Sigma}{N_V-1} - \frac{\Sigma}{2} + \eta\right]\rho_{\alpha\beta\mu\nu}, \quad \nu = 1, \ldots, N_V \tag{174}$$

in all preceding equations we may thus derive mask-file transformations appropriate for the case of a moving SLM and for use in write-heads with finite distortion. Note that $\tau$ and $\eta$ are given by equations 92 and 93.

All static and moving SLM mask-file transformations presented hitherto may be converted in the above fashion to finite distortion mask-file transforms. In practice only these finite distortion transforms are of practical use. One might imagine that an alternative procedure would be to employ paraxial transforms and then to reapply other transforms to correct for finite optical distortion.

For instance, if we define $^{\mu\nu}T_{\alpha\beta}$ as representing the mask information corrected for finite distortion then the following transformation will convert the paraxial mask information S into the required corrected form T:

$$^{\bar{\mu}\bar{\nu}}T_{\alpha\beta} = {}^{\mu\nu}S_{\alpha\beta} \qquad (168a)$$

where $$\mu = 1 + \rho_{\bar{\mu}\bar{\nu}}\left\{\bar{\mu} - 1 - \frac{N_M - 1}{2}\right\} + \frac{N_M - 1}{2} \qquad (168b)$$

$$\nu = 1 + \rho_{\bar{\mu}\bar{\nu}}\left\{\bar{\nu} - 1 - \frac{N_V - 1}{2}\right\} + \frac{N_V - 1}{2} \qquad (168c)$$

However, such sequential application of transforms is undesirable and would lead to a significant increase both in computational time and most importantly to interpolation error.

The reason that sequential transforms act to significantly increase interpolation error is that usually paraxial mask-file transforms must be computed using a truncation type of interpolation. This is because the 'magic number' representation presented earlier is rarely flexible enough for practical commercial use. Thus, in sequential application, the index rules for the integers i, j, k and g are truncated from a rational representation to an integer representation, giving rise to a truncation error. Then later the index rules of 168b and 168c exacerbate the error by converting a generally irrational RHS containing the prior truncation error into an integer RHS. Additionally the constraint that third-party 3D software programs must be used implies that specialized non-Cartesian meshes are not an option. Even if more advanced forms of interpolation are used in the calculation of S from I (over and above simple truncation methods) one inevitably incurs an interpolative error. By using sequential transforms such errors are compounded whereas by formulating a single finite distortion mask transformation only one interpolation error is produced. It is thus vital that a single transform is derived that treats both the ideal paraxial mask-file transform and the write-head optical distortion.

Generalization to Multiple Colour

All of the mask transforms above are valid for each and every colour channel employed in the holographic printer. Note that each colour channel will have its own distortion function and as such $\rho_{\mu\nu}$ and $\rho_{\alpha\beta\mu\nu}$ will be different for each colour.

Other Distortions

Many other image distortions may arise in a holographic printing system. Amongst these are distortions caused by emulsion swelling due to chemical processing, replay wavelength not equal to record wavelength, reference Beam angle different on replay to recording, object Beam axial angle different on replay to recording and further holographic transferring.

Many of these distortions are mathematically similar to the objective distortion discussed above (although they may lack that distortion's rotational symmetry properties and they may be very different for each colour channel). This is, because such distortions usually act only to change the index swapping laws in the mask transformation. Therefore such distortions may be incorporated into a single mask transformation just as we have discussed above for the case of objective distortion. By deriving a single finite distortion mask transformation that incorporates all distortions inherent in the printing system we benefit greatly in terms of interpolation noise and computational speed.

Numerical Pre-distortion of Image Data for Compensation of Disparity between Recording and Replay Geometries It has been seen above how fundamental (perspective view) image data must be transformed in order to write 1-step holograms. In particular the importance of including, in the definition of a single transform, all of the printing system's distortions has been underlined.

The objective distortion that has been discussed at length above is critical to the operation of the class of printers under discussion (i.e. that are suitable for writing medium to large format holograms). It is thus impossible to "minimize" this distortion as the performance of the printer is directly related to its magnitude. However, this is not necessarily the case with the other subsidiary distortions that we have introduced. The most important of these in 1-step holographic printing devices is usually the disparity of the recording and replay reference ray geometries. This arises due to the fact that larger holograms are inevitably lit by point sources and yet the simplest and most elegant solution for the recording is a collimated reference beam.

One approach that has been advocated in PCT applications WO 00/29909 and WO 0029908 is to essentially eliminate all distortions caused by disparity in the recording and illumination reference ray geometries such that in fact no numerical compensation for this distortion is required. However this leads to a complex mechanical solution for the two dimensional control of the recording reference beam and, as we shall see below, to non-optimum viewing characteristics of the final hologram.

We disclose here two solutions to the present problem relevant to reflection type holograms. The first uses a simple fixed and collimated reference beam for recording. Mask transforms are then defined that take into account this fact and the required replay geometry (usually a point source at some distance). The second solution utilizes a combination of deliberate image pre-distortion (integrated into a mask transform as above) and deliberate over-correction of the recording reference ray. Whilst being electromechanically more complicated this second solution enjoys the merit of producing holograms with superior viewing characteristics.

Geometrical Ray Analysis of a Hologram

In order to understand how the digital image data that are used to record a hologram may be pre-distorted such that the final holographic image appears undistorted when viewed under a chosen lighting geometry, we will now study exactly how the holographic image is distorted when recording and replay geometries are different.

Model

Figure 28A:
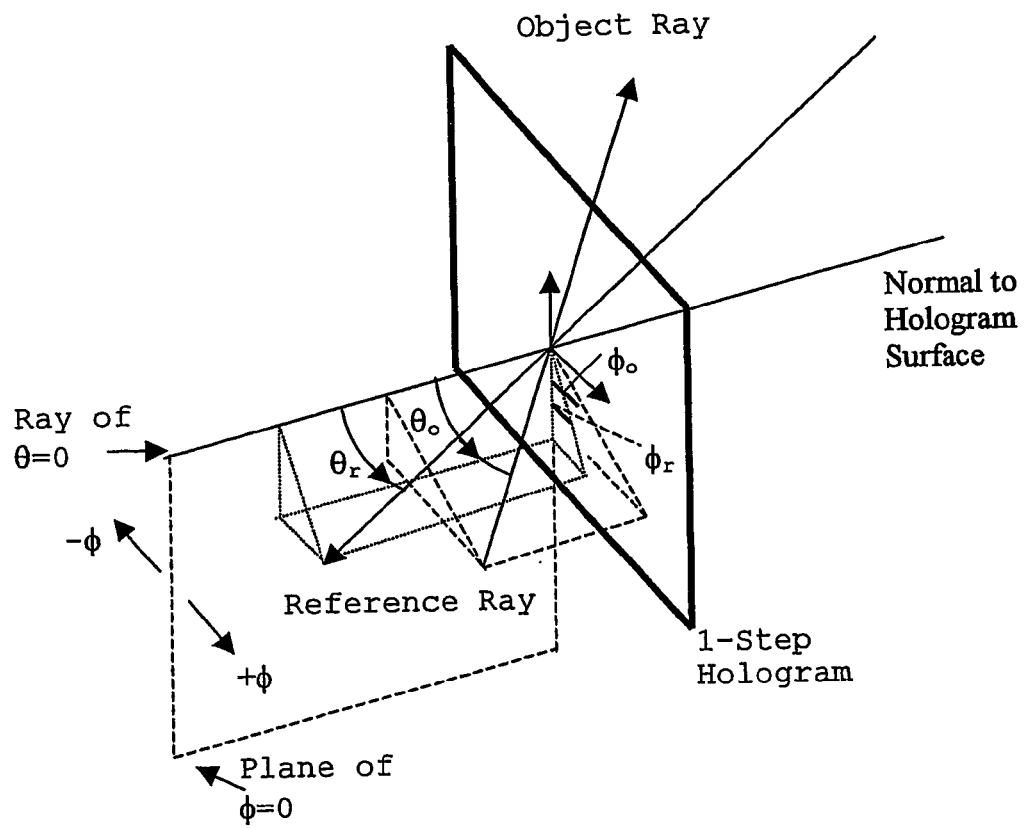
FIG. 28 illustrates the right-handed spherical coordinate system used for the diffraction analysis—(a) recording geometry and (b) playback geometry.
Figure 28B:
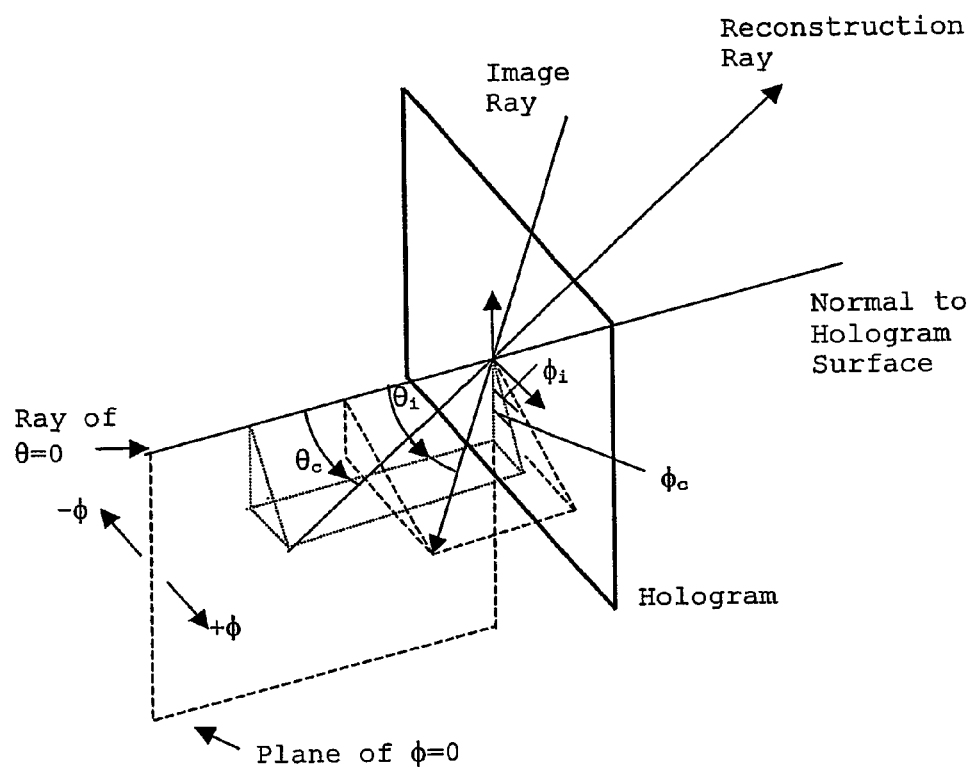
Figure 29A:
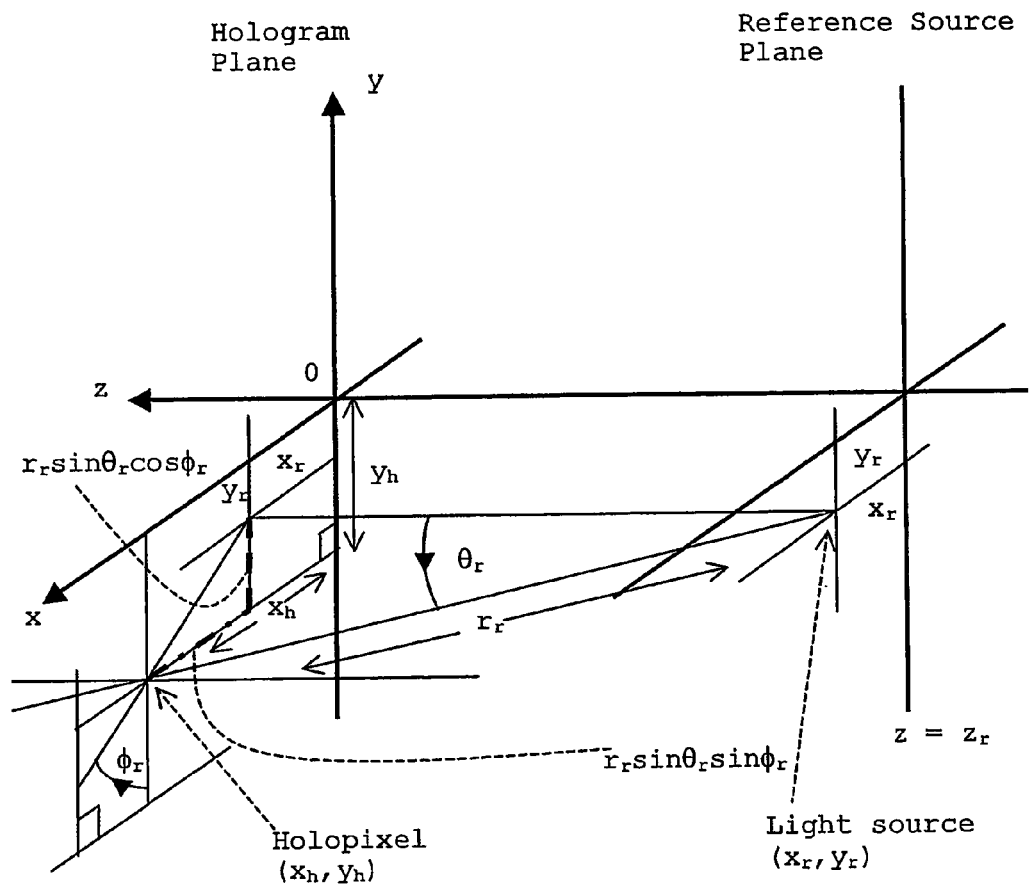
FIG. 29a illustrates the geometry for a point-source reference.
Figure 29B:
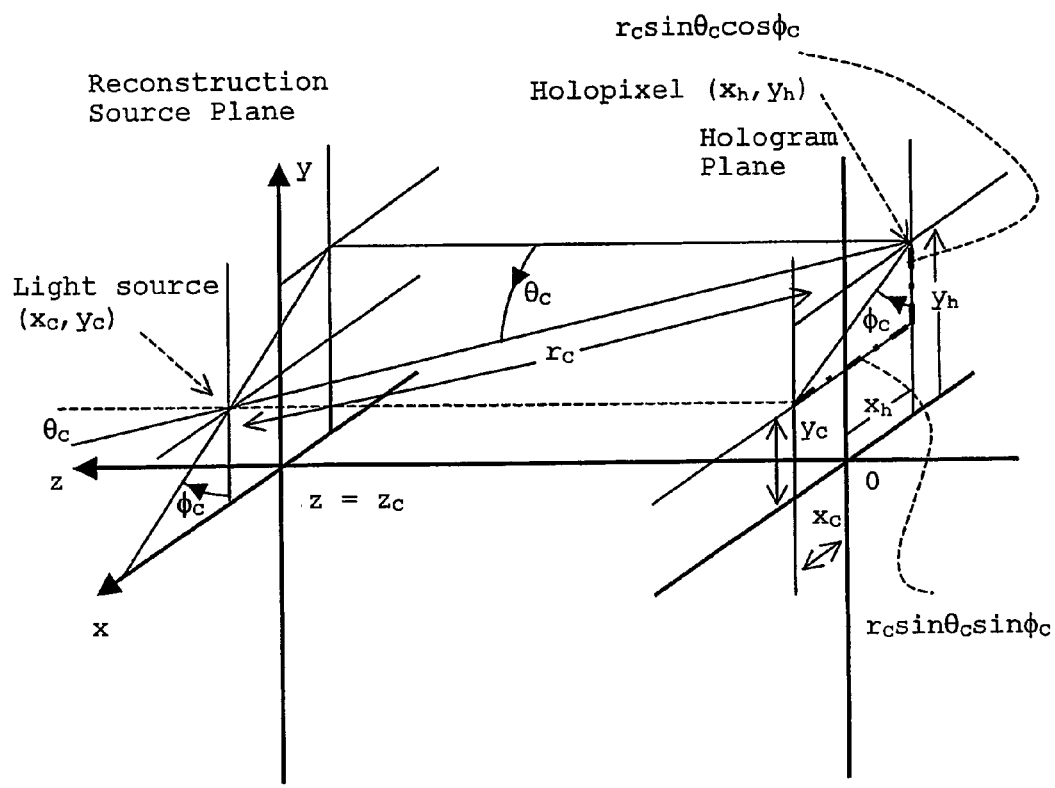
FIG. 29b illustrates the geometry for a point-source reconstruction.
Figure 29C:
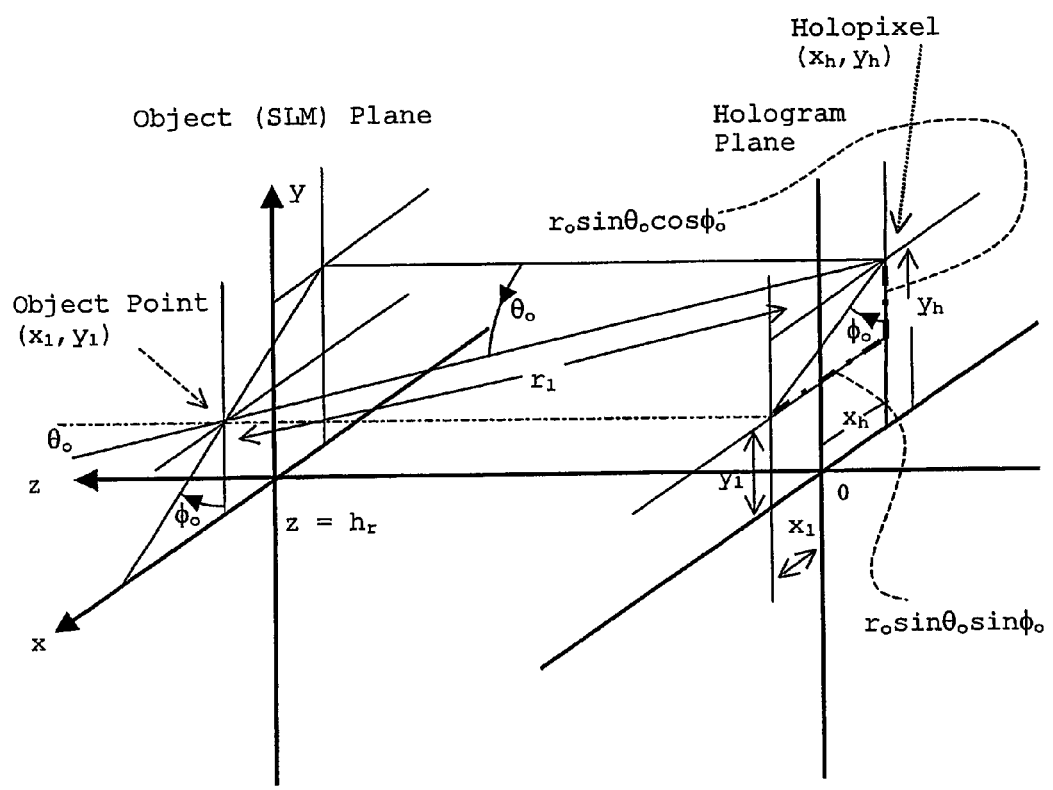
FIG. 29c illustrates the geometry for the object point on recording.
Figure 29D:
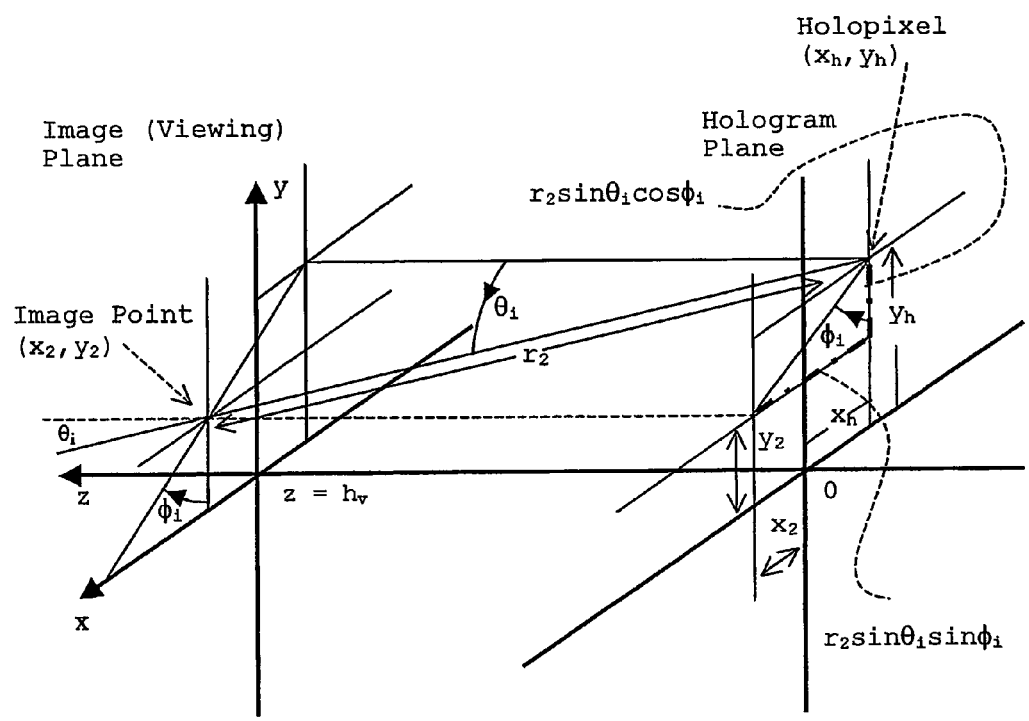
FIG. 29d illustrates the geometry for the image point on reconstruction.
Figure 29E:
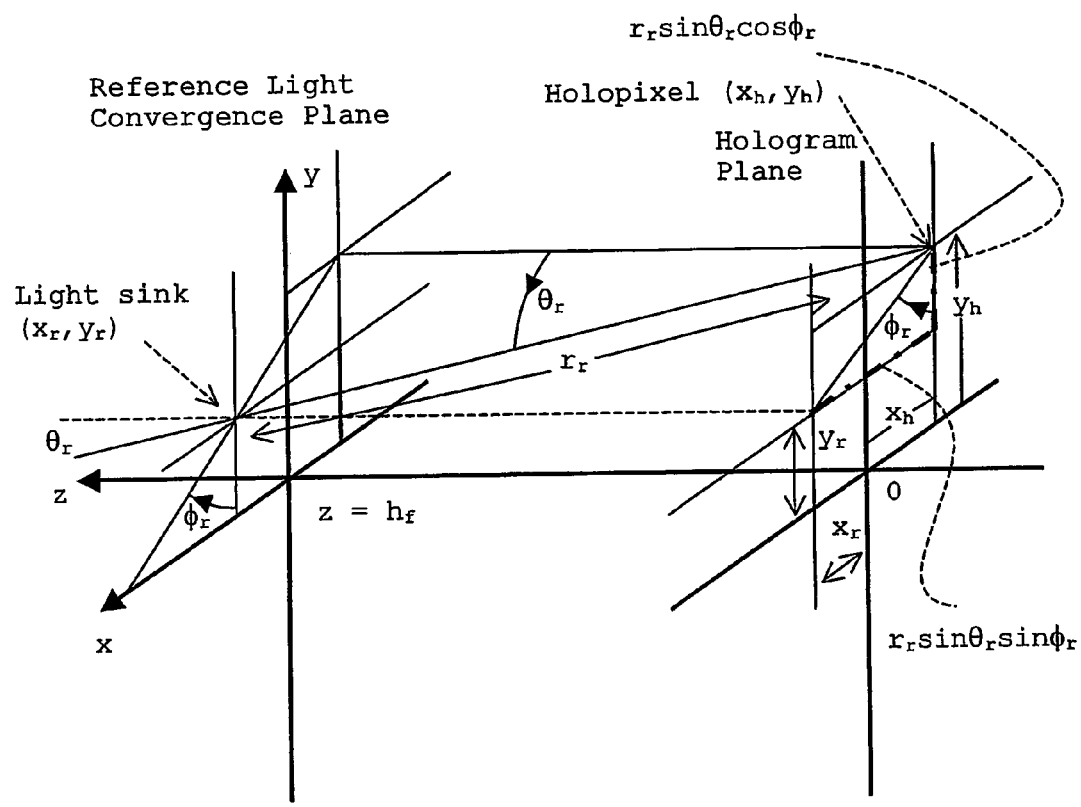
FIG. 29e illustrates the geometry for a point sink reference.

Firstly let us use a standard right-handed spherical coordinate system centred on a given holopixel as depicted in FIG. 28. We define an arbitrary point on the object ray as $(r_o, \theta_o, \Phi_o)$ and an arbitrary point on the reference light ray as $(r_r, \theta_r, \phi_r)$. On replay of the holopixel we define an arbitrary point on the illumination ray as $(r_c, \theta_c, \phi_c)$ and an arbitrary point on the reconstructed image ray as $(r_i, \theta_i, \phi_i)$. Next we write down the Bragg-Diffraction equations for a single holopixel for reflection geometry:

$$k_2[\sin\theta_i \sin\theta_i + \sin\theta_c \sin\phi_c]_{ext} = k_1[\sin\theta_o \sin\phi_o + \sin\theta_r \sin\phi_r]_{ext} \qquad (175)$$

$$k_2[\cos\phi_i \sin\theta_i + \sin\theta_c \cos\phi_c]_{ext} = k_1[\sin\theta_o \cos\phi_o + \sin\theta_r \cos\phi_r]_{ext} \qquad (176)$$

$$k_2[\cos\theta_i + \cos\theta_c]_{int} = \alpha k_1[\cos\theta_o + \cos\theta_r]_{int} \qquad (177)$$

$$n \sin\theta_{int} = \sin\theta_{ext} \qquad (178)$$

Here $k_1$ is the wavenumber at recording and $k_2$ is the wavenumber at replay. The parameter $\alpha$ represents a factor describing how much the emulsion is swollen before recording. The subscript 'ext' refers to the $\theta$ angles just outside the emulsion layer whereas the subscript 'int' refers to $\theta$ angles inside the emulsion. Equation 178, which is Snell's law, connects these two types of angles. Note that in the geometry that we have chosen $\phi$ is invariant across the emulsion/air interface.

Equations 175-177 may be derived in a number of ways, the simplest being to demand that $$\vec{K} = \vec{k}_r - \vec{k}_O = -\underline{\alpha} : (\vec{k}_C - \vec{k}_i) = \begin{pmatrix} 1 & 0 & 0 \\ 0 & 1 & 0 \\ 0 & 0 & \alpha \end{pmatrix}(\vec{k}_C - \vec{k}_i) \tag{178a}$$

where the quantities $$\vec{k}_r \equiv \begin{pmatrix} k_1 \sin\theta_r \sin\phi_r \\ -k_1 \sin\theta_r \cos\phi_r \\ k_1 \cos\theta_r \end{pmatrix}, \quad \vec{k}_o \equiv \begin{pmatrix} -k_1 \sin\theta_O \sin\phi_O \\ k_1 \sin\theta_O \cos\phi_O \\ -k_1 \cos\theta_O \end{pmatrix} \tag{178b}$$

$$\vec{k}_c \equiv \begin{pmatrix} -k_2 \sin\theta_C \sin\phi_C \\ k_2 \sin\theta_C \cos\phi_C \\ -k_2 \cos\theta_C \end{pmatrix} \text{ and } \vec{k}_i \equiv \begin{pmatrix} k_2 \sin\theta_i \sin\phi_i \\ -k_2 \sin\theta_i \cos\phi_i \\ k_2 \cos\theta_i \end{pmatrix}$$

are the respective wavevectors, $\vec{K}$ is the normal fringe plane vector, $\underline{\alpha}$ is the emulsion swelling matrix and all angles are internal. Equations 175-177 then correspond to the x, y and z components of this equation. Note that the x and y components are invariant under internal-external angle transformations. Note also that the z component is independent of azimuthal coordinate. This is because z is orthogonal to $\hat{\phi}$.

Now let us superimpose a right-handed Cartesian system on our spherical system as depicted in FIGS. 29(a-d). Note that the origin (x,y,z)=(0,0,0) coincides with the centre of the 1-step hologram. The origin of the spherical system, however, coincides with the holopixel under scrutiny.

The plane (x,y,z=$h_r$) is the recording plane. The plane (x,y,z=$h_v$) is the viewing plane. The plane (x,y,z=0) is the hologram plane. The point ($X_h$,$y_h$,0) is the holopixel of interest. The point ($x_1$,$Y_1$,$h_r$) represents the intersection of the recording object ray (that intersects with the holopixel and the actual object point) with the recording plane. The point ($x_2$,$y_2$,$h_v$) represents the intersection of the replayed image ray (emanating from the holopixel) with the viewing plane.

The point ($X_c$,$y_c$,$z_c$) is the location of the point source illumination on replay. Note that $z_c>0$ and that $y_c$ is negative for the given form of equations 175 to 178. Initially we will treat the case of a collimated reference beam in which case we will just describe this set of rays by the spherical coordinate $\theta_r$. However, later on we will examine the case where the reference beam on recording is changed during the process of writing. In this case the intersection of the various rays will form a point sink at ($x_r$, $y_r$, $z_r$) with $z_r$ positive (and $y_r$ negative) (see FIG. 29e).

Collimated Reference Wave Geometry

Now let us write down the various relations that exist between representations in the spherical and Cartesian coordinate systems:

$$x_h = x_c - r_c \sin\theta_c \sin\phi_c \tag{179}$$

$$y_h = y_c + r_c \sin\theta_c \cos\phi_c \tag{180}$$

$$x_h = x_1 - r_1 \sin\theta_o \sin\phi_o \tag{181}$$

$$y_h = y_1 + r_1 \sin\theta_o \cos\phi_o \tag{182}$$

$$x_h = x_2 - r_2 \sin\theta_i \sin\phi_i \tag{183}$$

$$y_h = y_2 + r_2 \sin\theta_i \cos\phi_i \tag{184}$$

We can trivially rearrange these expressions to give equations for the terms present in equations 175 to 176:

$$\sin\theta_C \sin\phi_C = \frac{x_C - x_h}{r_c} \tag{185}$$

$$\sin\theta_C \cos\phi_C = \frac{y_h - y_C}{r_c} \tag{186}$$

$$\sin\theta_O \sin\phi_O = \frac{x_1 - x_h}{r_1} \tag{187}$$

$$\sin\theta_O \cos\phi_O = \frac{y_h - y_1}{r_1} \tag{188}$$

$$\sin\theta_i \sin\phi_i = \frac{x_2 - x_h}{r_2} \tag{189}$$

$$\sin\theta_i \cos\phi_i = \frac{y_h - y_2}{r_2} \tag{190}$$

Now let us combine equations 177 and 178:

$$\sqrt{1 - \frac{\sin^2\theta_i}{n^2}} + \sqrt{1 - \frac{\sin^2\theta_C}{n^2}} = \frac{\alpha k_1}{k_2}\left\{\sqrt{1 - \frac{\sin^2\theta_O}{n^2}} + \sqrt{1 - \frac{\sin^2\theta_r}{n^2}}\right\} \tag{191}$$

Expressions for $\sin\theta_O$, $\sin\theta_1$ and $\sin\theta_c$ may be obtained from equations 179 to 184. Specifically $$\sin^2\theta_C = \frac{(x_C - x_h)^2 + (y_h - y_C)^2}{r_C^2} \tag{192}$$

$$\sin^2\theta_O = \frac{(x_1 - x_h)^2 + (y_h - y_1)^2}{r_1^2} \tag{193}$$

$$\sin^2\theta_i = \frac{(x_2 - x_h)^2 + (y_h - y_2)^2}{r_2^2} \tag{194}$$

Hence substituting equations 192 to 194 into 191 we obtain $$k_2\left[\sqrt{1 - \frac{(x_2 - x_h)^2 + (y_2 - y_h)^2}{n^2 r_2^2}} + \sqrt{1 - \frac{(x_C - x_h)^2 + (y_C - y_h)^2}{n^2 r_C^2}}\right] = \tag{195}$$

$$k_1\alpha\left[\sqrt{1-\frac{(x_1-x_h)^2+(y_1-y_h)^2}{n^2r_1^2}}+\sqrt{1-\frac{\sin^2\theta_r}{n^2}}\right]$$

Note that $\theta_r$ has been left explicitly in this expression as the case of a collimated recording reference beam, characterized by zero azimuthal angle and a given altitudinal angle $\theta_r$, is being discussed. We now introduce the following variables $$\epsilon = x_h - x_1 \tag{196}$$

$$\tau = x_h - x_2 \tag{197}$$

$$\gamma = y_2 - y_h \tag{198}$$

$$\sigma = y_1 - y_h \tag{199}$$

$$\mu = y_c - y_h \tag{200}$$

$$\xi = x_h - x_c \tag{201}$$

Using these expressions in equations 185-190 we can rewrite equations 175 and 176:

$$k_2\left(\frac{\tau}{r_2}+\frac{\xi}{r_C}\right)=\frac{k_1\varepsilon}{r_1} \tag{202}$$

$$k_2\left(\frac{\gamma}{r_2}+\frac{\mu}{r_C}\right)=k_1\left(\frac{\sigma}{r_1}-\sin\theta_r\right) \tag{203}$$

Dividing these two equations we eliminate $k_1$ and $k_2$:

$$\left(\frac{\tau}{r_2}+\frac{\xi}{r_C}\right)\left(\frac{\sigma}{r_1}-\sin\theta_r\right)=\left(\frac{\varepsilon}{r_1}\right)\left(\frac{\gamma}{r_2}+\frac{\mu}{r_C}\right) \tag{204}$$

Now let us substitute equations 196 to 201 into 195:

$$k_2\left(\sqrt{1-\frac{\tau^2+\gamma^2}{n^2r_2^2}}+\sqrt{1-\frac{\xi^2+\mu^2}{n^2r_C^2}}\right)=$$
$$k_1\alpha\left(\sqrt{1-\frac{\varepsilon^2+\sigma^2}{n^2r_1^2}}+\sqrt{1-\frac{\sin^2\theta_r}{n^2}}\right) \tag{205}$$

Using equation 202 we can now eliminate $k_1$ and $k_2$:

$$\left(\frac{\varepsilon}{r_1}\right)\left(\sqrt{1-\frac{\tau^2+\gamma^2}{n^2r_2^2}}+\sqrt{1-\frac{\xi^2+\mu^2}{n^2r_C^2}}\right)= \tag{206}$$
$$\alpha\left(\frac{\tau}{r_2}+\frac{\xi}{r_C}\right)\left(\sqrt{1-\frac{\varepsilon^2+\sigma^2}{n^2r_1^2}}+\sqrt{1-\frac{\sin^2\theta_r}{n^2}}\right)$$

We must now write down relations describing the radial co-ordinates $r_1$, $r_2$ and $r_c$. From FIGS. 29b,c and d we see straight away that:

$$r_c^2 = \xi^2 + \mu^2 + z_c^2 \tag{207}$$

$$r_1^2 = \epsilon^2 + \sigma^2 + h_v^2 \tag{208}$$

$$r_2^2 = \tau^2 + \gamma^2 + h_v^2 \tag{209}$$

The $(\gamma,\tau)$ Equations

Equations 204, 206, 207, 208 and 209 now constitute a complete set of equations for the variables $\gamma$ and $\tau$. These two variables respectively tell us the y and x co-ordinates of the intersection of the diffracted ray emanating from the holopixel at $(x_h, y_h, 0)$ with the viewing plane, on replay of the hologram. The equations allow us to thus calculate $\gamma$ and $\tau$ if we know the geometry of the playback light and all the recording geometry. The equations are quartic in nature and may best be written in parametric form as follows:

$$a\tau + b\gamma + gR = 0 \tag{210}$$

$$\frac{d\tau}{R}=\sqrt{1-\frac{\tau^2+\gamma^2}{n^2R^2}}+c \tag{211}$$

$$R^2 = \tau^2 + \gamma^2 + h_v^2 \tag{212}$$

Here we have used $R=r_2$ for simplicity and $$a = \frac{\sigma}{r_1} - \sin\theta_r \tag{213}$$

$$b = -\frac{\varepsilon}{r_1} \tag{214}$$

$$c = \sqrt{1-\frac{\xi^2+\mu^2}{n^2r_C^2}}-\frac{\xi d}{r_C} \tag{215}$$

$$d = \frac{r_1\alpha}{\varepsilon}\left(\sqrt{1-\frac{\varepsilon^2+\sigma^2}{n^2r_1^2}}+\sqrt{1-\frac{\sin^2\theta_r}{n^2}}\right) \tag{216}$$

$$g = \frac{\xi}{r_C}\left(\frac{\sigma}{r_1}-\sin\theta_r\right)-\frac{\varepsilon\mu}{r_1r_C} \tag{217}$$

As we have the above equations 44-46 are quartic and hence have 4 solutions. Two of these solutions have negative values of R and hence we will disregard these as we have adopted the convention of positive R in the definition of our spherical coordinate system in order to maintain its single-valuedness. The first solution for positive R is:

$$\tau = \frac{h_v}{2\Omega_4 dn^2}\sqrt{\frac{\Omega_5}{\Omega_1}}\left\{\begin{array}{l}b^2+a^2+n^2d^2b^2-g^2n^2d^2-n^2b^2-\\a^2n^2+n^2c^2b^2+n^2c^2a^2-\\\frac{\Omega_1}{\Omega_5}(b^2+a^2+n^2d^2b^2)\end{array}\right\} \tag{218}$$

$$\gamma = -\frac{h_v}{2\Omega_4 dn^2 b}\sqrt{\frac{\Omega_5}{\Omega_1}}\left\{\begin{array}{l}ab^2+a^3+an^2d^2b^2+ag^2n^2d^2-\\an^2b^2-a^3n^2+an^2c^2b^2+\\n^2c^2a^3+2gn^2dcb^2+2gn^2dca^2-\\\frac{\Omega_1}{\Omega_5}(ab^2+a^3+an^2d^2b^2)\end{array}\right\} \tag{219}$$

$$R = h_v\sqrt{\frac{\Omega_5}{\Omega_1}} \tag{220}$$

The second solution for positive R is:

$$\tau = \frac{h_v}{2\Omega_4 dn^2}\sqrt{\frac{\Omega_3}{\Omega_1}} \begin{Bmatrix} b^2+a^2+n^2d^2b^2-g^2n^2d^2-n^2b^2- \\ a^2n^2+n^2c^2b^2+n^2c^2a^2- \\ \frac{\Omega_1}{\Omega_3}(b^2+a^2+n^2d^2b^2) \end{Bmatrix} \quad (221)$$

$$\gamma = -\frac{h_v}{2\Omega_4 dn^2 b}\sqrt{\frac{\Omega_3}{\Omega_1}} \begin{Bmatrix} ab^2+a^3+an^2d^2b^2+ag^2n^2d^2- \\ an^2b^2-a^3n^2+an^2c^2b^2+ \\ n^2c^2a^3+2gn^2dcb^2+2gn^2dca^2- \\ \frac{\Omega_1}{\Omega_3}(ab^2+a^3+an^2d^2b^2) \end{Bmatrix} \quad (222)$$

$$R = h_v\sqrt{\frac{\Omega_3}{\Omega_1}} \quad (223)$$

The various $\Omega$ parameters referred to in the above equations are simple algebraic functions of a,b,c,d,g and n. We do not list these functions here for reasons of length and for the reason that their derivation will be evident for a person skilled in the art. For example we have derived these functions ourselves using a commercial symbolic manipulation program.

Even though there are two positive R solutions to the equations 210 to 212 only one is interesting. We must choose the root by requiring that $k_2$ as defined by equation 203 be non-zero and positive valued.

In this section a set of algebraic equations has been derived that define the x and y replay ray intersections with the viewing plane of the hologram. These equations assume a certain hologram recording geometry (we have used the case of a collimated plane recording wave above) and a certain hologram replay geometry (generally non-collimated).

The ($\gamma,\tau$) equations will now be applied in order to analyze exactly how the form of the hologram viewing window distorts due to the disparity between recording and replay geometries.

Figure 30:
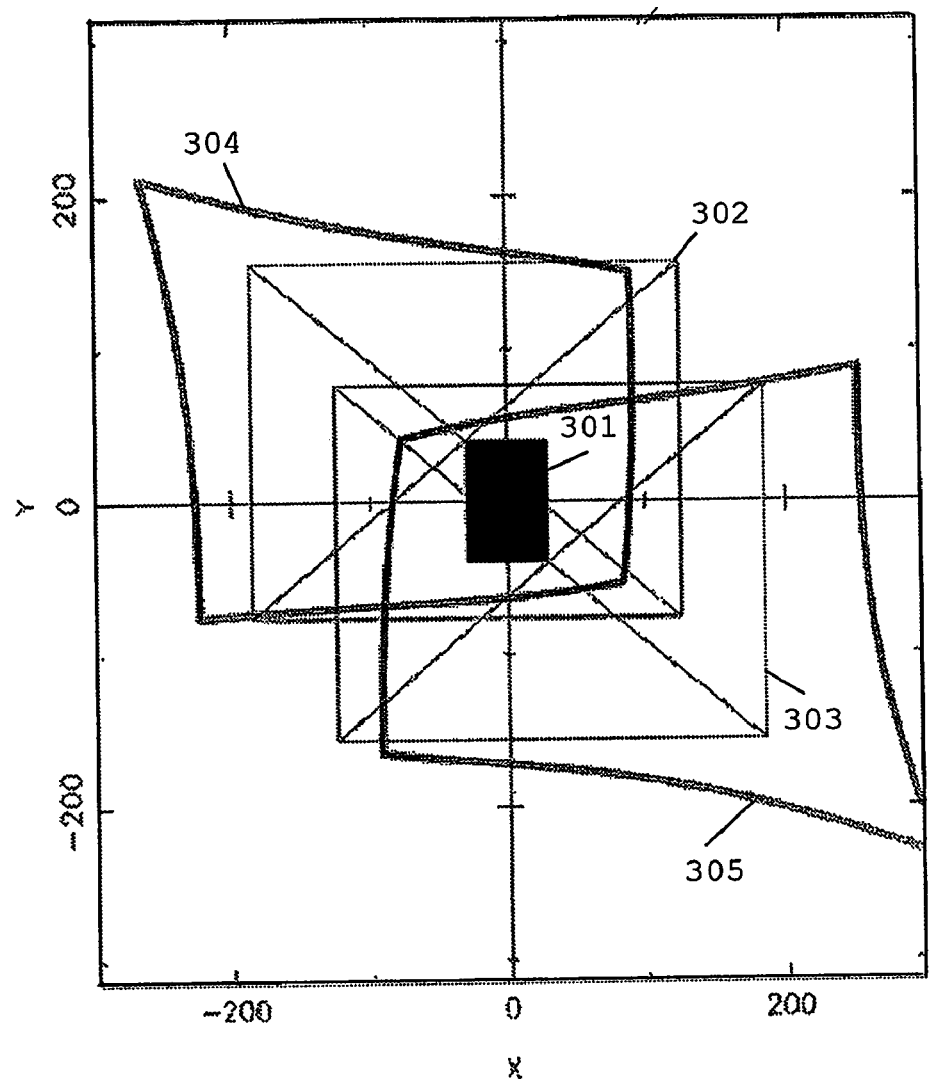
FIG. 30 illustrates a numerical simulation of the viewing windows of a 1-step monochromatic reflection hologram recorded at 526.5 nm, 80 cm×60 cm, viewed from the front, written using a collimated reference beam at 56 degrees angle of incidence and illuminated by a point source located at a 3 m distance and at a 56 degrees axial angle of incidence (refractive index of the emulsion is 1.63)

FIG. 30 shows the case of a 1-step monochromatic reflection composite hologram ($\lambda$=526.5 nm), 80 cm high by 60 cm wide and viewed from the front, which has been written using a collimated reference beam at 56 degrees angle of incidence. A perfectly paraxial objective having a horizontal FOV of 100 degrees has been used to write image data via an SLM. The SLM has an aspect ratio of 1:0.75 H:V. Image data is written to the SLM un-apodized (maximum FOV case) and viewing and object planes are considered at 130 cm in front of the hologram surface. The hologram has undergone no emulsion shrinkage during processing and is replayed by a point light source situated at 3 metres distance from the hologram centre at 56 degrees angle of incidence (the reference beam on playback is from the underneath and in front as in the diagram of FIG. 29b).

The hologram, in FIG. 30, is depicted as the shaded rectangle 301; the rectangle 302 and the rectangle 303, respectively above-left and below-right of the hologram, represent the peripheral limits of the ideal viewing zones (at 130 cm) under collimated replay illumination for respectively the top-left and bottom-right holopixels. The distorted zones 304 and 305 represent the peripheral limits of the actual calculated viewing zones at 130 cm (normal) distance from the hologram, given the point source replay illumination. Clearly these latter zones are significantly pushed away from the hologram centre and as such much of the final total is viewing zone only carries information about a section of the hologram. As the hologram size gets bigger and the illumination light gets closer the above situation becomes critical and there is no one viewing zone where all the hologram is viewable in its entirety.

Figure 31:
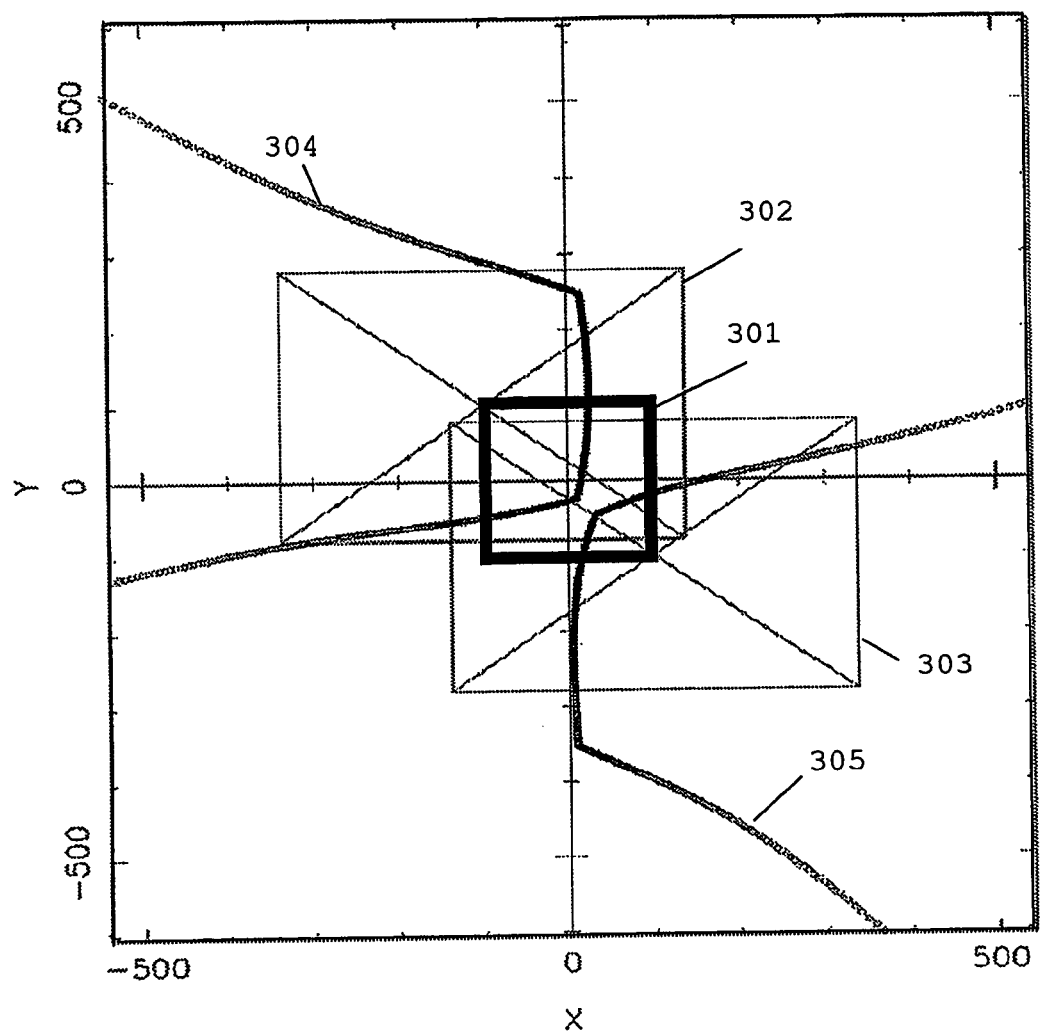
FIG. 31 illustrates a numerical simulation of a 2 m×2 m monochromatic reflection hologram, recorded under a collimated reference geometry and illuminated from a distance of 3 m by a point source (viewing distance is 2 m, reference recording and axial replay angles are 56 degrees to the normal—otherwise all other parameters as in FIG. 30)

Whilst the viewing distance is of the order of 1.5 times the largest dimension of the hologram and the illumination light is situated at a distance of around 3 times the largest dimension of the hologram it is possible to pre-distort the digital image data in order to obtain an undistorted hologram (when the hologram is illuminated by a point source). Beyond the above cited constraints it becomes impractical to use pre-distortion as the only method to make large undistorted holograms and some manipulation of the reference beam must take place (see FIG. 31 for a simulation of a 2 m×2 m hologram, written with a collimated reference beam and illuminated from a 3 m distance by a point source and viewed at 2 m distance—note that the viewing windows don't intersect).

As we have previously discussed Klug et al. use exact reference beam tracking in order to circumvent the need to pre-distort the digital image data. This technique cites such a method as overcoming the prohibitive computational load of pre-distortion. However we have found that, with rapidly advancing computer power, pre-distortion is currently computationally well-treatable. Further, since in certain cases, computational pre-distortion does not yield overlapping viewing windows for all parts of the hologram (i.e. the fact that a viewing position does not exist where all the hologram image can be observed at once), it is advantageous, for such cases (typically large holograms that are to be viewed with a point source light at close proximity), to use a composite technique comprising both pre-distortion and some deliberate reference beam tracking on recording. Such a composite technique turns out to have significant advantages as it acts to bring the viewing windows of each holopixel into better alignment than when one simply tracks the reference beam such that it matches the replay source.

Pre-distortion of Data

In the case that we elect to write the hologram with a fixed collimated beam, the image data must be corrected for the disparity between the recording and replay geometries. We shall therefore need to know what information to write on the SLM in terms of the required undistorted data that we want to observe when the hologram is complete. Since current SLM devices are usually fabricated from a fixed and equally spaced grid of pixels, this operation is accomplished by use of the ($\gamma,\tau$) equations to calculate the required pixel swap transformations.

In the case that an SLM device is used which supports a deformable mesh, then the required distorted image data must be calculated from the given data at viewing using the ($\epsilon,\sigma$) equations.

The ($\epsilon,\sigma$) Equations

Following our previous analysis equations 204, 206, 207, 208 and 209 may be written as follows:

$$a\epsilon + b\sigma + gR = 0 \quad (224)$$

-continued $$\frac{d\varepsilon}{R} = \sqrt{1 - \frac{\varepsilon^2 + \sigma^2}{n^2 R^2}} + c \qquad (225)$$

$$R^2 = \varepsilon^2 + \sigma^2 + h_r^2 \qquad (226)$$

where we have used $R=r_1$ this time and $$a = \frac{\gamma}{r_2} + \frac{\mu}{r_C} \qquad (227)$$

$$b = -\frac{\tau}{r_2} - \frac{\xi}{r_C} \qquad (228)$$

$$c = \sqrt{1 - \frac{\sin^2\theta_r}{n^2}} \qquad (229)$$

$$d = \frac{\sqrt{1 - \frac{\tau^2 + \gamma^2}{n^2 r_2^2}} + \sqrt{1 - \frac{\xi^2 + \mu^2}{n^2 r_C^2}}}{\frac{\alpha\tau}{r_2} + \frac{\alpha\xi}{r_C}} \qquad (230)$$

$$g = \left(\frac{\tau}{r_2} + \frac{\xi}{r_C}\right)\sin\theta_r \qquad (231)$$

Clearly the solution of these equations is exactly similar to equations 218 to 223 with $\gamma$ being replaced by $\sigma$ and $\tau$ being replaced by $\varepsilon$. If $(\gamma,\tau)$ represent a desired SLM image data set at the viewing distance $z=h_v$ then the solution of the above equations gives the required distorted dataset $(\sigma,\varepsilon)$ that must be written at the recording distance $z=h_r$.

Recording with a Converging Reference Wave Geometry

In the case that the replay light is too close to the hologram, making it necessary to vary the angle of the recording reference beam from pixel to pixel at production of the hologram, we must re-derive the mathematical model presented above for the case of a general converging reference wave. We will therefore now consider the case of FIG. 29e in which the reference wave is redirected for each holopixel in such a way to form a point sink at $(x_r, y_r, z_r = h_f)$.

Equations 179 to 184 need to be supplemented by the following relations:

$$x_h = x_r - r_r \sin\theta_r \sin\phi_r \qquad (232)$$

$$y_h = y_r + r_r \sin\theta_r \cos\phi_r \qquad (233)$$

where $$r_r^2 = (x_h - x_r)^2 + (y_h - y_r)^2 + z_r^2. \qquad (234)$$

Equations 192 to 194 also need to be supplemented by:

$$\sin^2\theta_r = \frac{(x_r - x_h)^2 + (y_h - y_r)^2}{r_r^2} \qquad (235)$$

Following 196 to 201 we now define $$\beta = x_h - x_r \qquad (236)$$

$$\delta = y_r - y_h \qquad (237)$$

whence equations 232 and 233 yield $$\sin\theta_r \sin\phi_r = -\beta/r_r \qquad (238)$$

$$\sin\theta_r \cos\phi_r = -\delta/r_r \qquad (239)$$

Thus equations 202 and 203 are generalized to $$k_2\left(\frac{\tau}{r_2} + \frac{\xi}{r_C}\right) = k_1\left(\frac{\varepsilon}{r_1} + \frac{\beta}{r_r}\right) \qquad (240)$$

$$k_2\left(\frac{\gamma}{r_2} + \frac{\mu}{r_C}\right) = k_1\left(\frac{\sigma}{r_1} + \frac{\delta}{r_r}\right) \qquad (241)$$

Dividing these two equations we eliminate $k_1$ and $k_2$ as in 204:

$$\left(\frac{\gamma}{r_2} + \frac{\mu}{r_C}\right)\left(\frac{\varepsilon}{r_1} + \frac{\beta}{r_r}\right) = \left(\frac{\sigma}{r_1} + \frac{\delta}{r_r}\right)\left(\frac{\tau}{r_2} + \frac{\xi}{r_C}\right) \qquad (242)$$

Equation 205 is now generalized to:

$$k_2\left(\sqrt{1 - \frac{\tau^2 + \gamma^2}{n^2 r_2^2}} + \sqrt{1 - \frac{\xi^2 + \mu^2}{n^2 r_C^2}}\right) = k_1\alpha\left(\sqrt{1 - \frac{\varepsilon^2 + \sigma^2}{n^2 r_1^2}} + \sqrt{1 - \frac{\beta^2 + \delta^2}{n^2 r_r^2}}\right) \qquad (243)$$

and 206 to:

$$\left(\frac{\varepsilon}{r_1} + \frac{\beta}{r_r}\right)\left(\sqrt{1 - \frac{\tau^2 + \gamma^2}{n^2 r_2^2}} + \sqrt{1 - \frac{\xi^2 + \mu^2}{n^2 r_C^2}}\right) = \alpha\left(\frac{\tau}{r_2} + \frac{\xi}{r_C}\right)\left(\sqrt{1 - \frac{\varepsilon^2 + \sigma^2}{n^2 r_1^2}} + \sqrt{1 - \frac{\beta^2 + \delta^2}{n^2 r_r^2}}\right) \qquad (244)$$

Finally with the additional relation $$r_r^2 = \beta^2 + \delta^2 + h_f^2 \qquad (245)$$

we can recast our problem in exactly the form of equations 210 to 212.

The Generalized $(\gamma,\tau)$ Equations

As before we may now write $$\alpha\tau + b\gamma + gR = 0 \qquad (246)$$

$$\frac{d\tau}{R} = \sqrt{1 - \frac{\tau^2 + \gamma^2}{n^2 R^2}} + c \qquad (247)$$

$$R^2 = \tau^2 + \gamma^2 + h_v^2 \qquad (248)$$

where, as before, we have used $R=r_2$ for simplicity. We write the generalized coefficient set as:

$$a = \frac{\sigma}{r_1} - \frac{\delta}{r_r} \qquad (249)$$

-continued $$b = -\frac{\varepsilon}{r_1} - \frac{\beta}{r_r} \quad (250)$$

$$c = \sqrt{1 - \frac{\xi^2 + \mu^2}{n^2 r_C^2}} - \frac{\xi d}{r_C} \quad (251)$$

$$d = \frac{r_1 \alpha}{\frac{\varepsilon}{r_1} + \frac{\beta}{r_r}} \left( \sqrt{1 - \frac{\varepsilon^2 + \sigma^2}{n^2 r_1^2}} + \sqrt{1 - \frac{\beta^2 + \delta^2}{n^2 r_r^2}} \right) \quad (252)$$

$$g = \frac{\xi}{r_C}\left(\frac{\sigma}{r_1} + \frac{\delta}{r_r}\right) - \frac{\mu}{r_C}\left(\frac{\varepsilon}{r_1} + \frac{\beta}{r_r}\right) \quad (253)$$

Figure 32A:
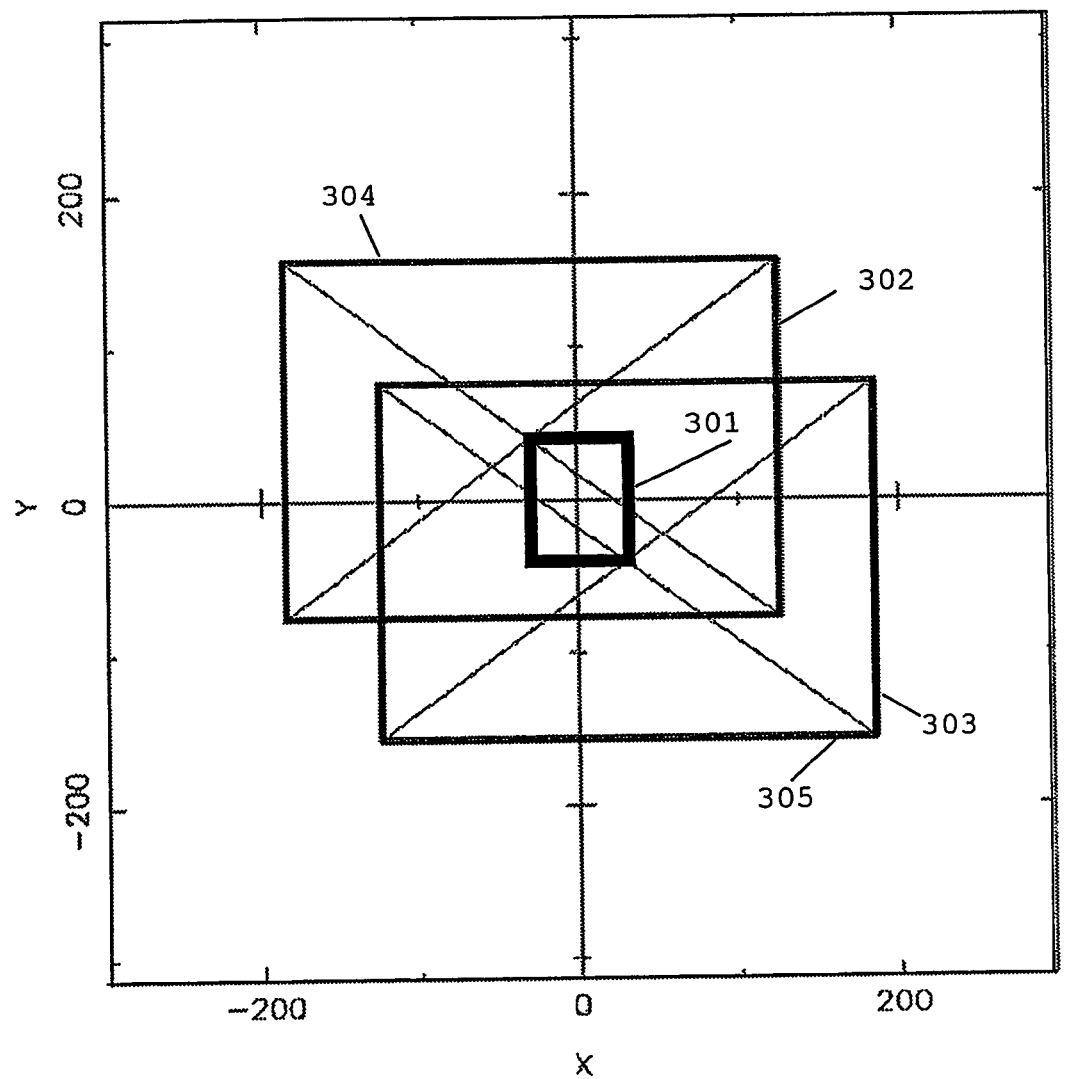
FIG. 32a illustrates the case of FIG. 30 but with an exactly conjugate reference beam at recording giving undistorted viewing windows on replay by a point source.
Figure 32B:
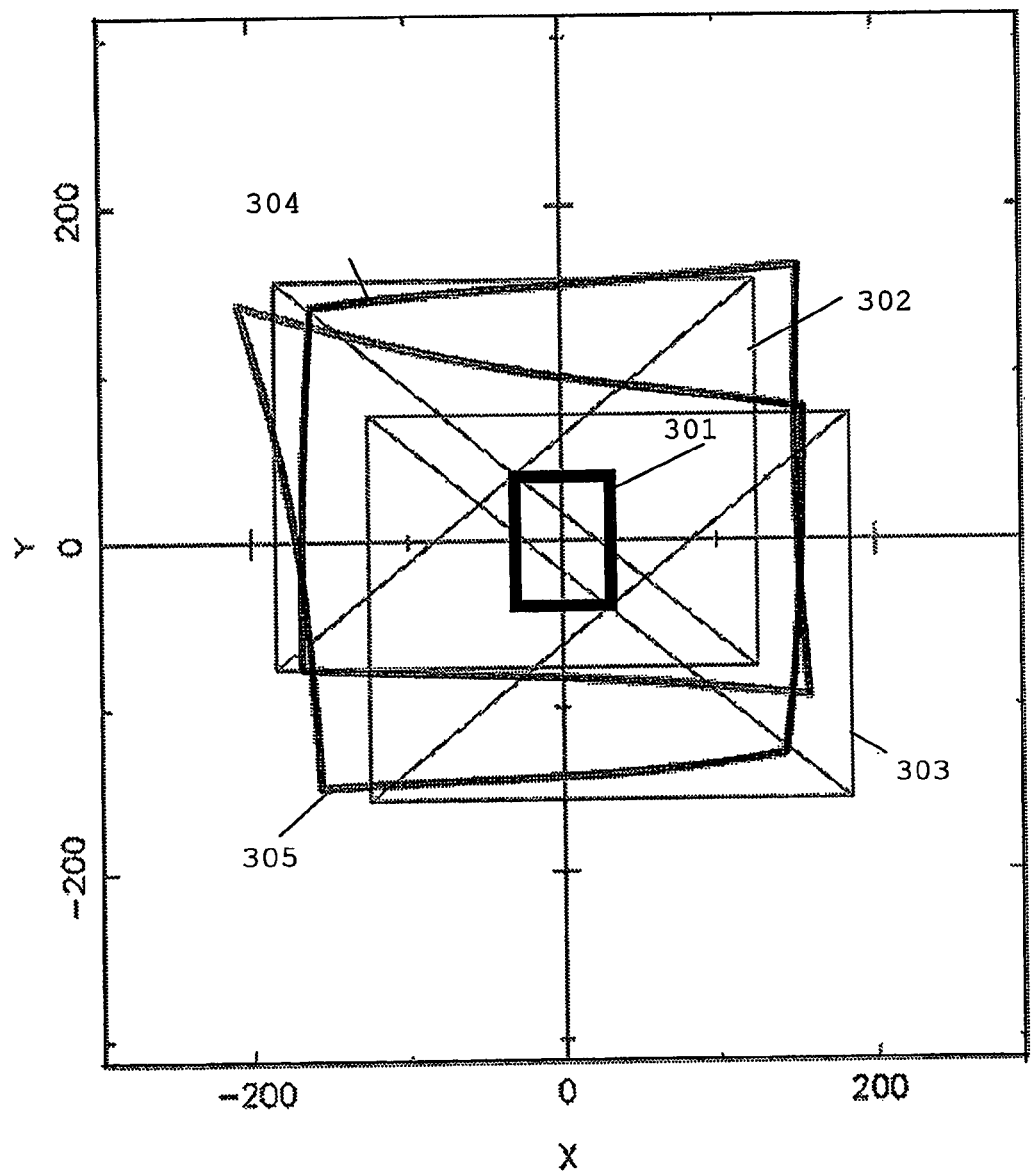
FIG. 32b illustrates the case of FIG. 30 but with an overcompensated converging reference beam showing the merging of the two diagonally opposed viewing zones (Labels as in FIG. 30)
Figure 32C:
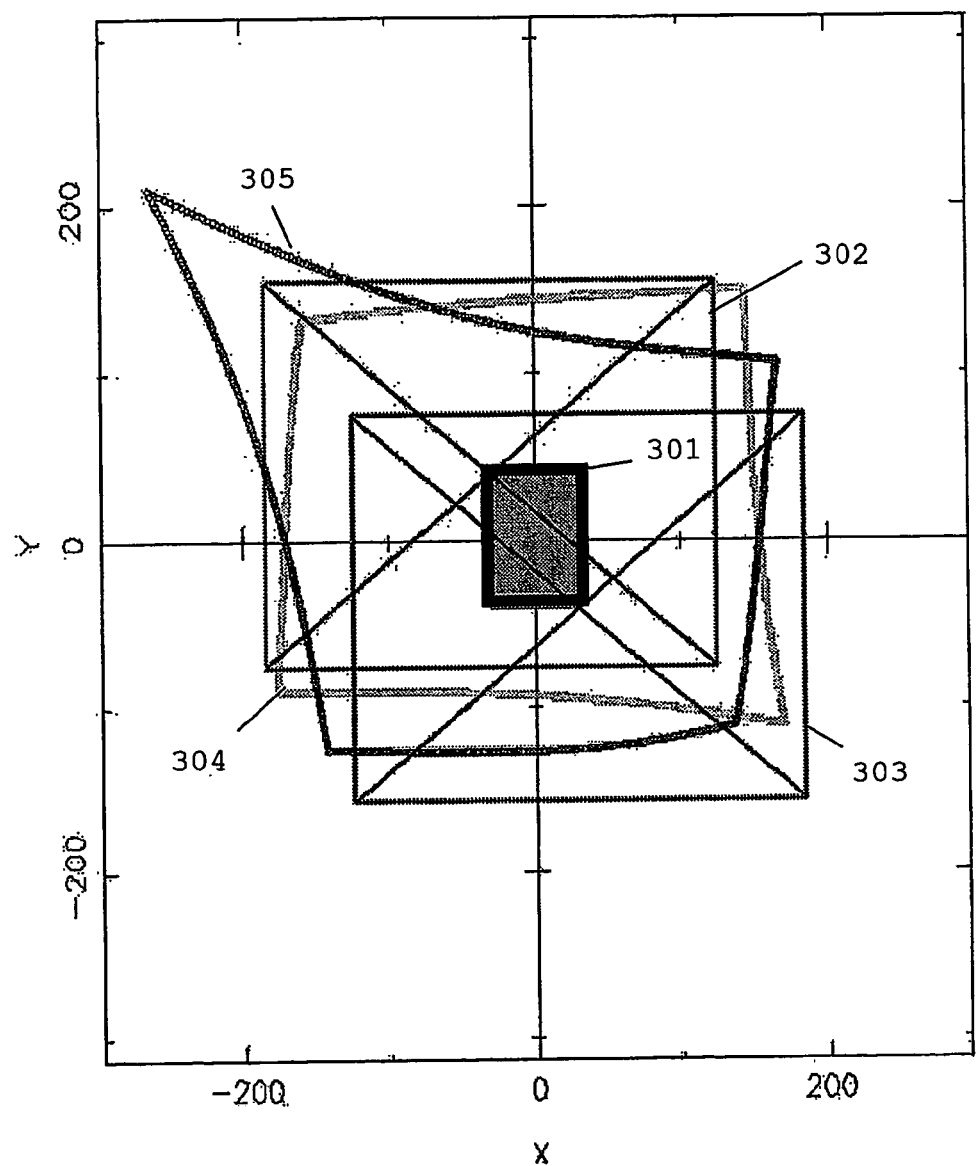
FIG. 32c illustrates the case of FIG. 32(b) but using an astigmatic converging reference beam to bring the windows into vertical as well as horizontal alignment(Labels as in FIG. 30)

These equations may then be solved using the expressions of equations 218 to 223. In FIG. 32 we re-examine the problem already treated in FIG. 30, but with a converging reference geometry. FIG. 32a shows the case where the replay geometry is designed to be exactly conjugate to the recording geometry. In this case we see that we obtain un-distorted rectangular viewing windows as would be expected. This is clearly rather better than the previous situation with a collimated reference wave geometry. However, we still observe that in most of the viewing zone only part of the hologram is visible. FIG. 32b shows a numerical simulation for the case of an over-corrected converging reference geometry (corresponding to the reference sink being at 1.8 m from the centre point of the hologram). Clearly the viewing zones are now significantly pushed into one another and horizontally we gain around 20% on the usable FOV of the objective. Vertically the effect is smaller due to the inclination of the replay and reference beams in this plane. Accordingly we might suppose that an astigmatic converging reference with different rates of convergence horizontally and vertically might also improve the vertical alignment of the viewing windows. Such a hypothesis is tested in FIG. 32c which shows the same case as FIG. 32b but with a moderately astigmatic converging reference. Although we see a significant improvement in vertical registration we also observe a slight degradation in resolution which may become problematic in certain geometries. Nevertheless we see, by overcorrecting the reference on recording, using either a slightly astigmatic or a non-astigmatic geometry, we can achieve a highly optimal viewing configuration which has a significant advantage over the solution of Klug et al. who desire only to minimize image distortion.

Calculating the Best Choice for the Recording Geometry

In the case of a hologram designed to be lit with a close point source, the above section demonstrated clearly the advantage of using an overcorrected reference geometry on recording. This may be thought of as inducing an effectively benign distortion into our hologram printing system in order to achieve a better viewing situation.

There are various ways of varying the reference beam recording angle in order to achieve better viewing window overlap for a certain replay geometry.

The simplest method is to use an overcorrected reference recording beam of axial angle of incidence equal to that of the intended replay beam but which is characterized by a sink at $(x_r, y_r, z_r = h_f)$. Then we calculate $h_f$ by preferably minimizing the quantity $$P = \sum_{\alpha \neq \beta} \sum \frac{w(\alpha, \beta)}{\Lambda_o} \int_0^{\Lambda_o} ([x_{2\alpha}(\Lambda) - x_{2\beta}(\Lambda)]^2 + [y_{2\alpha}(\Lambda) - y_{2\beta}(\Lambda)]^2) d\Lambda \quad (254)$$

Figure 33:
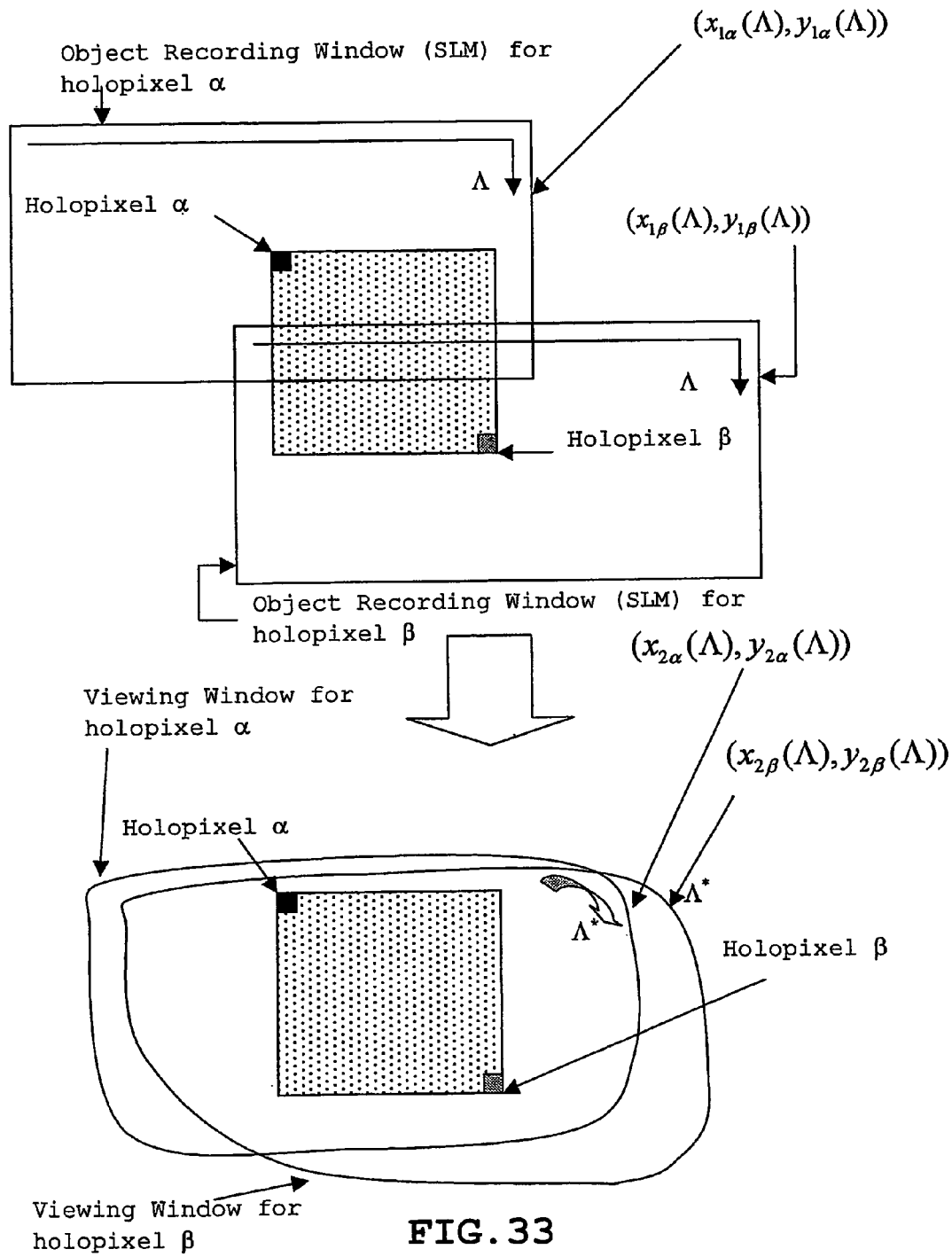
FIG. 33 illustrates the calculation of the P function for the case of two diagonally separated pixels where the path variable used in the integration is either $\Lambda^*$ or $\Lambda$.

Here, $\Lambda$ ($0 \leq \Lambda \leq \Lambda_o$) is a coordinate that defines the location of a point on the calculated viewing window perimeter corresponding to a certain holopixel. Its magnitude may either refer to the distance between a chosen reference point, then measuring around the perimeter of the viewing window, to the point in question or it may more preferably refer to the distance around the object window perimeter to the corresponding point (this is consistent as rays transform in a 1 to 1 manor from the object geometry to the image geometry and hence a point on the viewing window perimeter is uniquely associated with a point on the object window perimeter—FIG. 33). The parameters $\alpha$ and $\beta$ determine respectively two general holopixels, whose viewing windows we wish to compare. The sum may be carried out over all $\alpha$ and $\beta$ or only over a selected distributed subset which, in one limit, would be two diagonally extreme pixels. The function w is a simple weighting function that is generally chosen such as to give more weight to distant holopixels than to close neighbors. At each iteration of the numerical minimization the parameters $x_2$ and $y_2$ are calculated using the generalized $(\gamma, \tau)$ equations with an initial window shape (which is usually a rectangle tracing the edge of the SLM). After the minimization converges $h_f$ will have been determined and we may simply use the generalized $(\gamma, \tau)$ equations (or in some cases a generalized version of the $(\epsilon, \sigma)$ equations—e.g. for deformable mesh SLMs) to calculate the required pre-distorted digital data at $(x_{1\alpha}, y_{1\alpha} \forall \alpha)$ from the undistorted image data at $(x_{2\alpha}, y_{2\alpha} \forall \alpha)$.

The Generalized $(\epsilon, \sigma)$ Equations

For completeness we note that the generalized $(\epsilon, \sigma)$ equations may be written in canonical form as follows:

$$a\varepsilon + b\sigma + gR = 0 \quad (255)$$

$$\frac{d\varepsilon}{R} = \sqrt{1 - \frac{\varepsilon^2 + \sigma^2}{n^2 R^2}} + c \quad (256)$$

$$R^2 = \varepsilon^2 + \sigma^2 + h_r^2 \quad (257)$$

where $R = r_1$. The generalized coefficients are calculated exactly as above.

Refinement of the Recording Geometry Choice

We mentioned in the previous section that it is possible to obtain somewhat better viewing window overlap using astigmatic recording beams. In fact we may generalize this to minimizing the function P of equation 254 with respect to individual altitudinal $(\theta_r)$ and azimuthal $(\phi_r)$ reference recording angles corresponding to each holopixel. Equations 238 and 239 may then be used in equations 246 to 248 (or 255 to 257) in order to calculate to required pre-distorted image data.

It should be noted that for the purposes of numerical convergence the following definition of P is, in some cases, preferred:

$$P = \sum_{\alpha \neq \beta} \sum \frac{w(\alpha, \beta)}{\Lambda_o} \quad (258)$$

$$\int_0^{\Lambda_o} \left\{ \left[ \begin{array}{c} (x_{2\alpha}(\Lambda) - x_{2\beta}(\Lambda)) \\ -\chi(x_{h\alpha} - x_{h\beta}) \end{array} \right]^2 + \left[ \begin{array}{c} (y_{2\alpha}(\Lambda) - y_{2\beta}(\Lambda)) \\ -\chi(y_{h\alpha} - y_{h\beta}) \end{array} \right]^2 \right\} d\Lambda$$

When the parameter $\chi=0$, this equation is the same as equation 254. When, however, $\chi=1$, however, the minimum of the function P will correspond to the closest situation possible to when all viewing windows are centred on their respective holopixel. By initially choosing $\chi=1$ and then by slowly changing $\chi$ towards 0, we can find the minimum of $P(\chi=0)$ more easily. In addition, sometimes this minimum does not exist and we may then, using this procedure find a minimum P for a finite and acceptable value of $\chi$.

Various definitions of P may be constructed that are somewhat different to those given above but which serve the same purpose. We do not give further examples here as it will be clear to someone skilled in the art how many types of P function may be formulated (given the known illumination geometry for the hologram) that result in the identification of a specific recording geometry corresponding to optimum hologram viewing characteristics.

Indeed the problem may be cast using various other mathematical formalisms. Each of these formalisms will seek to vary the recording of some or all of the reference angle parameters in order to find a best set of such angles corresponding to the viewing windows of all (or some representative set of) holopixels being generally overlapped better than they otherwise would.

In summary the techniques of Klug et al. search to avoid the necessity of pre-distortion of the image data by exact conjugate matching of recording and replay reference beams. We find that, particularly for the case of large format holograms that are to be replayed with a point source light at close proximity, there is significant motivation for choosing a combination of pre-distortion and reference beam tracking in order to produce better viewing window overlap. This technique may be expected to produce better quality holograms.

In the case of medium format holograms, where the replay light is not so close to the hologram, we find that the mechanically simple solution of a collimated recording beam combined with image pre-distortion provides an optimal solution to the problem.

The Integration of Pixel Swapping Transformations

It has been seen in the first part of this invention how digital image data must be transformed according to special mask transformations in order that this data be in a form in which it can be written to the SLM of the holographic printer. We have also seen how the fundamental distortion of the printer writing objective has to be integrally incorporated in such mask transformations.

In the second part of this invention we have seen how the digital data that we intend to write onto the printer SLM must also be transformed in order to eliminate both the various diffractive distortions inherent to the printer (i.e. recording reference geometry) and by the viewing conditions of the final hologram (i.e. replay reference geometry).

Just as the objective distortion compensation must be integrated into the mask transformation so too must we integrate the diffractive distortion compensation. To see how this works it is best to formally re-discretize the SLM vertical and horizontal co-ordinates in terms of the indices $\check{\epsilon}$ and $\check{\tau}$ just as we have previously used $\mu$ and $\nu$. The reason for this is that we will then retain $\nu$ and $\nu$ for the description of the projected SLM plane at viewing time.

We now define the tensor $^{\check{\epsilon}\check{\tau}}W_{\alpha\beta}$ which represents the diffraction compensated data that we intend to write to our SLM for each holopixel $(\alpha,\beta)$ assuming a paraxial objective. This tensor is related to the paraxial mask tensor S by the following relationship:

$$^{\check{\epsilon}\check{\tau}}W_{\alpha\beta} = {}^{\mu\nu}S_{\alpha\beta} \quad (259)$$

Since $\mu$ and $\nu$ correspond respectively to $\tau$ and $\gamma$ (by a simple linear scaling) we can use equations 218 to 223 in order to write $$\mu = F(\check{\sigma}, \check{\epsilon}) \quad (260)$$

$$\nu = G(\check{\sigma}, \check{\epsilon}) \quad (261)$$

where F is the function of equation 218/221 and G is the function of 219/222. Note also that for the generalized case we may use the generalized $(\gamma,\tau)$ equations (this will just change the forms of F and G but otherwise 260 & 261 hold).

Taking the full-parallax max-FOV mask transform of equations 132 to 136 as an example, we may thus write:

$$^{\check{\epsilon}\check{\sigma}}W_{\alpha\beta} = {}^{\mu\nu}S_{\alpha\beta} = {}^{kg}I_{ij} \quad (262)$$

where $$k = \left[\frac{D}{D+T}\right]\frac{(\alpha-1)(N_K-1)}{(N_A-1)} + \left[\frac{T}{D+T}\right]\frac{(F(\check{\sigma},\check{\epsilon})-1)(N_K-1)}{(N_M-1)} + 1, \quad (263)$$

$$i = \frac{(\alpha-1)(N_I-1)}{N_A-1} + 1, \quad (264)$$

$$g = \left[\frac{R}{R+\Sigma}\right]\frac{(\beta-1)(N_G-1)}{N_B-1} + \left[\frac{\Sigma}{R+\Sigma}\right]\frac{(G(\check{\sigma},\check{\epsilon})-1)(N_G-1)}{N_V-1} + 1 \quad (265)$$

$$j = \frac{(N_J-1)(\beta-1)}{N_B-1} + 1 \quad (266)$$

Now W must be corrected for objective distortion. If we denote T as the fully corrected mask data then it follows that $$^{\check{\mu}\check{\nu}}T_{\alpha\beta} = {}^{\check{\epsilon}\check{\sigma}}W_{\alpha\beta} \quad (266a)$$

where $$\check{\epsilon} = 1 + \rho_{\check{\mu}\check{\nu}}\left\{\check{\mu} - 1 - \frac{N_M-1}{2}\right\} + \frac{N_M-1}{2} \quad (266b)$$

$$\check{\sigma} = 1 + \rho_{\check{\mu}\check{\nu}}\left\{\check{\nu} - 1 - \frac{N_V-1}{2}\right\} + \frac{N_V-1}{2} \quad (266c)$$

whence the integrated transform may be written:

$$^{\check{\mu}\check{\nu}}T_{\alpha\beta} = {}^{kg}I_{ij} \quad (266d)$$

where

-continued $$k = 1 + int\left\{\begin{array}{l}\left[\frac{D}{D+T}\right]\frac{(\alpha-1)(N_K-1)}{(N_A-1)} + \left[\frac{T}{D+T}\right]\left[\frac{N_K-1}{N_M-1}\right]* \\ \left(F\left(1+\rho_{\mu\nu}^{\sim}\left(\tilde{v}-1-\frac{N_V-1}{2}\right)\right)+\frac{N_V-1}{2},\right. \\ \left.1+\rho_{\mu\nu}^{\sim}\left(\tilde{u}-1-\frac{N_M-1}{2}\right)+\frac{N_M-1}{2}\right)-1\right)\end{array}\right\}$$ (266e)

$$i = int\left\{\frac{(\alpha-1)(N_I-1)}{N_A-1}\right\} + 1$$ (266f)

$$g = 1 + int\left\{\begin{array}{l}\left[\frac{R}{R+\Sigma}\right]\frac{(\beta-1)(N_G-1)}{N_B-1} + \left[\frac{\Sigma}{R+\Sigma}\right]\left[\frac{N_G-1}{N_V-1}\right]* \\ \left(G\left(1+\rho_{\mu\nu}^{\sim}\left(\tilde{v}-1-\frac{N_V-1}{2}\right)\right)+\frac{N_V-1}{2},\right. \\ \left.1+\rho_{\mu\nu}^{\sim}\left(\tilde{u}-1-\frac{N_M-1}{2}\right)+\frac{N_M-1}{2}\right)-1\right)\end{array}\right\}$$ (266g)

$$j = int\left\{\frac{(N_J-1)(\beta-1)}{N_B-1}\right\} + 1$$ (266h)

This in then an example of a simple mask transformation that corrects for both diffractive and objective distortion effects. It is clearly a simple matter to apply this logic to any of the previously treated viewing and rendering geometries in order to arrive at other mask transformations incorporating both diffractive disparity and objective distortion effects.

In summary, for large format reflection holograms that are designed to be illuminated by a point source at relatively close proximity the following procedure should be used. A rectangular boundary to the recording SLM is defined by a series of $(\epsilon,\sigma)$ coordinates. The function P or equations 254/258 is then minimized, thus defining the preferred recording geometry in terms of the required illumination geometry (i.e. this defines F and G). Then the modified mask transformation (e.g. equations 266d-266h or similar equations describing an integrated mask transformation for finite diffractive disparity and finite objective distortion) is applied to the digital image data in order to calculate the required SLM data. Finally the hologram is written using a recording reference beam tracking that is defined by the calculated optimum recording geometry.

In the case of smaller format holograms where a collimated reference is used on recording, the formalism of transformation 266d-266h is still valid.

The General Case of a Precise Diffractive/Refractive Model

When we study the diffractive and refractive processes in detail that occur at a given holopixel, we see that equations 175 to 178 may generally be replaced by more general expressions of the form $$A_1(\theta_i,\theta_c,\theta_o,\theta_r,\phi_i,\phi_c,\phi_o,\phi_r,k_1,k_2) = B_1$$ (267)

$$A_2(\theta_i,\theta_c,\theta_o,\theta_r,\phi_i,\phi_c,\phi_o,\phi_r,k_1,k_2) = B_2$$ (268)

$$A_3(\theta_i,\theta_c,\theta_o,\theta_r,\phi_i,\phi_c,\phi_o,\phi_r,k_1, k_2) = B_3$$ (269)

where the functions $A_1$, $A_2$ and $A_3$ are general non-linear functions of the shown variables and the functions $B_1$, $B_2$ and $B_3$ are non-linear functions describing the refractive and emulsion-swelling processes. This leads simply to the functions F and G of equations 260 and 261 being replaced by general non-linear functions. Otherwise the procedure that we have described above remains valid.

We have illustrated the formulation of the generalized mask transformation with the max-FOV case. It should be clear to someone skilled in the art that generally we might optimize this process by variably clipping the final SLM data window such that each and every viewing window corresponding to a given holopixel precisely aligned at replay. These clipping functions are clearly defined after we have minimized the function P.

In addition it should be evident for someone skilled in the art how all the above procedures may be generalized to all the various geometries that have been hereto above discussed.

Discoloration

In the above discussions we have assumed that the swelling parameter $\alpha$ is known and that its effect is compensated for routinely. However, when either swelling is present or the replay geometry of the hologram is not equal to the recording geometry we observe that generally the replay wavelength of a given holopixel is not the same as the recording wavelength.

In the general case of pre-distorted data that we have discussed above, we observe that for each holopixel there is imposed a slightly different discoloration by the applied pre-distortion. This means that the simple application of pre-distortion as described above will lead to a hologram image that appears discolored to different extents depending on holopixel location and on viewing angle.

The resolution to this effect is to calculate the replay wavelength as a function of holopixel location and viewing location and to use this information to modify our colour mixing at each such datum. Generally, for an RGB model, we may thus write $$^{\bar{\mu}\bar{\nu}}T_{\alpha\beta} = ^{\bar{\epsilon}\bar{o}}W_{\alpha\beta} = ^{\mu\nu}S_{\alpha\beta} = ^{\bar{\mu}\bar{\nu}}U_{G\alpha\beta}{}^{kg}I_{ij} + ^{\bar{\mu}\bar{\nu}}U_{R\alpha\beta}{}^{kg}J_{ij} + ^{\bar{\mu}\bar{\nu}}U_{B\alpha\beta}{}^{kg}K_{ij}$$ (270)

where now T is the green mask data, I is the green image data, J is the red image data, K is the blue image data and $U_G$, $U_R$, and $U_B$ are respectively functions of the holopixel replay wavelength and the red, green and blue recording wavelengths. Clearly the equations for the blue and red mask data are equivalent.

In some cases the wavelength shift due to the disparity between recording and replay reference beam geometries may become too great for easy correction. In this case the P functions of equations 254 and 258 should be generalized to contain a term proportional to the magnitude of the wavelength shift. Lagrange multipliers may be used to control the importance of these terms within the minimization. Such a constrained optimization will lead to the best window overlap which doesn't unduly discolour the image.

The P functions of equations 254 and 258 may also be modified to contain a term inversely proportional to the final spatial image resolution on the viewing plane. Again Lagrange multipliers may be used to control the importance of this term. Such a constrained optimization would assure the identification of the best window overlap whilst producing a hologram of acceptable peripheral angular resolution.

The invention claimed is:

1. A method of writing a composite 1-step hologram, comprising:
   generating a laser beam;
   acquiring digital data from an object, said digital data being described by a luminous intensity tensor $^{kg}I_{ij}$ wherein i and j are the horizontal and vertical pixel coordinates of a given perspective view that is generated by a real or virtual camera whose location is described by k in the horizontal dimension and g in the vertical dimension;

performing a single mathematical transformation to convert said luminous intensity tensor $^{kg}I_{ij}$ into a tensor $^{\mu\nu}T_{\alpha\beta}$ wherein $\alpha$ and $\beta$ are the horizontal and vertical coordinates of a holographic pixel on the composite hologram and $\mu$ and $\nu$ are the horizontal and vertical coordinates of a given pixel on a spatial light modulator on to which the data for each holographic pixel is written, wherein said single mathematical transformation transforms said digital data whilst integrally correcting said digital data for a finite distortion of an optical objective;

writing corrected data to a spatial light modulator, wherein said corrected data is described by said tensor $^{\mu\nu}T_{\alpha\beta}$;

directing said laser beam on to said spatial light modulator so that at least a portion of said laser beam is spatially modulated by said spatial light modulator to form a spatially modulated laser beam;

passing said spatially modulated laser beam through an optical objective having a finite distortion, said optical objective focusing said spatially modulated laser beam on to a photosensitive substrate;

directing a reference recording beam on to said photosensitive substrate; and forming a double-parallax composite hologram on said photosensitive substrate.

2. A method as claimed in claim 1, wherein said digital data is acquired from a real object and comprises a plurality of perspective views of the required hologram image.

3. A method as claimed in claim 1, wherein said digital data is acquired from a virtual object and comprises a plurality of perspective views of the required hologram image.

4. A method as claimed in claim 1, wherein said composite 1-step hologram is selected from the group consisting of: (i) a transmission hologram; and (ii) a reflection hologram.

5. A method as claimed in claim 1, wherein said single mathematical transformation generates a rectangular viewing window located in front of said hologram.

6. A method as claimed in claim 5, wherein said spatial light modulator is either: (i) static whilst writing said hologram; or (ii) moving whilst writing said hologram.

7. A method as claimed in claim 5, wherein said viewing window is either: (i) of substantially similar size to said composite hologram; or (ii) of different size to said composite hologram.

8. A method as claimed in claim 5, wherein said viewing window is either: (i) symmetrically located in front of said composite hologram; or (ii) generally offset from the centre of said composite hologram.

9. A method as claimed in claim 5, wherein either: (i) said viewing window is located at the same perpendicular distance from a given point in the holographic image as the camera plane is located from the corresponding point on the object from which said digital data is acquired; or (ii) said viewing window is located at a certain perpendicular distance from a given point in the holographic image and the camera plane is located at a substantially different perpendicular distance from the corresponding point on the object from which said digital data is acquired.

10. A method as claimed in claim 1, wherein said digital data is generated by a real or virtual camera which generates either: (i) a plurality of apodized images which are centred in a frame which corresponds with the object which is to be reproduced by said hologram; or (ii) a plurality of non-apodized images having frames which correspond with the object which is to be reproduced by said hologram, said frames being generally off-centred.

11. A method as claimed in claim 1, wherein said single mathematical transformation generates a scrolling viewing window located in front of said hologram.

12. A method as claimed in claim 11, wherein either: (i) the camera plane is located at a certain distance from a point on the object and the viewing plane is located at substantially the same distance from a corresponding point in the holographic image; or (ii) the camera plane is located at a certain distance from a point on the object and the viewing plane is located at substantially a different distance from a corresponding point in the holographic image.

13. A method as claimed in claim 1, wherein said single mathematical transformation generates a viewing window having a fixed size in the horizontal dimension and which scrolls in the vertical dimension, said viewing window being located in front of the hologram.

14. A method as claimed in claim 1, wherein said single mathematical transformation generates a viewing window having a fixed size in the vertical dimension and which scrolls in the horizontal dimension, said viewing window being located in front of the hologram.

15. A method as claimed in claim 1, wherein said composite hologram is formed using a variable angle reference recording beam.

16. A method as claimed in claim 15, wherein said composite 1-step hologram is replayed using a point-source light.

17. A method as claimed in claim 15, wherein said composite 1-step hologram is replayed using collimated light.

18. A method as claimed in claim 1, wherein said composite hologram is formed using a fixed angle or collimated reference recording beam.

19. A method as claimed in claim 1, wherein said single mathematical transformation additionally integrally corrects said digital data for the image distortion caused by the altitudinal and azimuthal reference beam angle(s) used to replay each holographic pixel of said hologram being different from the altitudinal and azimuthal reference beam angle(s) used to write each holographic pixel of said hologram.

20. A method as claimed in claim 1, wherein said single mathematical transformation additionally integrally pre-distorts said digital data so that the data written on to said spatial light modulator is distorted.

21. A method as claimed in claim 20, further comprising overcorrecting the reference recording beam using either an astigmatic or a non-astigmatic geometry.

22. A method as claimed in claim 21, wherein the overlap of viewing windows of a plurality of holographic pixels is arranged to be maximised.

23. A method as claimed in claim 22, wherein either: (i) the angular resolution within the overall viewing window of said hologram averaged over said overall viewing window is maximised; or (ii) the angular resolution at the periphery of said overall viewing window is maximised.

24. A method as claimed in claim 21, wherein the overlap of viewing windows of two diagonally opposed holographic pixels is maximised.

25. A method as claimed in claim 20, further comprising determining individual altitudinal and azimuthal reference recording angles for at least a majority of the holographic pixels forming said hologram.

26. A method as claimed in claim 21, wherein the pre-distortion of said digital data and the step of overcorrecting the reference recording beam are arranged such that chromatic discoloration is minimized.

27. A method as claimed in claim 1, wherein said single mathematical transformation additionally integrally corrects said digital data for the distortion caused by emulsion swelling of said substrate.

28. A method as claimed in claim 1, wherein said single mathematical transformation additionally integrally corrects said digital data for the distortion caused by the wavelength of light used to replay said hologram being different from the wavelength of light used to write said hologram.

29. A method as claimed in claim 1, further comprising a plurality of colour channels.

30. A method as claimed in claim 29, further comprising a red and/or green and/or blue colour channel.

31. A method as claimed in claim 30, wherein a spatial light modulator is provided for each colour channel.

32. A method as claimed in claim 29, wherein said composite 1-step hologram is a multiple colour hologram.

33. A method as claimed in claim 32, wherein said multiple colour hologram is formed using reference recording beams having a first geometry and said hologram is replayed with light rays having a geometry different to said first geometry.

34. A method as claimed in claim 33, further comprising calculating the replay wavelength as a function of altitudinal and azimuthal angles for at least a majority of the holographic pixels forming said hologram.

35. A method as claimed in claim 29, further comprising calculating linear chromatic coupling tensors for each colour channel.

36. A method as claimed in claim 35, wherein a separate tensor $^{\mu\nu}T_{\alpha\beta}$ is calculated for each colour channel.

37. A method as claimed in claim 36, wherein a corrected tensor is calculated for each colour channel as a linear combination of each uncorrected component colour tensor $^{\mu\nu}T_{\alpha\beta}$ each operated on by a said chromatic coupling tensor.

38. A method as claimed in claim 37, wherein for each holographic pixel each said corrected tensor is written to a separate spatial light modulator in such a way as to create a fully colour-corrected composite colour hologram.

39. A method as claimed in claim 1, wherein said single mathematical transformation between the tensors $^{kg}I_{ij}$ and $^{\mu\nu}T_{\alpha\beta}$ consists of a reordering of the elements according to a set of single index laws of the form $k=f_1(\alpha, \beta, \mu, \nu, P_l, Q_l, H_l, \lambda)$, $g=f_2(\alpha, \beta, \mu, \nu, P_l, Q_l, H_l, \lambda)$, $i=f_3(\alpha, \beta, \mu, \nu, P_l, Q_l, H_l, \lambda)$ and $j=f_4(\alpha, \beta, \mu, \nu, P_l, Q_l, H_l, \lambda)$, wherein the functions $f_n$ are general functions of the indicated indices, $P_l$ are a set of parameters characterizing the physical characteristics of the hologram, $Q_l$ are a set of parameters characterizing the optical properties of the hologram writing mechanism, $H_l$ is a set of parameters characterizing the geometrical properties of the reference recording and reference replay beams and $\lambda$ is the wavelength at which the hologram is recorded.

40. A 1-step holographic printer, comprising:
a laser source;
control means for acquiring digital data from an object, said digital data being described by a luminous intensity tensor $^{kg}I_{ij}$ wherein i and j are the horizontal and vertical pixel coordinates of a given perspective view that is generated by a real or virtual camera whose location is described by k in the horizontal dimension and g in the vertical dimension, said control means performing a single mathematical transformation to convert said luminous intensity tensor $^{kg}I_{ij}$ into a tensor $^{\mu\nu}T_{\alpha\beta}$ wherein $\alpha$ and $\beta$ are the horizontal and vertical coordinates of a holographic pixel on the composite hologram and $\mu$ and $\nu$ are the horizontal and vertical coordinates of a given pixel on a spatial light modulator on to which the data for each holographic pixel is written, wherein said single mathematical transformation transforms said digital data whilst integrally correcting said digital data for a finite objective distortion of an optical objective;
a spatial light modulator onto which data described by said tensor $^{\mu\nu}T_{\alpha\beta}$ is written in use, wherein in use a laser beam is directed on to said spatial light modulator so that at least a portion of the beam profile of said laser beam is spatially modulated by said spatial light modulator to form a spatially modulated laser beam;
an optical objective through which said spatially modulated laser beam is passed in use, said optical objective focusing in use said spatially modulated laser beam on to a photosensitive substrate so that a double-parallax composite hologram is formed in use on to a photosensitive substrate.

41. A 1-step holographic printer, comprising:
a laser source;
control means for acquiring digital data from an object, said digital data being described by a luminous intensity tensor $^kI_{ij}$ wherein i and j are the horizontal and vertical pixel coordinates of a given perspective view that is generated by a real or virtual camera whose location is described by k in the horizontal dimension, said control means performing a single mathematical transformation to convert said luminous intensity tensor $^kI_{ij}$ into a tensor $^{\mu\nu}T_{\alpha\beta}$ wherein $\alpha$ and $\beta$ are the horizontal and vertical coordinates of a holographic pixel on the composite hologram and $\mu$ and $\nu$ are the horizontal and vertical coordinates of a given pixel on a spatial light modulator on to which the data for each holographic pixel is written, wherein said single mathematical transformation transforms said digital data whilst integrally correcting said digital data for a finite objective distortion of an optical objective;
a spatial light modulator onto which data described by said tensor $^{\mu\nu}T_{\alpha\beta}$ is written in use, wherein in use a laser beam is directed on to said spatial light modulator so that at least a portion of the beam profile of said laser beam is spatially modulated by said spatial light modulator to form a spatially modulated laser beam;
an optical objective through which said spatially modulated laser beam is passed in use, said optical objective focusing in use said spatially modulated laser beam on to a photosensitive substrate so that a single-parallax composite hologram is formed in use on to a photosensitive substrate.

42. A method of writing a composite 1-step hologram, comprising:
generating a laser beam;
acquiring digital data from an object, said digital data being described by a luminous intensity tensor $^kI_{ij}$ wherein i and j are the horizontal and vertical pixel coordinates of a given perspective view that is generated by a real or virtual camera whose location is described by k in the horizontal dimension;
performing a single mathematical transformation to convert said luminous intensity tensor $^kI_{ij}$ into a tensor $^{\mu\nu}T_{\alpha\beta}$ wherein $\alpha$ and $\beta$ are the horizontal and vertical coordinates of a holographic pixel on the composite hologram and μ and ν are the horizontal and vertical coordinates of a given pixel on a spatial light modulator on to which the data for each holographic pixel is written, wherein said single mathematical transformation transforms said digital data whilst integrally correcting said digital data for a finite distortion of an optical objective;

writing corrected data to a spatial light modulator, wherein said corrected data is described by said tensor $^{\mu\nu}T_{\alpha\beta}$;

directing said laser beam on to said spatial light modulator so that at least a portion of said laser beam is spatially modulated by said spatial light modulator to form a spatially modulated laser beam;

passing said spatially modulated laser beam through an optical objective having a finite distortion, said optical objective focusing said spatially modulated laser beam on to a photosensitive substrate;

directing a reference recording beam on to said photosensitive substrate; and forming a single-parallax composite hologram on said photosensitive substrate.

43. A method as claimed in claim 42, wherein said digital data is acquired from a real object and comprises a plurality of perspective views of the required hologram image.

44. A method as claimed in claim 42, wherein said digital data is acquired from a virtual object and comprises a plurality of perspective views of the required hologram image.

45. A method as claimed in claim 42, wherein said composite 1-step hologram is selected from the group consisting of: (i) a transmission hologram; and (ii) a reflection hologram.

46. A method as claimed in claim 42, wherein said single mathematical transformation generates a rectangular viewing window located in front of said hologram.

47. A method as claimed in claim 46, wherein said spatial light modulator is either: (i) static whilst writing said hologram; or (ii) moving whilst writing said hologram.

48. A method as claimed in claim 46, wherein said viewing window is either: (i) of substantially similar size to said composite hologram; or (ii) of different size to said composite hologram.

49. A method as claimed in claim 46, wherein said viewing window is either: (i) symmetrically located in front of said composite hologram; or (ii) generally offset from the centre of said composite hologram.

50. A method as claimed in claim 46, wherein either: (i) said viewing window is located at the same perpendicular distance from a given point in the holographic image as the camera plane is located from the corresponding point on the object from which said digital data is acquired; or (ii) said viewing window is located at a certain perpendicular distance from a given point in the holographic image and the camera plane is located at a substantially different perpendicular distance from the corresponding point on the object from which said digital data is acquired.

51. A method as claimed in claim 42, wherein said digital data is generated by a real or virtual camera which generates either: (i) a plurality of apodized images which are centred in a frame which corresponds with the object which is to be reproduced by said hologram; or (ii) a plurality of non-apodized images having frames which correspond with the object which is to be reproduced by said hologram, said frames being generally off-centred.

52. A method as claimed in claim 42, wherein said single mathematical transformation generates a scrolling viewing window located in front of said hologram.

53. A method as claimed in claim 42, wherein said single mathematical transformation generates a viewing window having a fixed size in the horizontal dimension and which scrolls in the vertical dimension, said viewing window being located in front of the hologram.

54. A method as claimed in claim 42, wherein said single mathematical transformation generates a viewing window having a fixed size in the vertical dimension and which scrolls in the horizontal dimension, said viewing window being located in front of the hologram.

55. A method as claimed in claim 52, wherein either: (i) the camera plane is located at a certain distance from a point on the object and the viewing plane is located at substantially the same distance from a corresponding point in the holographic image; or (ii) the camera plane is located at a certain distance from a point on the object and the viewing plane is located at substantially a different distance from a corresponding point in the holographic image.

56. A method as claimed of claim 42, wherein said composite hologram is formed using a variable angle reference recording beam.

57. A method as claimed in claim 56, wherein said composite 1-step hologram is replayed using a point-source light.

58. A method as claimed in claim 56, wherein said composite 1-step hologram is replayed using collimated light.

59. A method as claimed in claim 42, wherein said composite hologram is formed using a fixed angle or collimated reference recording beam.

60. A method as claimed in claim 42, wherein said single mathematical transformation additionally integrally corrects said digital data for the image distortion caused by the altitudinal and azimuthal reference beam angle(s) used to replay each holographic pixel of said hologram being different from the altitudinal and azimuthal reference beam angle(s) used to write each holographic pixel of said hologram.

61. A method as claimed in claim 42, wherein said single mathematical transformation additionally integrally pre-distorts said digital data so that the data written on to said spatial light modulator is distorted.

62. A method as claimed in claim 61, further comprising overcorrecting the reference recording beam using either an astigmatic or a non-astigmatic geometry.

63. A method as claimed in claim 62, wherein the overlap of viewing windows of a plurality of holographic pixels is arranged to be maximised.

64. A method as claimed in claim 63, wherein either: (i) the angular resolution within the overall viewing window of said hologram averaged over said overall viewing window is maximised; or (ii) the angular resolution at the periphery of said overall viewing window is maximised.

65. A method as claimed in claim 62, wherein the overlap of viewing windows of two diagonally opposed holographic pixels is maximised.

66. A method as claimed in claim 62, wherein the pre-distortion of said digital data and the step of overcorrecting the reference recording beam are arranged such that chromatic discoloration is minimized.

67. A method as claimed in claim 61, further comprising determining individual altitudinal and azimuthal reference recording angles for at least a majority of the holographic pixels forming said hologram.

68. A method as claimed in claim 42, wherein said single mathematical transformation additionally integrally corrects said digital data for the distortion caused by emulsion swelling of said substrate.

69. A method as claimed in claim 42, wherein said single mathematical transformation additionally integrally corrects said digital data for the distortion caused by the wavelength of light used to replay said hologram being different from the wavelength of light used to write said hologram.

70. A method as claimed in claim 42, further comprising a plurality of colour channels.

71. A method as claimed in claim 70, further comprising a red and/or green and/or blue colour channel.

72. A method as claimed in claim 71, wherein a spatial light modulator is provided for each colour channel.

73. A method as claimed in claim 70, wherein said composite 1-step hologram is a multiple colour hologram.

74. A method as claimed in claim 73, wherein said multiple colour hologram is formed using reference recording beams having a first geometry and said hologram is replayed with light rays having a geometry different to said first geometry.

75. A method as claimed in claim 74, further comprising calculating the replay wavelength as a function of altitudinal and azimuthal angles for at least a majority of the holographic pixels forming said hologram.

76. A method as claimed in claim 70, further comprising calculating linear chromatic coupling tensors for each colour channel.

77. A method as claimed in claim 76, wherein a separate tensor $^{\mu\nu}T_{\alpha\beta}$ is calculated for each colour channel.

78. A method as claimed in claim 77, wherein a corrected tensor is calculated for each colour channel as a linear combination of each uncorrected component colour tensor $^{\mu\nu}T_{\alpha\beta}$ each operated on by a said chromatic coupling tensor.

79. A method as claimed in claim 78, wherein for each holographic pixel each said corrected tensor is written to a separate spatial light modulator in such a way as to create a fully colour-corrected composite colour hologram.

80. A method as claimed in claim 42, wherein said single mathematical transformation between the tensors $^{k}I_{ij}$ and $^{\mu\nu}T_{\alpha\beta}$ consists of a reordering of the elements according to a set of single index laws of the form $$k=f_1(\alpha, \beta, \mu, \nu, P_I, Q_I, H_I, \lambda), i=f_2(\alpha, \beta, \mu, \nu, P_I, Q_I, H_I, \lambda) \text{ and } j=f_3(\alpha, \beta, \mu, \nu, P_I, Q_I, H_I, \lambda),$$

wherein the functions $f_n$ are general functions of the indicated indices, $P_I$ are a set of parameters characterizing the physical characteristics of the hologram, $Q_I$ are a set of parameters characterizing the optical properties of the hologram writing mechanism, $H_I$ is a set of parameters characterizing the geometrical properties of the reference recording and reference replay beams and $\lambda$ is the wavelength at which the hologram is recorded.

* * * * *